US010719284B2

(12) United States Patent
Yamazaki et al.

(10) Patent No.: US 10,719,284 B2
(45) Date of Patent: Jul. 21, 2020

(54) DISPLAY SYSTEM AND DISPLAY DEVICE

(71) Applicant: Semiconductor Energy Laboratory Co., Ltd., Atsugi-shi, Kanagawa-ken (JP)

(72) Inventors: Shunpei Yamazaki, Tokyo (JP); Yuichi Yanagisawa, Kanagawa (JP); Daiki Nakamura, Kanagawa (JP); Nozomu Sugisawa, Kanagawa (JP); Hisao Ikeda, Kanagawa (JP); Naoyuki Senda, Kanagawa (JP); Kensuke Yoshizumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 48 days.

(21) Appl. No.: 14/936,134

(22) Filed: Nov. 9, 2015

(65) Prior Publication Data

US 2016/0132281 A1 May 12, 2016

(30) Foreign Application Priority Data

Nov. 11, 2014 (JP) .................................. 2014-229027
Nov. 11, 2014 (JP) .................................. 2014-229164

(51) Int. Cl.
*G06F 3/14* (2006.01)
*G06F 1/16* (2006.01)
(Continued)

(52) U.S. Cl.
CPC .......... *G06F 3/1446* (2013.01); *G06F 1/1622* (2013.01); *G06F 1/1624* (2013.01);
(Continued)

(58) Field of Classification Search
None
See application file for complete search history.

(56) References Cited

U.S. PATENT DOCUMENTS 5,801,797 A 9/1998 Iida et al.
7,362,046 B2 * 4/2008 Aston ................. G02F 1/13336
313/498

(Continued)

FOREIGN PATENT DOCUMENTS

CN 001713035 A 12/2005
CN 101283307 A 10/2008
(Continued)

OTHER PUBLICATIONS

International Search Report (Application No. PCT/IB2015/058478) dated Jan. 26, 2016.
(Continued)

*Primary Examiner* — Patrick N Edouard
*Assistant Examiner* — Peijie Shen
(74) *Attorney, Agent, or Firm* — Fish & Richardson P.C.

(57) ABSTRACT

Provided is a display system or a display device that is suitable for increasing in size. The display system includes a first display panel, a second display panel, a detection means, and a compensation means. The first display panel includes a first display region. The second display panel includes a second display region. The first display region and the second display region include a first region where they overlap. The detection means has a function of detecting the size of the first region. The compensation means has a function of compensating an image displayed on the first display region in accordance with the change in the size of the first region.

21 Claims, 34 Drawing Sheets

(51) Int. Cl.
*G09G 3/20* (2006.01)
*G06F 3/044* (2006.01)
*G09G 3/00* (2006.01)
*G06F 3/147* (2006.01)

(52) U.S. Cl.
CPC .......... *G06F 1/1643* (2013.01); *G06F 1/1652* (2013.01); *G06F 3/044* (2013.01); *G06F 3/147* (2013.01); *G06F 3/1415* (2013.01); *G06F 3/1423* (2013.01); *G09G 3/001* (2013.01); *G09G 3/20* (2013.01); *G09G 3/2003* (2013.01); *G06F 2203/04102* (2013.01); *G06F 2203/04103* (2013.01); *G06F 2203/04111* (2013.01); *G09G 2300/023* (2013.01); *G09G 2300/0426* (2013.01); *G09G 2300/0452* (2013.01); *G09G 2300/0465* (2013.01); *G09G 2330/021* (2013.01); *G09G 2340/0407* (2013.01); *G09G 2340/0442* (2013.01); *G09G 2340/0457* (2013.01); *G09G 2340/0464* (2013.01); *G09G 2340/14* (2013.01); *G09G 2354/00* (2013.01); *G09G 2380/02* (2013.01)

(56) References Cited

U.S. PATENT DOCUMENTS

| | | | |
|---|---|---|---|
| 7,916,218 B2 * | 3/2011 | Choe | G09G 3/3406 348/227.1 |
| 8,305,294 B2 * | 11/2012 | Cok | H01L 27/3293 345/1.3 |
| 8,344,389 B2 * | 1/2013 | Farquhar | H01L 25/048 257/72 |
| 8,736,162 B2 | 5/2014 | Jin et al. | |
| 9,448,592 B2 | 9/2016 | Jin et al. | |
| 10,054,988 B2 | 8/2018 | Jin et al. | |
| 10,061,356 B2 | 8/2018 | Jin et al. | |
| 2002/0113546 A1 | 8/2002 | Seo et al. | |
| 2002/0196205 A1 * | 12/2002 | Yamakado | G09G 3/3208 345/33 |
| 2003/0032210 A1 | 2/2003 | Takayama et al. | |
| 2003/0090198 A1 | 5/2003 | Aston | |
| 2005/0285811 A1 * | 12/2005 | Kawase | G02F 1/13336 345/1.1 |
| 2007/0001927 A1 * | 1/2007 | Ricks | G02F 1/13336 345/1.1 |
| 2008/0197769 A1 | 8/2008 | Seo et al. | |
| 2009/0239320 A1 | 9/2009 | Takayama et al. | |
| 2010/0007632 A1 * | 1/2010 | Yamazaki | G06F 1/1616 345/175 |
| 2010/0164906 A1 | 7/2010 | Fukunaga et al. | |
| 2010/0177018 A1 | 7/2010 | Wang et al. | |
| 2010/0188488 A1 * | 7/2010 | Birnbaum | G09G 3/001 348/53 |
| 2010/0214245 A1 * | 8/2010 | Hirota | G02F 1/13338 345/173 |
| 2011/0050657 A1 | 3/2011 | Yamada | |
| 2011/0057861 A1 | 3/2011 | Cok et al. | |
| 2011/0199348 A1 * | 8/2011 | Takatani | G02F 1/13452 345/204 |
| 2012/0101722 A1 * | 4/2012 | Inami | G01C 21/3688 701/428 |
| 2012/0268445 A1 | 10/2012 | Ogata et al. | |
| 2013/0200783 A1 | 8/2013 | Van Heck et al. | |
| 2013/0201636 A1 | 8/2013 | Van Den Brand et al. | |
| 2013/0201637 A1 | 8/2013 | De Kok et al. | |
| 2013/0214324 A1 | 8/2013 | Takayama et al. | |
| 2014/0217382 A1 * | 8/2014 | Kwon | H01L 51/0097 257/40 |
| 2014/0240933 A1 * | 8/2014 | Lee | G06F 1/1656 361/749 |
| 2015/0017417 A1 * | 1/2015 | Min | B32B 7/12 428/300.7 |
| 2015/0028316 A1 | 1/2015 | Kojima et al. | |
| 2015/0161937 A1 * | 6/2015 | Locker | G06F 3/1446 345/1.3 |
| 2015/0228704 A1 | 8/2015 | Miyake et al. | |
| 2015/0378397 A1 * | 12/2015 | Park | G06F 1/1652 361/679.27 |
| 2016/0014882 A1 | 1/2016 | Jongman et al. | |
| 2016/0019019 A1 | 1/2016 | Ikeda et al. | |
| 2016/0037608 A1 | 2/2016 | Ikeda et al. | |
| 2016/0044751 A1 | 2/2016 | Ikeda et al. | |
| 2016/0103649 A1 * | 4/2016 | Yoshitani | G09G 3/3208 345/694 |
| 2017/0071066 A1 * | 3/2017 | Cho | H05K 1/028 |
| 2017/0075444 A1 * | 3/2017 | Nade | G09F 9/00 |
| 2018/0364758 A1 | 12/2018 | Jin et al. | |
| 2019/0004569 A1 | 1/2019 | Jin et al. | |

FOREIGN PATENT DOCUMENTS

| | | |
|---|---|---|
| CN | 102855822 A | 1/2013 |
| CN | 202816269 U | 3/2013 |
| EP | 1612658 A | 1/2006 |
| EP | 2541371 A | 1/2013 |
| JP | 09-311344 A | 12/1997 |
| JP | 2002-324673 A | 11/2002 |
| JP | 2002-328625 A | 11/2002 |
| JP | 2003-174153 A | 6/2003 |
| JP | 2005-509904 | 4/2005 |
| JP | 2005-173291 A | 6/2005 |
| JP | 2006-010811 A | 1/2006 |
| JP | 2006-154380 A | 6/2006 |
| JP | 2007-147877 A | 6/2007 |
| JP | 2008-545164 | 12/2008 |
| JP | 2009-139463 A | 6/2009 |
| JP | 2009139463 A * | 6/2009 |
| JP | 2010-266777 A | 11/2010 |
| JP | 2011-022302 A | 2/2011 |
| JP | 2011-192567 A | 9/2011 |
| JP | 2012-028638 A | 2/2012 |
| JP | 2012-248137 A | 12/2012 |
| JP | 2013-504092 | 2/2013 |
| JP | 2013-518437 | 5/2013 |
| KR | 2006-0048387 A | 5/2006 |
| KR | 2008-0078632 A | 8/2008 |
| WO | WO-2003/042966 | 5/2003 |
| WO | WO-2007/005245 | 1/2007 |
| WO | WO-2011/031605 | 3/2011 |
| WO | WO-2011/093711 | 8/2011 |
| WO | WO-2011/094068 | 8/2011 |
| WO | WO-2012/165283 | 12/2012 |
| WO | WO-2013/128740 | 9/2013 |
| WO | WO-2014/135847 | 9/2014 |

OTHER PUBLICATIONS

Written Opinion (Application No. PCT/IB2015/058478) dated Jan. 26, 2016.

* cited by examiner

FIG. 7A1
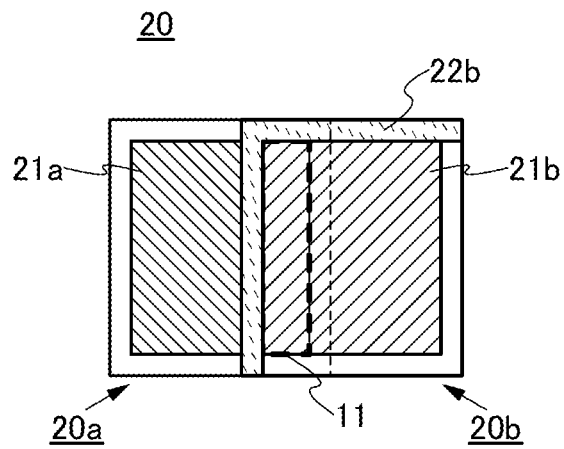
FIG. 7A2
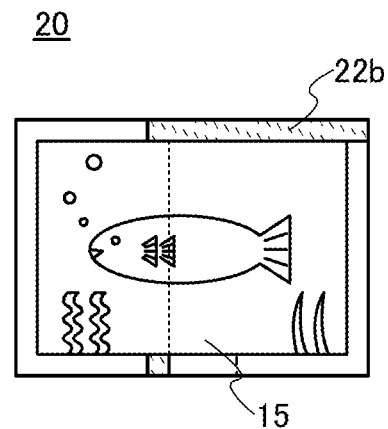
FIG. 7B1
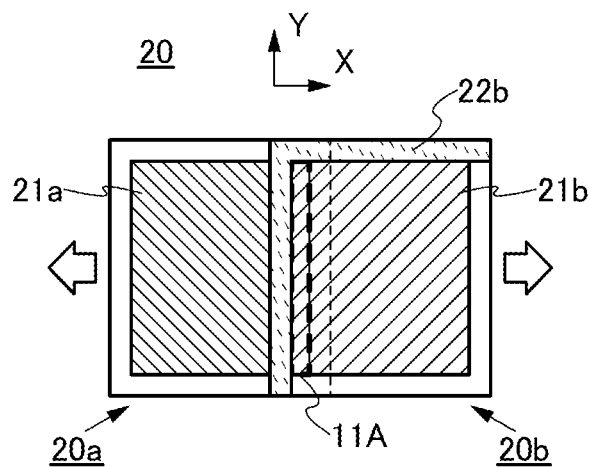
FIG. 7B2
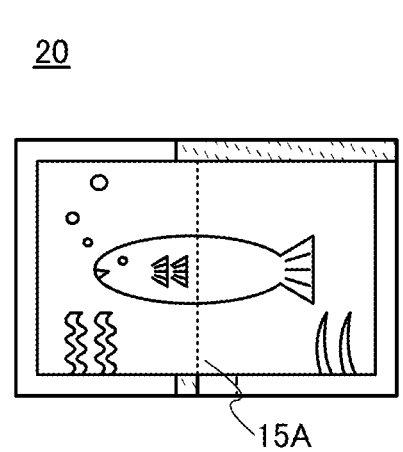
FIG. 7C1
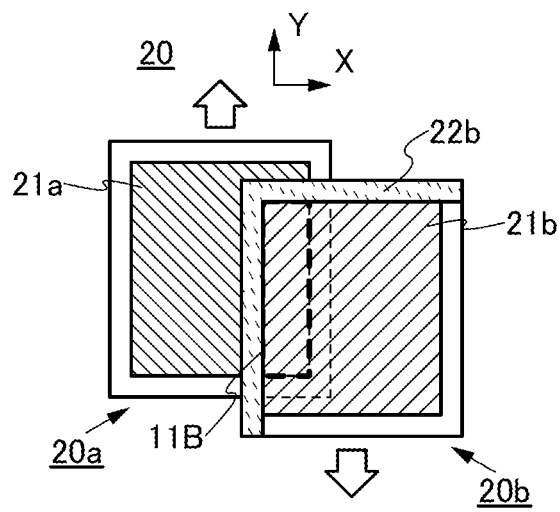
FIG. 7C2
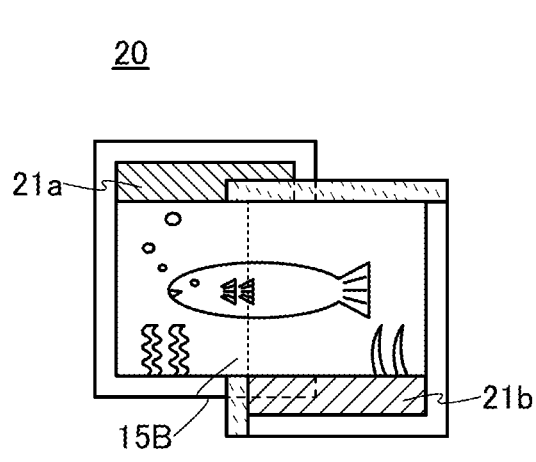

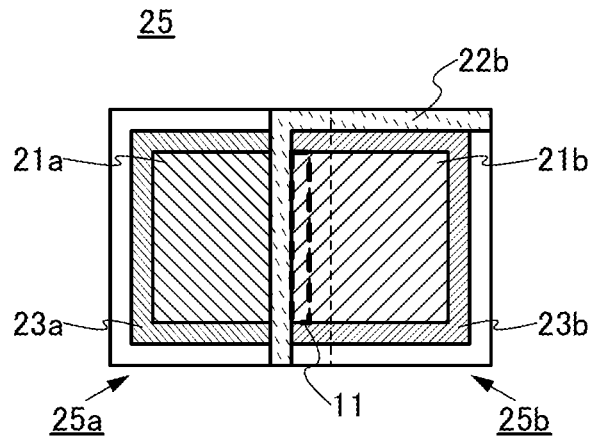
FIG. 8A1
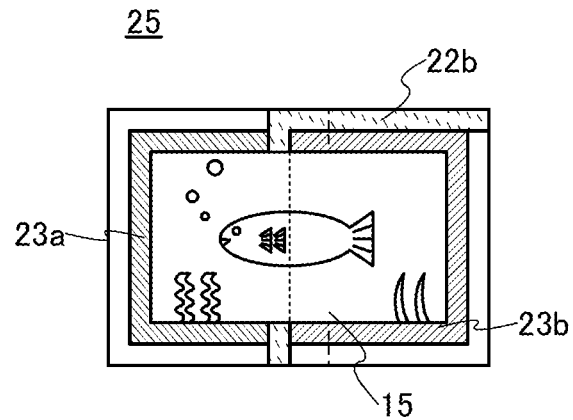
FIG. 8A2
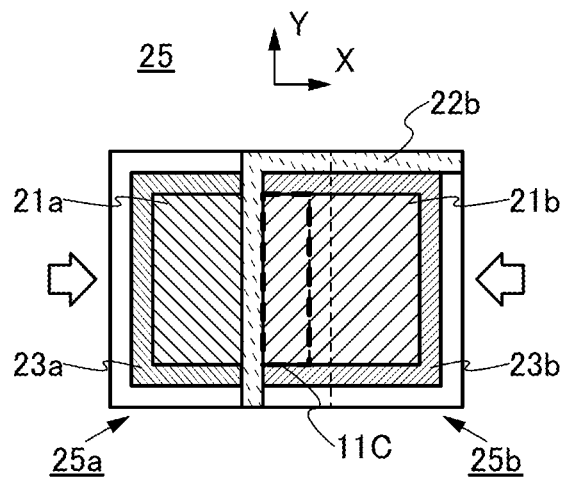
FIG. 8B1
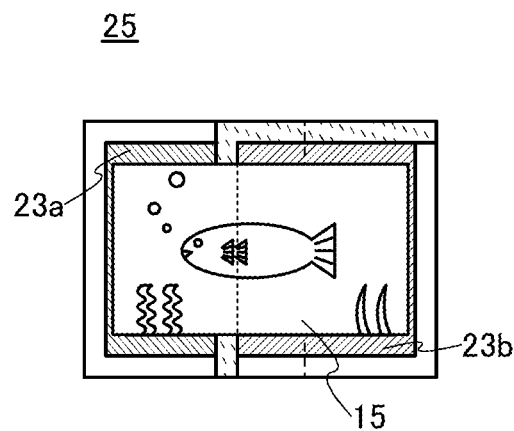
FIG. 8B2
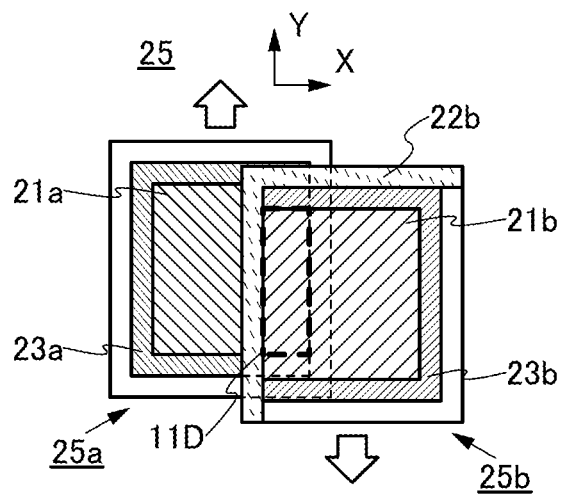
FIG. 8C1
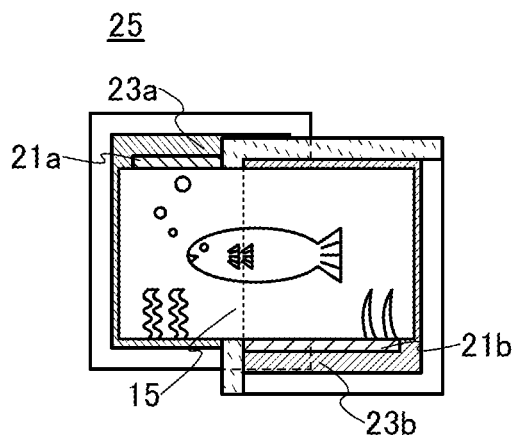
FIG. 8C2

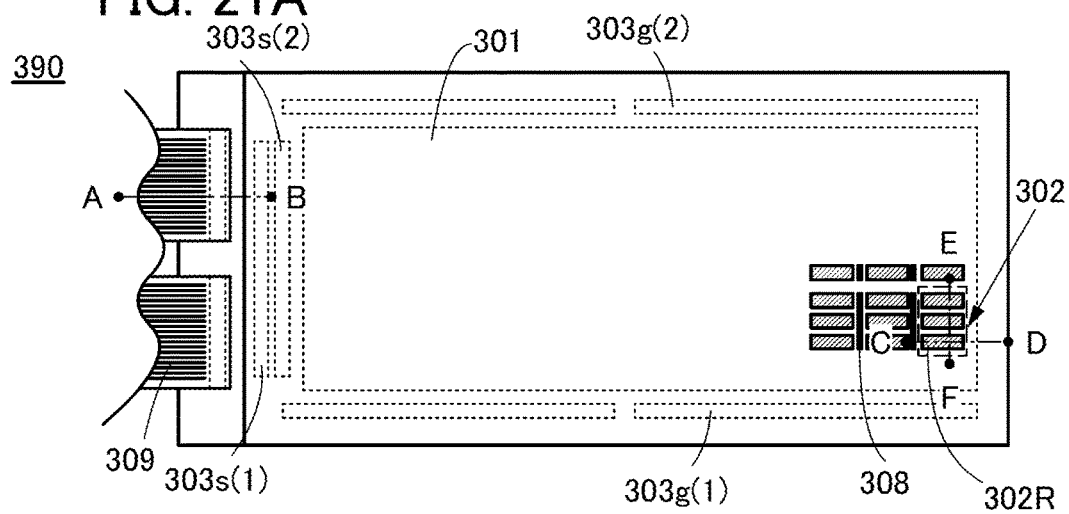
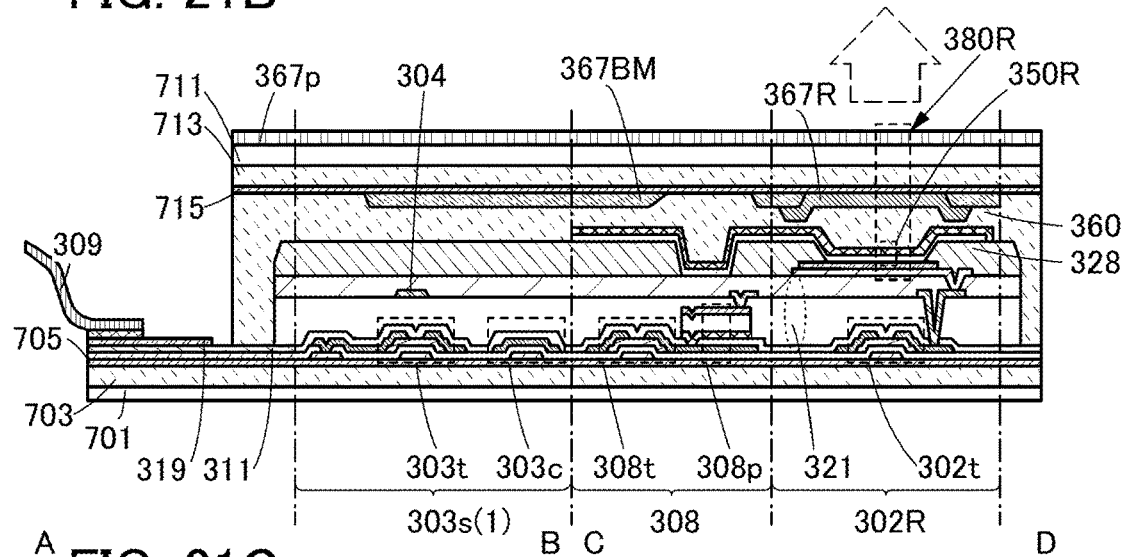
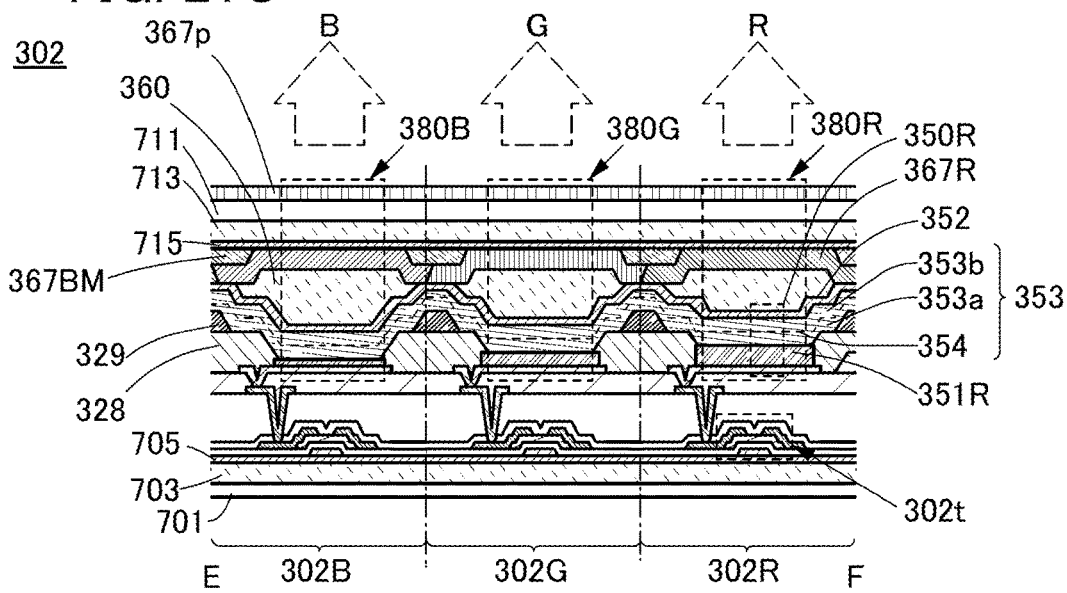

DISPLAY SYSTEM AND DISPLAY DEVICE

TECHNICAL FIELD

One embodiment of the present invention relates to a display system. Another embodiment of the present invention relates to a display device.

One embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a lighting device, a power storage device, a storage device, a method for driving any of them, and a method for manufacturing any of them.

In this specification and the like, the display system indicates any system including a display device. The display system may include a semiconductor device such as a transistor, a semiconductor device, an arithmetic device, a memory device, an imaging device, and the like, in addition to a display device.

BACKGROUND ART

In recent years, larger display devices have been required. For example, television sets including display panels with a diagonal of greater than or equal to 40 inches have spread in ordinary households and have taken on an aspect of an increase in size. In addition, digital signage and a public information display (PID) are given. Larger digital signage, PID, and the like can provide the increased amount of information, and attract more attention particularly when used for advertisement or the like, so that the effectiveness of the advertisement can be increased.

Display devices are expected to find widespread application and modes of the display devices become diversified.

Examples of the display device include, typically, a liquid crystal display device, a light-emitting device including a light-emitting element such as an organic electroluminescent (EL) element or a light-emitting diode (LED), and an electronic paper performing display by an electrophoretic method or the like.

For example, in a basic structure of an organic EL element, a layer containing a light-emitting organic compound is provided between a pair of electrodes. By voltage application to this element, the light-emitting organic compound can emit light. A display device including such an organic EL element needs no backlight which is necessary for liquid crystal display devices and the like; therefore, thin, lightweight, high contrast, and low power consumption display devices can be obtained.

Patent Document 1 discloses a flexible active matrix light-emitting device in which an organic EL element and a transistor serving as a switching element are provided over a film substrate.

REFERENCE

Patent Document

[Patent Document 1] Japanese Published Patent Application No. 2003-174153

DISCLOSURE OF INVENTION

An object of one embodiment of the present invention is to provide a display device or a display system that is suitable for increasing in size. Another object of one embodiment of the present invention is to provide a display device or a display system in which display unevenness is suppressed. Another object is to provide a display device which is suitable for space saving. Another object is to provide a display device which can be stored. Another object is to provide a highly reliable display device.

Another object of one embodiment of the present invention is to provide a novel display device, a novel light-emitting device, a novel lighting device, a novel electronic device, or the like.

Note that the descriptions of these objects do not disturb the existence of other objects. In one aspect of the present invention, there is no need to achieve all the objects. Objects other than the above objects will be apparent from and can be derived from the description of the specification and the like.

Means for Solving the Problems

One embodiment of the present invention is a display system including a first display panel, a second display panel, a detection means, and a compensation means. The first display panel includes a first display region. The second display panel includes a second display region. The first display region and the second display region include a first region where they overlap. The detection means has a function of detecting the size of the first region. The compensation means has a function of compensating an image displayed on the first display region in accordance with the change in the size of the first region.

The compensation means may have a function of compensating an image displayed on the first display region and the second display region in accordance with the change in the size of the first region.

The second display panel may include a first transparent portion adjacent to the second display region.

The first display panel and the second display panel may have flexibility.

Another embodiment of the present invention is the display system in which the detection means includes a photoelectric conversion element. The photoelectric conversion element is provided in the first display region of the first display panel.

Another embodiment of the present invention is the display system in which the first display panel includes an auxiliary display region, and the compensation means has a function of making part of the auxiliary display region displaying an image in accordance with the change in the size of the first region.

One embodiment of the present invention can provide a display device or a display system which is suitable for increasing in size. One embodiment of the present invention can provide a display device or a display system in which display unevenness is suppressed. One embodiment of the present invention can provide a display device which is suitable for space saving. One embodiment of the present invention can provide a display device which can be stored. One embodiment of the present invention can provide a highly reliable display device.

One embodiment of the present invention can provide a novel display device (display panel), a novel electronic device, or the like. Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIGS. 7A1, 7A2, 7B1, 7B2, 7C1, and 7C2 illustrate a display device of one embodiment.
FIGS. 8A1, 8A2, 8B1, 8B2, 8C1, and 8C2 illustrate a display device of one embodiment.
FIGS. 21A to 21C illustrate a touch panel of one embodiment.
FIGS. 32A-1, 32A-2, 32B to 32I illustrate examples of an electronic device.

BEST MODE FOR CARRYING OUT THE INVENTION

Figure 1A:
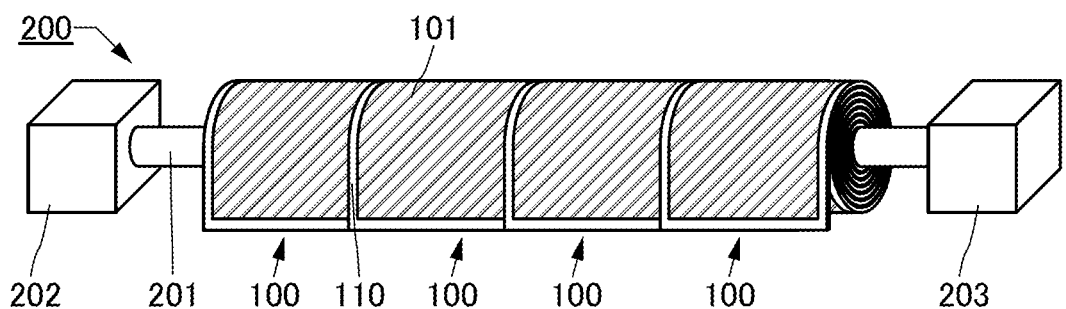
FIGS. 1A to 1C illustrate a structure example of a display device of one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. The same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT).

Embodiment 1

In this embodiment, a display device of one embodiment of the present invention will be described with reference to drawings.

Structure Example

Figure 1B:
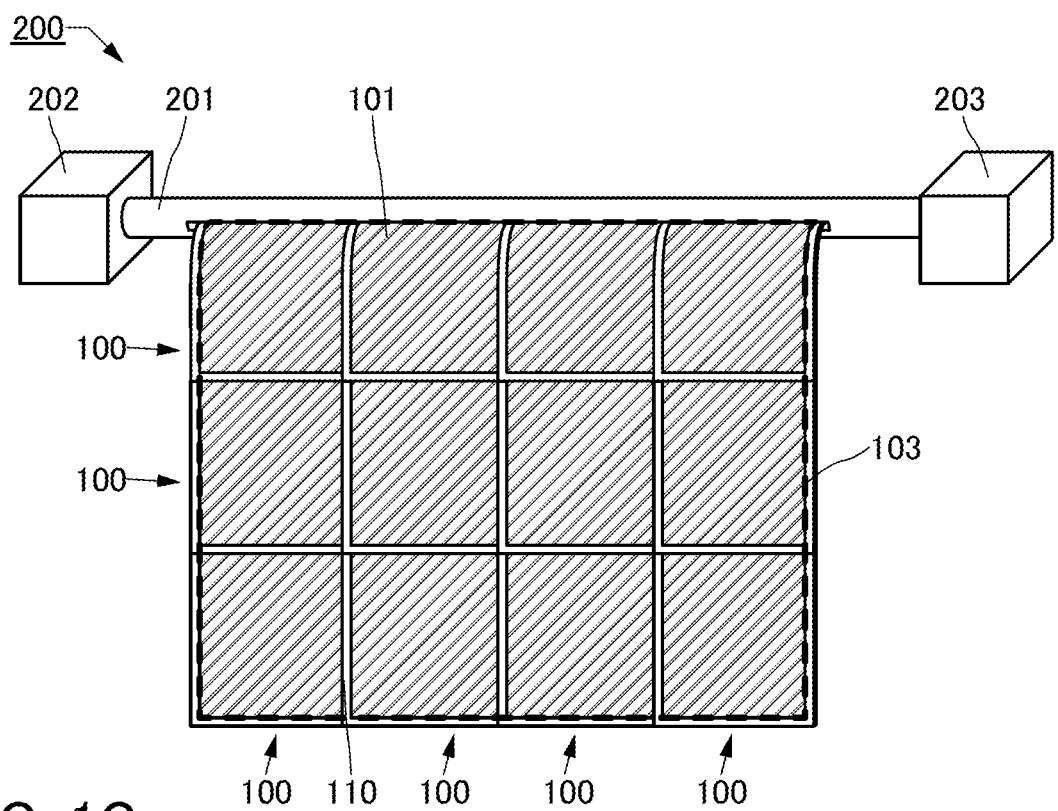

FIGS. 1A and 1B show a structure example of a display device 200 of one embodiment of the present invention. The display device 200 includes a plurality of display panels 100, a shaft 201, a rotation mechanism 202, and a bearing 203.

Each of the plurality of display panels 100 is flexible. Adjacent display panels 100 partly overlap.

The display device 200 can change its shape between two modes: one mode in which the plurality of display panels 100 is wound up around the shaft 201 as shown in FIG. 1A and the other mode in which the plurality of display panels 100 is suspended from the shaft 201 as shown in FIG. 1B. The display device 200 shown in FIG. 1B includes twelve display panels 100 in total (three in height and four in width).

When the display device 200 is used, the mode in which the plurality of display panels 100 is suspended from the shaft 201 is selected so that still images and moving images can be displayed on the large screen. When the display device 200 is not used, the mode in which the plurality of display panels 100 is wound up around the shaft 201 is selected so that compactly. In addition, the size of a displayed image can be changed depending on its use by adjusting the amount of the plurality of display panels 100 pulled down.

Examples of a device capable of projecting moving images onto a large screen include a projection device, such as a projector with which images are projected on a white screen. When the projector is used, a screen is necessary as well as the projector itself. In order to project a large-sized image onto the screen, the distance between the projector and the screen needs to be several meters (e.g., greater than or equal to 2 m and less than or equal to 5 m); thus, a projection device is unfit for home use or use in a small room. Furthermore, when the brightness around a projection device is high, the contrast of a projected image is decreased by the influence of light reflected by the screen. In addition, distortion of a projected image might be caused depending on positional relationship between the screen and the projector.

The display device 200 of one embodiment of the present invention, however, can display an image or video by itself and can be preferably used in home and the like with space restriction. In addition, there is no danger of image distortion, and contrast decrease due to high brightness rarely occur in the display device 200, so that an image or video can be projected and displayed with high quality. A light source, such as a lamp, is necessary to a projection device, while it is not necessary to the display device 200; thus, power consumption can be reduced, there is no danger of heat generation, and there is no need to replacement of light sources. Accordingly, the display device 200 of one embodiment of the present invention which has high reliability can be obtained at low running cost.

The thickness of each of the plurality of display panels 100 can be, for example, greater than or equal to 10 μm and less than or equal to 5 mm, preferably greater than or equal to 20 μm and less than or equal to 4 mm, further preferably greater than or equal to 30 μm and less than or equal to 3 mm, typically greater than or equal to 40 μm and less than or equal to 1 mm. As the thickness of the display panel 100 is decreased, the size of the display device 200 in the mode in which the display panels 100 are wound up is reduced. On the other hand, if the thickness is too small, the display panels 100 suspended from the shaft 201 are easily influenced by the wind and the like and also might be reduced in mechanical strength. To prevent the display panels 100 from being swung in the wind, a flexible protection sheet or the like is bonded to each of the display panels 100 so that each of the display panels 100 has a moderate thickness of more than or equal to 0.5 mm and less than or equal to 5 mm in total.

The great decrease in thickness of the display panels 100, the use of a flexible member for the display panels 100, and the like allows the weight of the display panels 100 to be extremely small. The weight of the display panel 100 per displaying area of 100 cm$^2$ can be more than or equal to 0.1 g and less than or equal to 50 g, preferably more than or equal to 0.1 g and less than or equal to 30 g, further preferably more than or equal to 0.1 g and less than or equal to 10 g, still further preferably more than or equal to 0.1 g and less than or equal to 5 g.

The weight of the display panel 100 may denote the weight of the display panel 100 itself (i.e., a portion having a minimum function of displaying images; e.g., a pair of substrates including an element and the like). The weight of the display panel 100 may also include the weight of a member for securing the strength of the display panel 100, such as a sheet or a frame, the weight of a flexible printed circuit (FPC), a wiring, a connecter, and the like which are connected to the display panel 100. The use of such lightweight display panels 100 allows the weight of the display device 200 to be equal to or less than that of a screen of a projection device described above.

Each of the display panels 100 includes a display region 101. Images can be displayed on the display region 101. Each of the display panels 100 includes a transparent portion 110 along the outline of the display region 101.

The transparent portion 110 of the upper display panel 100 of two adjacent display panels 100 overlapping with each other (i.e., the display panel 100 on the display surface side) overlaps with the display region 101 of the lower display panel 100.

In the example of FIG. 1B, the transparent portion 110 of the upper display panel 100 of two adjacent (both in the horizontal direction and in the vertical direction) display panels 100 overlaps with part of the transparent portion 110 of the lower display panel 100. Although the display panel 100 closest to the shaft 201 are located uppermost (the closest to the display side) in each row, the stacking order is not particularly limited to the example shown in FIG. 1B and the like.

At the overlapping portion of two display panels 100, an image displayed on the display region 101 of the lower display panel 100 on the side opposite to the display surface side can be seen through the transparent portion 110 of the upper display panel 100 on the display surface side. Consequently, the display device 200 can display one image over a plurality of display panels 100. In addition, the display device 200 can display a large and high-quality image thanks to the seamless adjacent display panels 100. A region surrounded by the broken line in FIG. 1B corresponds to a display region 103 of the display device 200.

The use of a plurality of relatively small display panels 100 for the display device 200 can achieve the high-yield fabrication. If all the display panels 100 are the same in type, display devices with different sizes of a display region can be easily fabricated by changing the number or arrangement of the display panels 100. As a result, addition of a product category and low-volume production in accordance with the needs of customers can be easier. It is also possible for manufacturers to separately sell the units of the display panel 100 so that users can customize the size and shape of the display region.

The number of pixels (also referred to as screen resolution) in the display region 103 of the display device 200 is the sum of pixels driven for displaying images in the display regions of the display panels 100. To set a predetermined number of pixels in the display region 103, a display region of the lower display panel 100 of two adjacent display panels 100 may be positioned so as to partly overlap with a display region of the upper display panel 100. Consequently, the display device 200 in which the number of pixels in the display region 103 meets user's demand and specifications in this manner can be provided.

Although a plurality of display panels 100 is used to provide the display device 200 with a large display region here, one continuous display panel 100 including a larger display region than the display region 101 of the display panel 100 shown in FIG. 1A or the like may be used. The continuous display panel 100 can have a uniform diameter size when wound owing to its seamless screen, for example.

The shaft 201 can fix one end of the display panel 100. A total of 12 display panels 100 are arranged in a matrix of 3 rows and 4 columns in FIG. 1B, in which case one end of each of the four display panels 100 on the shaft 201 side can be fixed by the shaft 201.

In addition, the shaft 201 includes part of an FPC or the like which is electrically connected to each display panel 100. A connector, a wiring, or the like which is electrically connected to the FPC is preferably provided in the shaft 201. Furthermore, a circuit for supplying a signal or a voltage to each display panel 100 is preferably provided in the shaft 201. One or more of an antenna, a wireless receiver, a wireless transmitter, a power supply line, a battery, a printed board (a circuit board) mounted with an IC such as an arithmetic device or a memory device, an external connection port, and the like may be provided in the shaft 201.

As the diameter of the shaft 201 is smaller, the diameter of the wound display panels 100 can be smaller as well, and the display panels 100 can thus be stored compactly. The diameter of the shaft 201 can be determined depending on the allowable curvature of the display panels 100. The diameter of the shaft 201 can be, for example, more than or equal to 0.1 mm and less than or equal to 50 mm, preferably more than or equal to 0.5 mm and less than or equal to 30 mm, further preferably more than or equal to 1 mm and less than or equal to 20 mm, still further preferably more than or equal to 2 mm and less than or equal to 10 mm. A bend of the shaft 201 under the weight of the display panels 100 can be avoided as long as the diameter of the shaft 201 is more than or equal to 0.1 mm. The shaft 201 with a diameter of less than or equal to 50 mm makes the display device 200 sufficiently compact when the display panels 100 are stored.

The rotation mechanism 202 can rotate the shaft 201. The bearing 203 can fix the shaft 201. In FIGS. 1A and 1B and the like, one end of the shaft 201 is fixed by the rotation mechanism 202 and the other is fixed by the bearing 203. Note that the bearing 203 may have a function of rotating the shaft 201, in which case the bearing 203 is synchronized with the rotation mechanism 202.

Adjustment of the amount of rotating the shaft 201 by the rotation mechanism 202 can appropriately change the amount of the display panels 100 rolled out, that is, the length of a part of the display region 103 used for displaying images.

As the rotation mechanism 202, for example, a gear and power, such as a motor, can be combined to rotate the shaft 201. In addition, an infrared receiver may be mounted on the rotation mechanism 202 so that a user can operate the rotation mechanism 202 using a remote controller or the like, which is particularly preferable when the display device 200 is mounted on a high wall or ceiling.

Figure 2A:
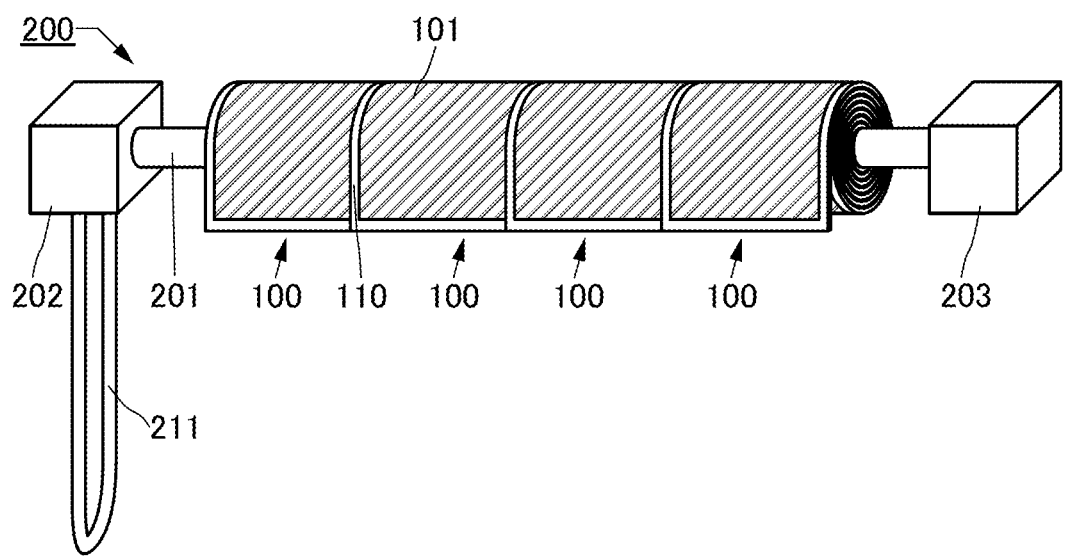
FIGS. 2A and 2B illustrate a structure example of a display device of one embodiment.

Alternatively, the shaft 201 may be rotated manually; for example, the rotation mechanism 202 has a cord 211 as shown in FIG. 2A. The shaft 201 is rotated by manipulating the cord 211, thereby rolling out and up the display panels 100.

Figure 2B:
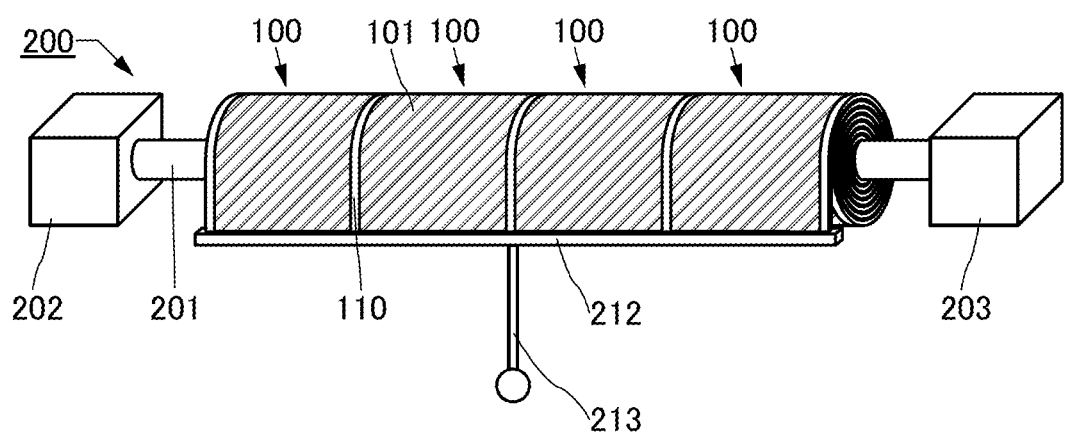

FIG. 2B shows another example in which a rod 212 having a cord 213 is placed along the plurality of display panels 100 at the lower end. The rotation mechanism 202 preferably includes a mechanism in which rotation of the shaft 201 is stopped stepwise in accordance with the amount of the plurality of display panels 100 rolled out, and a mechanism in which the shaft 201 is rotated so that the plurality of display panels 100 can be rolled up by manipulation of the cord 213 after the plurality of display panels 100 is completely rolled out. The rod 212 can serve as lord for preventing curling of the plurality of display panels 100 rolled out.

A wiring for supplying electric power and signals to the FPC and the like inside the shaft 201 is preferably provided between the rotation mechanism 202 and the shaft 201.

As a measure against a twist of the wiring for the prevention of breakage caused by rotation of the shaft 201, a wiring long enough to avoid breakage, a wiring pre-twisted in the direction opposite to the rotation direction, or the like is preferably used.

A mechanism in which electrical connection between the wirings between the rotation mechanism 202 and the shaft 201 is not cut is preferably provided at the connection portion thereof. For example, a rotary connector formed of liquid metal, such as mercury or gallium, and a slip ring having a brush electrode can be used. The rotary connector can solve problems caused by friction and thus is preferable.

Wireless transmission of signals and power may be employed between the rotation mechanism 202 and the shaft 201, in which case a wiring is not necessary or the number of wirings can be reduced. For example, a wireless transmitter and a wireless receiver may be mounted on the rotation mechanism 202 and in the shaft 201 for wireless signal transmission. Alternatively, a mechanism for contactless power transmission between the rotation mechanism 202 and the shaft 201 may be provided. Such a structure can eliminate the occurrence of problems, such as wiring breakage, and can prevent dangers and improve the reliability. As another example, signals and power may be supplied not from the rotation mechanism 202 but from another device to the shaft 201.

The bearing 203 may include a mechanism for supplying signals and power to the FPC or the like mounted in the shaft 201.

The rotation mechanism 202 and the bearing 203 preferably include a circuit for supplying signals and voltage to the shaft 201. Besides, one or more of an antenna, a wireless receiver, a wireless transmitter, a power supply line, a battery, a printed board mounted with an IC such as an arithmetic device or a memory device, an external connection port, and the like may be provided in the rotation mechanism 202 and the bearing 203.

Figure 1C:
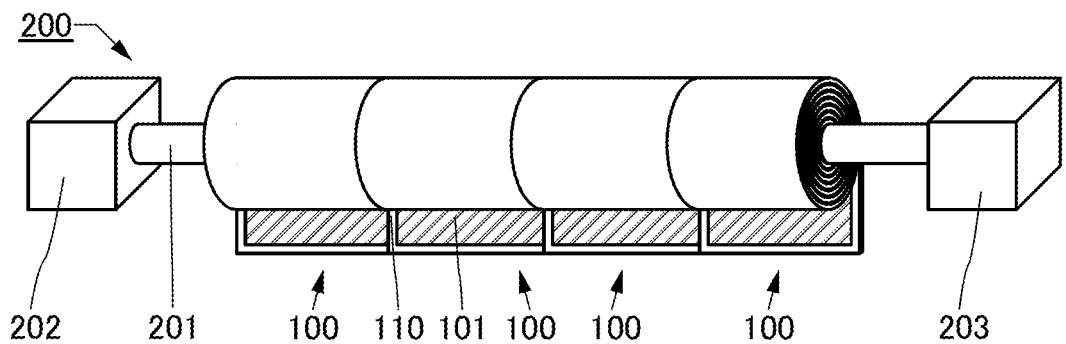

Although the plurality of display panels 100 in FIGS. 1A and 1B is wound around the shaft 201 so that the display surface side is on the outside, the plurality of display panels 100 may be wound around the shaft 201 so that the display region 101 is on the inside as shown in FIG. 1C, thereby keeping the display surface of the display panels 100 from contact with other members when stored.

Figure 3A:
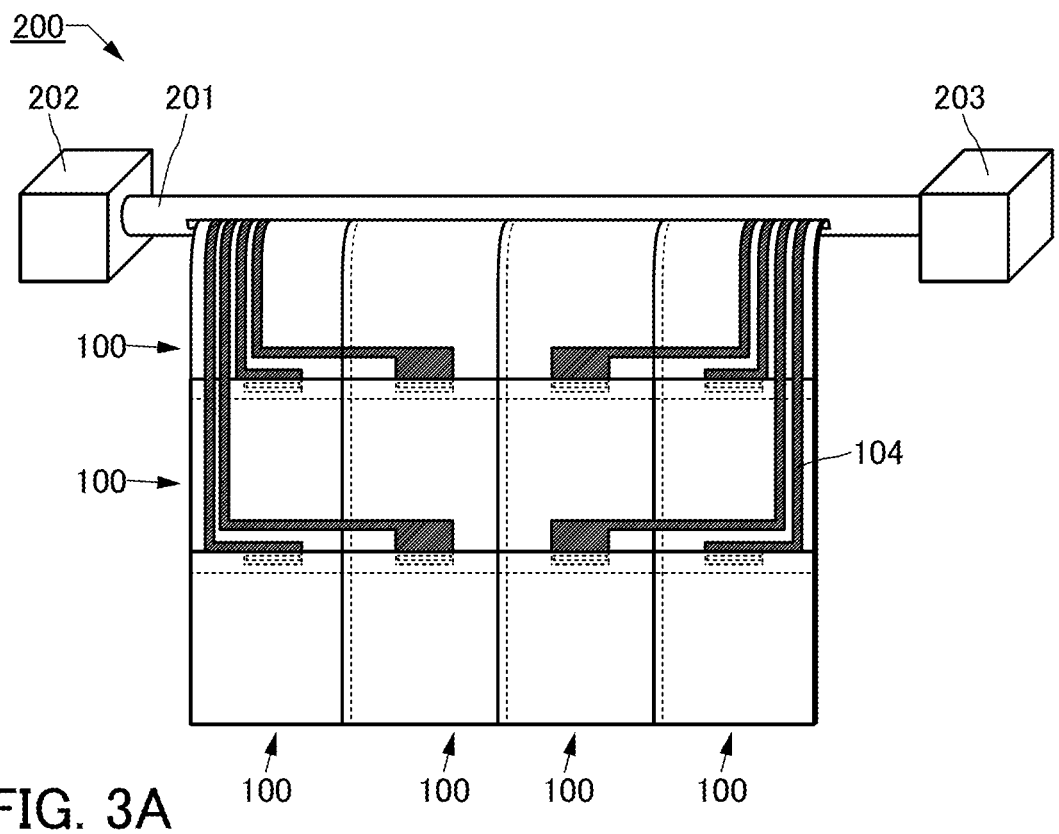
FIGS. 3A and 3B illustrate a structure example of a display device of one embodiment.

FIG. 3A shows an example of the back side (the side opposite to the display surface side) of the display device 200 in a state where the plurality of display panels 100 is rolled out.

An FPC 104 is electrically connected to each of the display panels 100. The FPC 104 electrically connected to the display panel 100 apart from the shaft 201 is along the back surface of a different display panel 100 closer to the shaft 201 than the display panel 100 and is electrically connected to the shaft 201. In other words, the FPC 104 includes a portion located on the side opposite to the display surface side of the neighboring display panel 100.

The shape and arrangement of each of the FPCs 104 are preferably designed as shown in FIG. 3A so that the plurality of FPCs 104 overlaps with each other. When the FPCs 104 do not overlap with each other, noise can be prevented from being transmitted therebetween and the display device 200 can maintain the display quality.

The noise is sometimes transmitted from the FPC 104 to the display panel 100 overlapping the FPC 104. To prevent it, a conductive member is preferably provided at least a region where the FPC 104 and the display panel 100 overlap. For example, a conductive film is formed on or a film having conductive properties is attached to the back surface of the display panel 100 or on the surface of the FPC 104 on the display panel 100 side. Further preferably, an insulating film is formed or a film having insulating properties is attached to the surface of the conductive film or the surface of the film having conductive properties so that their surfaces can be insulated.

The FPC 104 and the display panel 100 overlapping the FPC 104 are preferably bonded with each other to fix their relative position. This can prevent electrical disconnection caused by stress applied to the bonded portion (pressure-bonded portion) of the FPC 104 when the FPC 104 is pulled or twisted by rolling up or out the plurality of display panels 100. Here, the FPC 104 and the display panels 100 may be bonded by tape or the like, or a viscous sheet may be provided to each surface. Gel such as a silicone resin or the like is preferably used for the viscous sheet, in which case a change in the relative position of the FPC 104 and the display panels 100 can be prevented and occurrence of wrinkles can be prevented. The above-described influence of noise can also be prevented when the sheet has a function of absorbing electromagnetic waves.

Figure 3B:
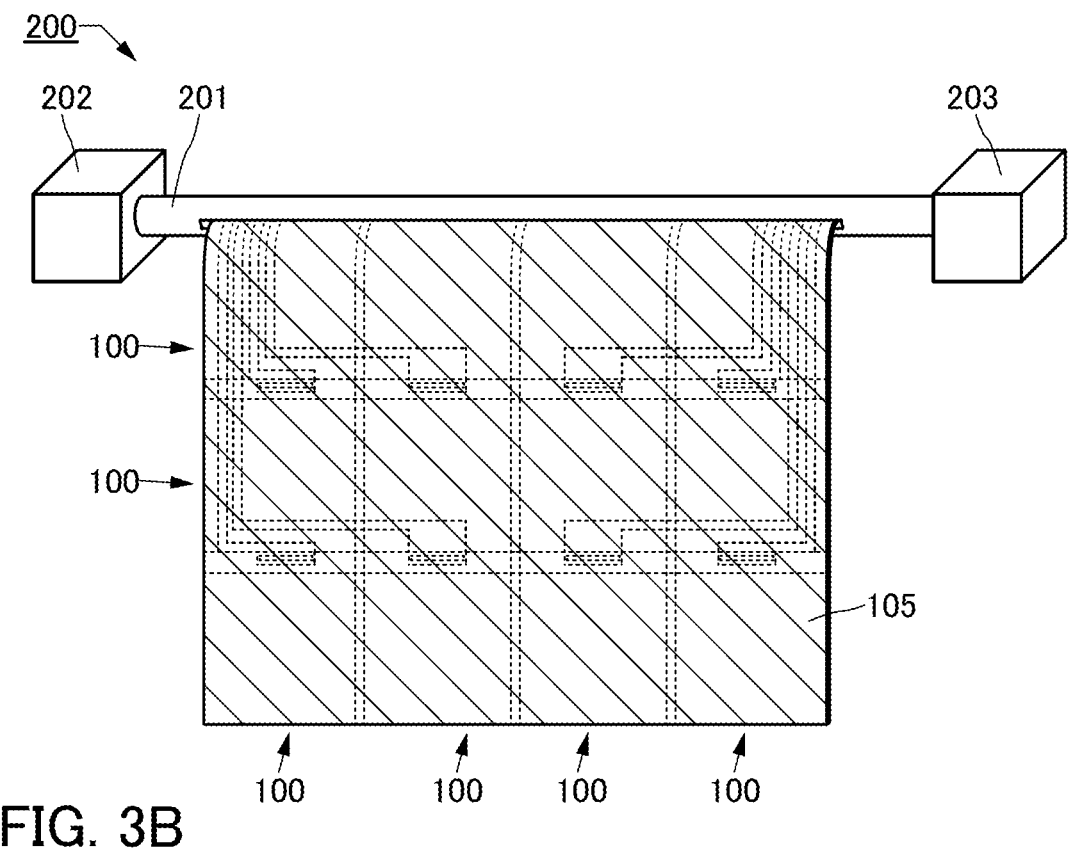

It is preferable to provide a flexible protective member 105 over the plurality of display panels 100 as shown in FIG. 3B to protect the back surface of the FPC 104 and the display panels 100. Examples of a material used for the protective member 105 include plastic, a metal, an alloy, paper, rubber, and a cloth of a natural fiber or a synthetic fiber. Alternatively, a flexible thin glass or the like may be used. When colors or the like are applied to the protective member 105 to have light-blocking properties, the FPC 104 and the like is less likely to be visually recognized, leading to high design properties.

The structure examples are described so far.

Application Example

Application examples of the display device of one embodiment of the present invention is used are described below.

Figure 4A:
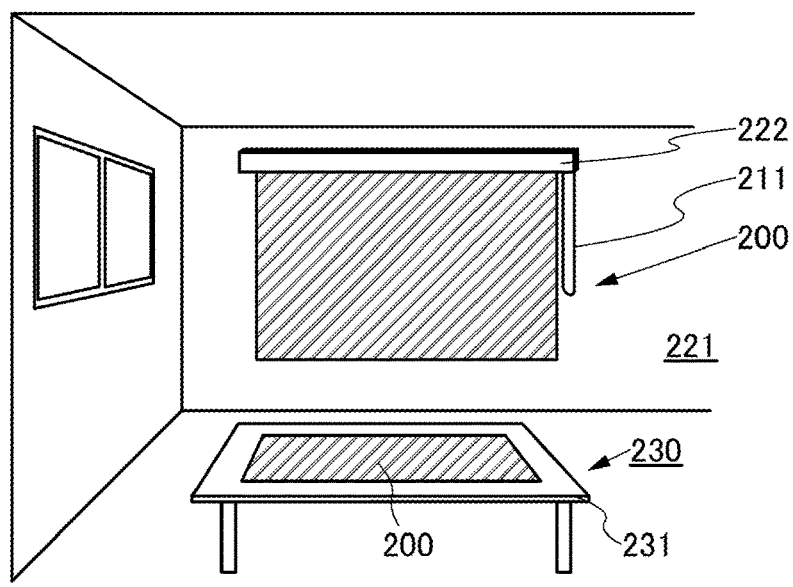
FIGS. 4A to 4D illustrate application examples of a display device of one embodiment.

FIG. 4A illustrates an example in which the display device 200 of one embodiment of the present invention is mounted on a wall 221 in a room.

The display device 200 shown in FIG. 4A has the cord 211 operating with the rotation mechanism 202 (not shown here). A display panel of the display device 200 can be rolled up and out using the cord 211.

Figure 4B:
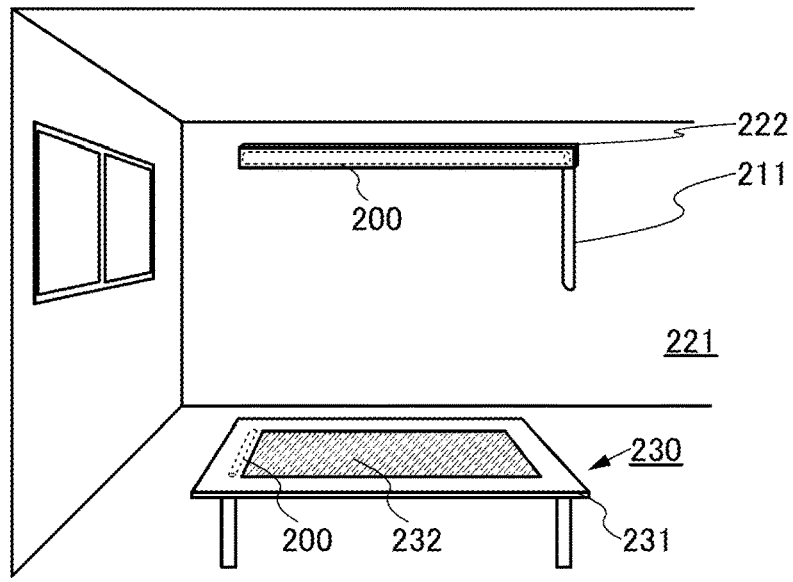

A cover 222 for storing the shaft 201, the rotation mechanism 202, the bearing 203, and the like (not shown here) is provided on the upper part of the display device 200. The rolled-up display panel of the display device 200 can be stored in the cover 222 as shown in FIG. 4B. The rolled display device 200 is entirely concealed by the cover 222 when not in use as shown in FIG. 4B, leading to neater interior design.

Figure 4C:
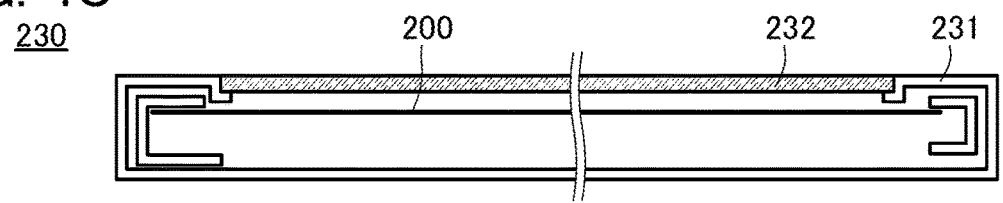
Figure 4D:
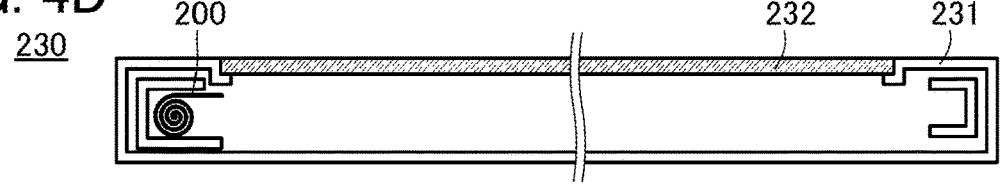

A table 230 including the display device 200, which is one embodiment of the present invention, is also shown in FIGS. 4A and 4B. FIGS. 4C and 4D are schematic cross-sectional views of the table 230.

The table 230 includes the display device 200 inside the housing 231. A transparent cover 232 is provided on the upper surface of the housing 231. The cover 232 can be formed of glass, plastic, or the like. When the display surface of the display device 200 is flat as illustrated in FIG. 4C, an image displayed on the display surface can be seen through the cover 232. When the display device 200 with the rolled-up display panel is stored when not in use in a portion which is not covered with the cover 232 as illustrated in FIG. 4D, the table 230 can be used as a usual table.

Figure 5A:
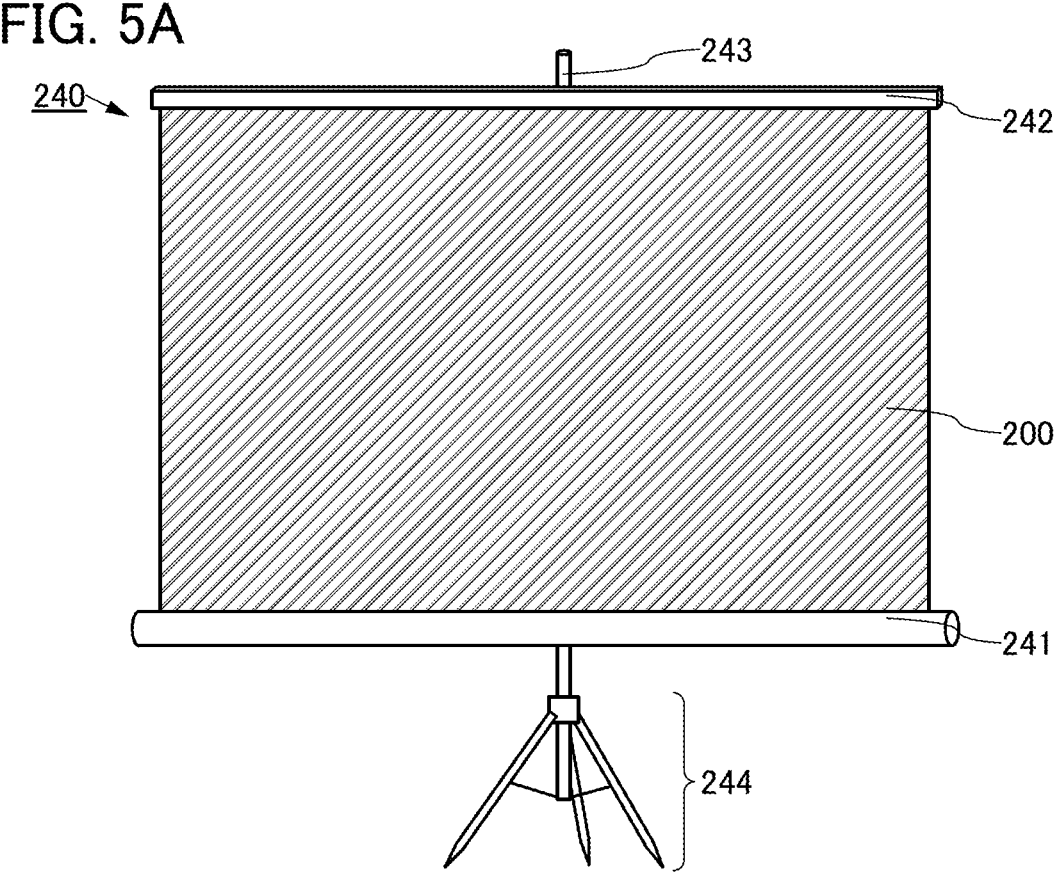
FIGS. 5A and 5B illustrate application examples of a display device of one embodiment.
Figure 5B:
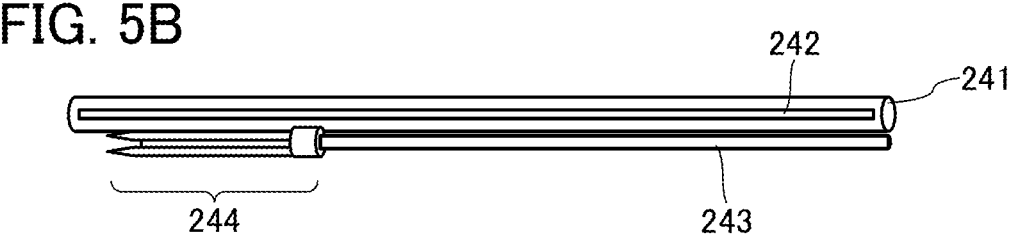

FIGS. 5A and 5B illustrate a portable display appliance 240 using the display device 200 of one embodiment of the present invention. The display appliance 240 includes the display device 200, a housing 241, a rod 242, a frame 243, and a leg 244. The display appliance 240 in FIG. 5A is in use and the one in FIG. 5B is not in use and rolled up.

The housing 241 includes the shaft 210, the rotation mechanism 202, the bearing 203, and the like (not illustrated).

The rod 242 is provided along the plurality of display panels 100 at the end. The rod 242 is pulled up from the housing 241 to roll out the display panel. The rod 242 and the frame 243 can be fixed to keep the display panel rolled up.

The housing 241 and the frame 243 are fixed to be parallel to each other and can be rotated 90°. The foldable leg 244 is mounted on the frame 243. Such a structure allows the display appliance 240 to be folded compactly as illustrated in FIG. 5B, which leads to high portability when not in use and display on large screen when in use.

The housing 241 and the frame 243 may be detachable; for example, the housing 241 is fixed to the frame 243 when the display appliance 240 is in use, and they are separated from each other to be stored in a case or the like when the display appliance 240 is not in use.

One or both of the frame 243 and the leg 244 may be extendable. The height of a display region can be adjusted by extending and contracting the frame 243. In addition, the display appliance 240 can be made more compact to be stored.

Although the rod 242 is pulled up from the housing 241 placed on the lower side in this example, the rod 242 may be pulled down from the housing 241 placed on the upper side, or the housing 241 and the rod 242 may be placed longitudinally so that the rod 242 is pulled out sideways.

A battery is preferably included in the housing 241, which allows the use in a place to which power cannot be drawn from a building, such as outdoors or a large hall.

The display device 200 mounted on the wall 221, the table 230, the display appliance 240, or the like preferably has a function of receiving images. For example, a television broadcast receiver (a tuner) may be incorporated so that television can be displayed on the display surface. A terminal for connecting the display device 200 with a reproducing device for a memory medium, such as a DVD, may be provided so that the image stored in the memory medium can be displayed. Internet images or moving images may be displayed on the display device 200 using a terminal, such as a universal serial bus (USB) terminal or an image terminal, wired or wireless local area network (LAN), or the like. The display device 200 may be connected with a computer, a portable information terminal, or the like through the terminal or network so that images output therefrom can be displayed on the display device 200.

The above is the description of the application examples.

Replacement of the display panel 100 capable of display with a light-emitting panel allows the display device 200 to be used as a lighting device. As a flexible light-emitting panel, a flexible substrate including a light-emitting element such as an organic EL element or the like can be used.

At least part of this embodiment can be implemented in combination with any of the embodiments described in this specification as appropriate.

Embodiment 2

This embodiment will describe structure examples of a display system of one embodiment of the present invention with reference to figures. The display device described in Embodiment 1 can be applied to the display system.

There is a method for using a plurality of display regions of display panels in the display devices arranged in a tile pattern as one display screen to provide a large screen.

A change in storage temperature and humidity of such a large screen including the display panels arranged and fixed in a tile pattern cause expansion and contraction of the tiled display panels, and external force is repeatedly applied to the display panels. As a result, the tiled display panels might change in their relative position.

The structure example shown below is a display system for compensating images with changes in the relative position of a plurality of display panels included in the display system, a display system which is suited to be grown in size, a display system whose display unevenness is reduced, an electronic device which is easy to view at a glance, or an electronic device which is easy to carry.

A display system according to one embodiment of the present invention includes a first display panel including a first display region, a second display panel including a second display region, a detection means, and a compensation means. Part of the first display region overlaps the second display region. The detection means has a function of detecting the size of a first region where the first display region overlaps with the second display region. The compensation means has a function of compensating an image displayed on the first display region.

The compensation means may further have a function of compensating an image displayed on the first and second display regions in accordance with the change in size of the first region.

Figure 6A:
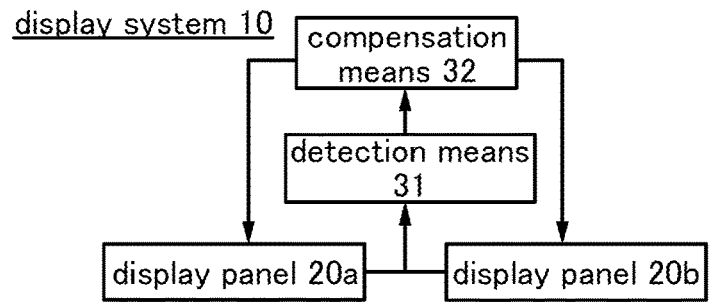
FIGS. 6A to 6D are block diagrams illustrating a display system of one embodiment.

FIG. 6A is a block diagram of a structure example of a display system 10. Arrows in the block diagram represent directions of transmitting data or signals.

The display system 10 in FIG. 6A includes a display panel 20a, a display panel 20b, a detection means 31, and a compensation means 32.

First, a structure example of the display device 20 included in the display system 10 is described with reference to FIGS. 7A1, 7A2, 7B1, 7B2, 7C1, and 7C2.

FIGS. 7A1, 7A2, 7B1, 7B2, 7C1, and 7C2 are schematic top views of the display device 20 included in the display system 10. The display device 20 includes the display panels 20a and 20b. The display panel 20a includes a display region 21a. The display panel 20b includes a display region 21b and a transparent portion 22b. The transparent portion 22b includes a region transmitting visible light. Although the display panels 20a and 20b have the same structure except for the presence of the transparent portion 22b in the display panel 20b, the structure should not be limited thereto. If the display panels 20a and 20b have the same structure, that is, the display panel 20a also includes the transparent portion similar to that of the display panel 20b, mass productivity of the display device 20 can be increased.

The display regions 21a and 21b each include a plurality of pixels arranged in matrix to display images. Each pixel includes one or more display elements. As the display element, for example, a light-emitting element such as an organic EL element, a liquid crystal element, or the like can be used. The display regions 21a and 21b each include a region not transmitting visible light as well.

A wiring electrically connecting with a pixel included in the display region 21a is provided for example in a region of the display panels 20a other than the display region 21a. In addition, a driver circuit for pixels, such as a scan line driver circuit, a signal line driver circuit, or the like may be provided. The same can be applied to a region of the display panel 20b other than the display region 21b and the transparent portion 22b. Note that a flexible printed circuit (FPC) for connecting the display panels 20a and 20b with an external device and the like is not shown in FIGS. 7A1, 7A2, 7B1, 7B2, 7C1, and 7C2.

The display panels 20a and 20b are preferably thin because a seam between the display regions 21a and 21b is less likely to be visually recognized. In addition, the display panels 20a and 20b are preferably flexible because the display device 20 can be rolled up to be portable.

Figures 1, 32A:
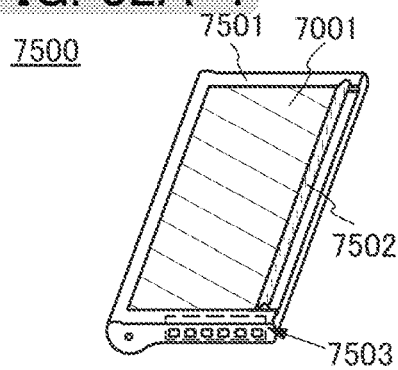

FIG. 7A1 shows an initial position of the display panels 20a and 20b of the display device 20. FIG. 7A2 shows a state where one seamless display image 15 is displayed on the display regions 21a and 21b. The display device 20 can display not only one seamless image as shown in FIG. 7A2 but also respective images on the display regions 21a and 21b. Note that a broken line in FIG. 7A2 denotes the boundary between the display regions 21a and 21b.

In FIG. 7A1, the display panel 20b partly overlaps the display panel 20a. The transparent portion 22b is adjacent to the display region 21b, and the display regions 21a and 21b arranged without space therebetween when seen from the display surface side enable the display device 20 to display a seamless large image.

The display region 21a overlaps the display region 21b in a region 11.

Next, a function of each component of the display system 10 is described.

When the display device 20 rolled to store is rolled out in the directions of arrows shown in FIG. 7B1, external force is applied to the display device 20 in the arrow directions. Sometimes the external force is similarly applied when the display device 20 is grasped. The external force repeatedly applied to the display device might cause a shift in position of the display panels 20a and 20b as shown in FIG. 7B1. However, the presence of the region 11 of the display device 20 leads to avoidance of a gap between the display regions 21a and 21b if such a shift in position occurs.

The display system 10 further includes the detection means 31 for detecting a change in the size of the display region in the display device 20 and the compensation means 32 for compensating the displayed image in accordance with the change. In other words, thanks to the display system 10, the display device 20 can display the image similar to that before even after the size of the display region of the display device 20 is changed. The display system of one embodiment of the present invention can thus perform highly reliable display. If the position of the display panels 20a and 20b is shifted by the change in storage temperature and humidity of the display device 20, the display device 20, which is one embodiment of the present invention, can perform image display similarly to that before the change.

A portion of the display region 21a overlapping the region 11 is in a non-display state, which leads to a reduction in power consumption of the display device 20. When part of visible light is absorbed or reflected by the transparent portion 22b, an image displayed on the display region 21a overlapping the transparent portion 22b is dark in some cases. However, when the luminance of the display region 21a overlapping the transparent portion 22b is set higher than that of the periphery of the region, the display device 20 can display the seamless display image 15 in which display unevenness is less likely to visually recognized.

FIG. 7B1 is a schematic top view of the display device 20 in the state where the display panels 20a and 20b are shifted in the adjacent direction of these panels (i.e., the X-axis direction in FIG. 7B1) from the state shown in FIG. 7A1. The region 11 in FIG. 7A1 corresponds to a region 11A in FIG. 7B1. The display region 21b overlapping the display region 21a is smaller than that in FIG. 7A 1. In addition, the position of the display region 21a overlapping the transparent portion 22b is shifted from the position in FIG. 7A1.

The detection means 31 (not shown) detects a change in the size of the region 11. The compensation means 32 (not shown) compensates an image displayed on the display region 21a and/or 21b in accordance with the change in size of the region 11.

The display compensation when the position of the display panels 20a and 20b shifts from FIG. 7A1 to FIG. 7B1 will be described specifically. A light-emitting portion is a part of the display region 21a (i.e., the region 11) not overlapping the display region 21b in FIG. 7B1 (i.e., a part of the region 11 other than the region 11A). The display luminance of a part of the display region 21a which is brighter than the periphery thereof in FIG. 7A1 (i.e., a part overlapping the transparent portion 22b in FIG. 7A1) is set equal to the display luminance of the periphery thereof, and the display luminance of part of the display region 21a overlapping the transparent portion 22b in FIG. 7B1 is set higher than that of the periphery thereof. Then, the size and aspect ratio of the displayed image 15 is changed in accordance with the total size of the light-emitting part of the display regions 21a and 21b.

In other words, compensation contents of a change of the light-emitting portion and the non-light-emitting portion in the display region 21a and/or 21b, determination of a region of the light-emitting portion whose display luminance is changed and the display luminance of the region, and a change in size and aspect ratio of an image displayed on the display device are contained in a signal generated by the compensation means 32.

The compensation means 32 generates a signal containing the above compensation contents and transmits the signal to the display panels 20a and 20b, so that the display system 10 can display a seamless image on the display device 20 regardless of a change in positional relation of the display panels 20a and 20b (see FIG. 7B2). FIG. 7B2 shows a state in which the display device 20 displays a display image 15A whose size and aspect ratio are changed from those of the display image 15.

FIG. 7C1 is a schematic top view of the display device 20 in the state where the display panels 20a and 20b are shifted in the direction intersect with the adjacent direction of these two panels (i.e., the Y-axis direction in FIG. 7C1) from the state shown in FIG. 7A1. The region 11 in FIG. 7A1 corresponds to a region 11B in FIG. 7C1. The display region 21b overlapping the display region 21a is smaller than that in FIG. 7A 1. Furthermore, a side of the display region 21a and a side of the display region 21b, which are on the same straight line in FIG. 7A1, are not aligned. In addition, the position of the display region 21a overlapping the transparent portion 22b is shifted from the position in FIG. 7A1.

The detection means 31 detects whether the size of the region 11 is changed. The compensation means 32 compensates an image displayed on the display region 21a and/or 21b in accordance with the change in size of the region 11.

The display compensation when the position of the display panels 20a and 20b shifts from FIG. 7A1 to FIG. 7C1 will be described specifically. A light-emitting portion is a part of the display region 21a (i.e., the region 11) not overlapping the display region 21b in FIG. 7C1 (i.e., a part of the region 11 other than the region 11B). The display luminance of a part of the display region 21a which is brighter than the periphery thereof in FIG. 7A1 (i.e., a part not overlapping the transparent portion 22b in FIG. 7C1 within a part of the region 21a overlapping the transparent portion 22b in FIG. 7A1) is set equal to the display luminance of the periphery thereof, and the display luminance of part of the display region 21a overlapping the transparent portion 22b in FIG. 7B1 is set higher than that of the periphery thereof. Then, part of the display region formed of the display regions 21a and 21b including the largest rectangle is regarded as a light-emitting portion, and the size and aspect ratio of the displayed image 15 is changed in accordance with the light-emitting portion. Finally, the display regions 21a and 21b other than the rectangle portion is regarded as a non-light-emitting portion.

The compensation means 32 generates a signal containing the above compensation contents and transmits the signal to the display panels 20a and 20b, so that the display system 10 can display a seamless image on the display device 20 regardless of a change in positional relation of the display panels 20a and 20b (see FIG. 7C2). FIG. 7C2 shows a state in which the display device 20 displays a display image 15B whose size and aspect ratio are changed from those of the display image 15.

Next, structure examples of the display system 10 are described with reference to FIGS. 6A to 6D.

The boxed components in the block diagrams are electrically connected to at least each other and may be included in the same housing.

Figure 6B:
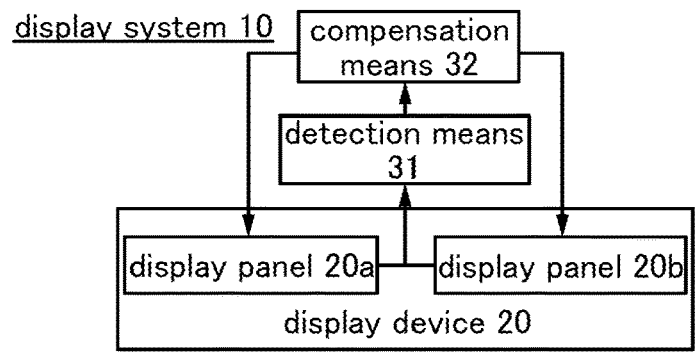

FIG. 6A shows an example of the display system 10 in which the display panels 20a and 20b, the detection means 31, and the compensation means 32 are included in different housings. FIG. 6B shows an example of the display system 10 in which the display panels 20a and 20b are stored in the same housing to serve as the display device 20. Note that the display panels 20a and 20b may be stored in different housings and serve as the display device 20.

The detection means 31 has a function of acquiring data about the position of the display panels 20a and 20b, specifically, detecting the size of the region 11 shown in FIG. 7A1 and the like. An imaging device, such as a digital camera, a charge coupled device (CCD) camera, or an image scanner, can be used as the detection means 31. Images displayed on the display device 20 can be taken by such an imaging device and output to the compensation means 32 as positional data.

Figure 6C:
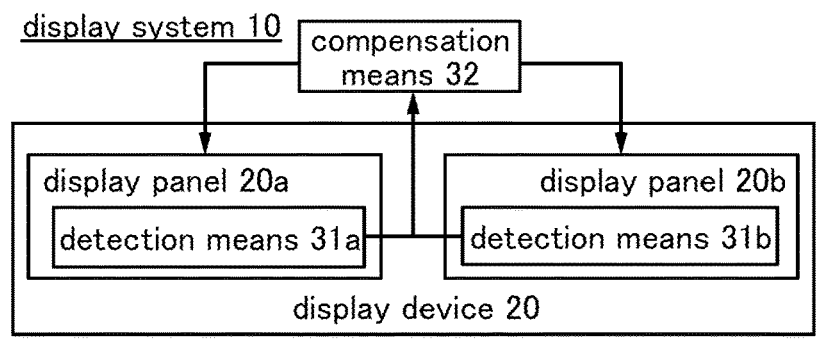

FIG. 6C is an example in which the detection means are included in the display panels. A photoelectric conversion element and an imaging pixel including a photoelectric conversion element and an imaging pixel circuit that drives the photoelectric conversion element can be used as detection means 31a and 31b included in the display panels.

External light does not enter pixels included in the region 11 of the display region 21a overlapping the display region 21b in FIG. 7A1 because it is blocked by the display region 21b, whereas external light enters pixels in regions of the display region 21a other than the region 11. The pixels included in the display region 21a include an imaging pixel serving as the detection means 31a and detect external light by the photoelectric conversion element included in the imaging pixel, and therefore can detect the change in the size of the region 11 with higher sensitivity.

In the region where the display region 21a overlaps the transparent portion 22b, part of external light that enters the pixels in the display region 21a is sometimes absorbed by the transparent portion 22b. Display luminance of the pixels in the display region 21a can thus be adjusted in accordance with the intensity of external light detected by the photoelectric conversion element. Note that a structure of a touch panel including the imaging pixel will be specifically described later.

The compensation means 32 has a function of receiving positional data detected by the detection means 31, a function of generating a signal (hereinafter, also referred to as a compensation signal) for compensating display on the display panel 20a and/or 20b in accordance with the change in the positional data, and a function of transmitting the compensation signal to the display panel 20a and/or 20b. An arithmetic device, such as a graphics processing unit (GPU) or a central processing unit (CPU), can be used as a device for generating compensation signals. Alternatively, a storage device storing a program by which the above compensation is executed by a computer and the computer capable of executing the program may be used.

Figure 6D:
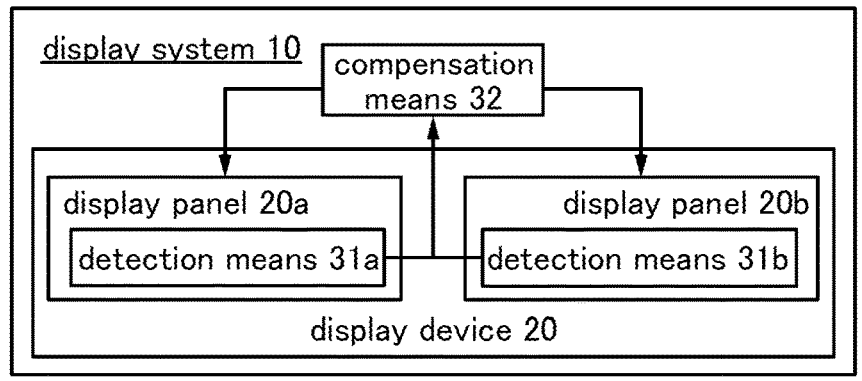

The compensation means 32 may be separated from the display panels and the detection means as shown in FIGS. 6A to 6C and may be electrically and/or physically connected to the display panels and the detection means in the display system 10 as shown in FIG. 6D. In addition, the compensation means 32 can receive data and transmit signals via either wire or wirelessly.

Modification Example 1

A display device described below is partly different from the display device 20 shown in FIGS. 7A1, 7A2, 7B1, 7B2, 7C1, and 7C2.

FIGS. 8A1, 8A2, 8B1, 8B2, 8C1, and 8C2 are schematic top views of a display device 25 included in the display system 10. Components of the display device 20 can be referred to for components of the display device 25 similar to those of the display device 20.

The display device 25 includes display panels 25a and 25b. The display panel 25a includes the display region 21a and an auxiliary display region 23a. The display panel 25b includes the display region 21b, the transparent portion 22b, and an auxiliary display region 23b. The display panel 25b does not necessarily include the auxiliary display region 23b.

The auxiliary display regions 23a and 23b each include a plurality of pixels arranged in matrix, thereby displaying images. One or more display elements are provided in each pixel. The auxiliary display regions 23a and 23b can display no images in the initial state of the display device 25. The detection means 31 has a function of displaying an image on parts of the auxiliary display region 23a and/or 23b in accordance with the change in the size of the region 11.

The auxiliary display region can be provided to be adjacent to a side of the display region. In FIG. 8A1, the auxiliary display region 23b is provided to be adjacent to three sides of the display region 21b. Although the auxiliary display region 23a of one embodiment of the present invention is provided to be adjacent to three sides of the display region 21a similarly to the auxiliary display region 23b, the auxiliary display region 23a may be provided to surround the display region 21a. For example, in the initial position between the display panels 25a and 25b, a part of the display region 21a overlapping the display region 21b (i.e., the region 11 in FIG. 8A1) serves as the auxiliary display region 23a, which leads to the reduction in power consumption of the display device 25.

The size of the auxiliary display region in the display panel can be determined in accordance with assumed change in relative position between the display panels 25a and 25b. For example, a coefficient of thermal expansion of a material of the substrate or the like included in the display panel is considered. When the relative position between the display panels 25a and 25b is changed, a user can determine the size of the auxiliary display region for the purpose and the like. In addition, the sizes of the auxiliary display regions 23a and 23b in the schematic top view of FIGS. 8A1, 8A2, 8B1, 8B2, 8C1, and 8C2 are exaggerated for purposes of illustration.

The length in a width direction of the auxiliary display region can be more than or equal to 50 µm and less than or equal to 50 mm, preferably more than or equal to 100 µm and less than or equal to 30 mm, further preferably more than or equal to 500 µm and less than or equal to 20 mm. The number of pixels arranged in the width direction of the auxiliary display region can be more than or equal to 1 and less than or equal to 100, preferably more than or equal to 5 and less than or equal to 80, further preferably more than or equal to 5 and less than or equal to 50.

In the case where the total size of the display region (including the display regions 21a and 23a) of the display panel 25a is 13.5 inches diagonal and the number of controllable pixels (including the pixels in the display region 21a and the auxiliary display region 23a) is 2560×1440, for example, the auxiliary display region 23a is provided so that the length of the width of the auxiliary display region 23a can be approximately 5 mm, that is, in a range of 25 pixels from each side of the display region.

FIG. 8A1 shows an initial position of the display panels 25a and 25b of the display device 25. FIG. 8A2 shows a state where one seamless display image 15 is displayed on the display regions 21a and 21b. The auxiliary display regions 23a and 23b are non-light-emitting regions in the initial state of the display device 25 (see FIG. 8A2).

FIG. 8B1 is a schematic top view of the display device 25 in the state where the display panels 25a and 25b are shifted in the adjacent direction of these panels (i.e., the X-axis direction in FIG. 8B1) from the state shown in FIG. 8A1. The region 11 in FIG. 8A1 corresponds to a region 11C in FIG. 8B1. The display region 25b overlapping the display region 25a is increased in size in the X-axis direction. In addition, the position of the display region 25a overlapping the transparent portion 22b is shifted from the position in FIG. 8A1.

The detection means 31 detects a change in the size of the region 11. The compensation means 32 compensates an image displayed on the display region 21a and/or 21b in accordance with the change in size of the region 11.

The display compensation contents generated by the compensation means 32 when the positional relation between the display panels 25a and 25b is changed from FIG. 8A1 to FIG. 8B1 is different from those when the positional relation between the display panels 20a and 20b is changed from FIG. 7A1 to FIG. 7B1. The difference is described below.

When the positional relation between the display panels 25a and 25b is changed, the compensation means 32 changes the regions of the light-emitting portion and the non-light-emitting portion in the display region and the auxiliary display region so that the initial display image 15 can be kept being displayed without changing the size and aspect ratio. In other words, there is no need to change the number of pixels (also referred to as the number of effective pixels) needed for the display device 20 to display the image before and after the positional change.

When the display device 25 is changed from the state shown in FIG. 8A1 to that in FIG. 8B1, the size of a display region of the display device 25 is reduced in the X-axis direction. Part of the auxiliary display region 23a and/or 23b is used as a light-emitting portion depending on the reduction in size, and the display device 25 can display the display image 15 whose size and aspect ratio is equal to those in FIG. 8A2 even in the state shown in FIG. 8B1 (see FIG. 8B2).

Since the display panels 25a and 25b includes the auxiliary display regions 23a and 23b surrounding the display region of the display device 25, the compensation means 32 can perform the above-described compensation. If the position of the display panels 25a and 25b is shifted by the change in storage temperature and humidity of the display device 25, the display device 25, which is one embodiment of the present invention, can keep displaying the same image. The display system of one embodiment of the present invention can accordingly perform highly reliable display.

FIG. 8C1 is a schematic top view of the display device 25 in the state where the display panels 25a and 25b are shifted in the direction intersect with the adjacent direction of these two panels (i.e., the Y-axis direction in FIG. 8C1) from the state shown in FIG. 8B1. The region 11 in FIG. 8B1 corresponds to a region 11D in FIG. 8C1. The size of the display region 21b overlapping the display region 21a is reduced in the Y-axis direction. Furthermore, a side of the display region 21a and a side of the display region 21b, which are on the same straight line in FIG. 8B1, are not aligned.

When the display device 25 is changed from the state of FIG. 8B1 to that of FIG. 8C1, the outline of the display region of the display device 25 is changed from a rectangle to an octagon. Thus, the compensation means 32 generates compensation contents in which the auxiliary display regions 23a and 23b adjacent to the display regions 21a and 21b in the Y-axis direction are used as a light-emitting portion so that the aspect ratio and the number of effective pixels can be equal to those of the display region before the change. Through the compensation, the display device 25 can display the display image 15 whose size and aspect ratio are equal to those in FIG. 8A2 even in the state of FIG. 8C1 (see FIG. 8C2).

Application Example 1

A display device 35 of one embodiment of the present invention has a plurality of display panels 36 in which display regions are arranged seamlessly. With the use of only part of the display regions of the display panels 36, the shape of the display region 37 of the display device 35 can be freely changed. Each display panel 36 includes a transparent portion 38 adjacent to the display region.

Figure 9A:
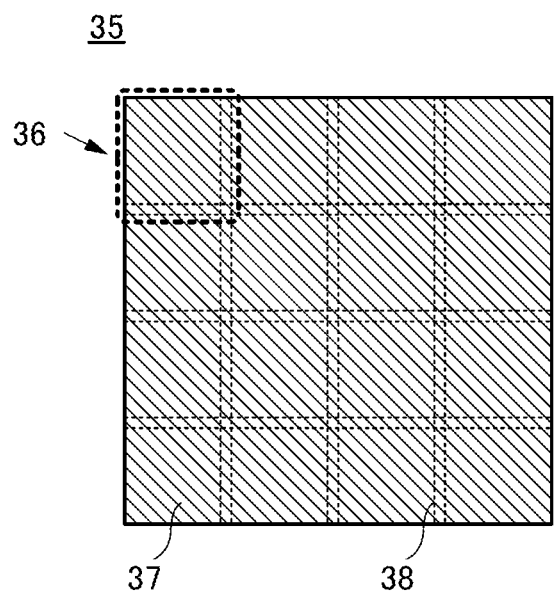
FIGS. 9A and 9B illustrate a display device of one embodiment.
Figure 9B:
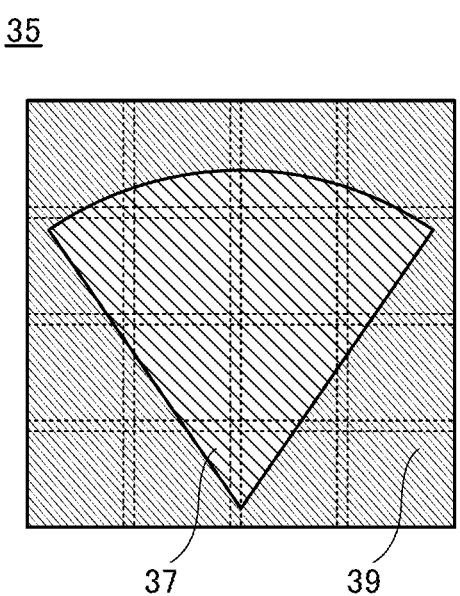

FIG. 9A shows an example in which an image is displayed on the entire display region of the display panels 36 and a large display region 37 is formed. FIG. 9B shows another example in which an image is displayed on only part of the display region of the display panels 36 so that the display region 37 of the display device 35 can have a fan shape. A region of the display device 35 other than the fan-shaped display region 37 is a non-display region 39.

The entire display regions of the display panels 36 entirely included in the display region 37 display part of an image. Display regions of the display panels 36 entirely included in the non-display region 39 do not display the image. Part of the display regions of the display panels 36 in which both of the display region 37 and the non-display region 39 are included display part of the image.

Such a structure can make the display region 37 to have free shapes even if the display panels 36 have similar shapes to each other. In other words, there is no need to change the design, process, and the like to make the display region 37 into a desirable shape; therefore, a display device including the free-shaped display region 37 using the same display panels.

To form the display region 37 having a free shape, part of a display region of each display panel 36 is operated to display an image. Here, the display panels 36 are operated so that an image is not displayed on other parts of display region of the display panels 36.

The system preferably includes the display device 35, a detection means, and a compensation means. Specifically, the compensation means preferably has a function of compensating shift of an image so that the image displayed on the display panels 36 can be seamlessly combined. In addition, it is preferable that the detection means for detecting shift of the image be included and the shift data be output from the detection means to the compensation means.

Application Example 2

Figure 10A:
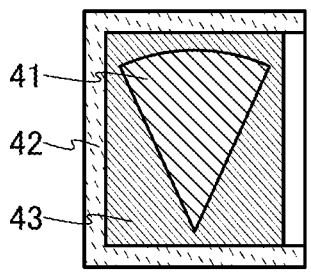
FIGS. 10A to 10F illustrate a display device of one embodiment.

FIG. 10A is a schematic top view of a display panel 45 included in a display device 40 which is one embodiment of the present invention. The display panel 45 includes a display region 41, a transparent portion 42, and an auxiliary display region 43. The transparent portion 42 is provided so as to be adjacent three sides of the display region 41.

In the initial state of display panel 45, the auxiliary display region 43 is in the non-light-emitting state. The display region 41 can serve as the auxiliary display region 43 as well. The auxiliary display region 43 can serve as the display region 41 as well. In other words, in the display panel 45, the display region 41 inside the outline of the auxiliary display region 43 shown in FIG. 10A can be freely changed in shape. The setting of the display region 41 and the auxiliary display region 43 can be included in compensation contents generated by the compensation means 32.

Figure 10B:
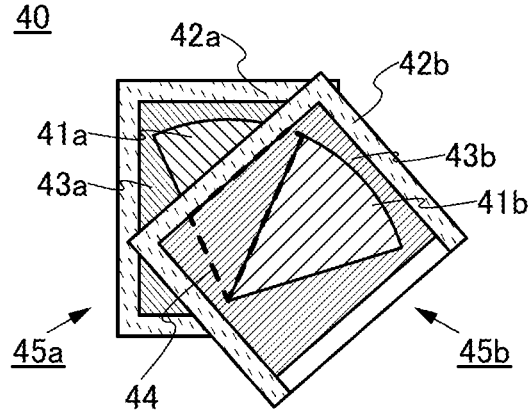
Figure 10C:
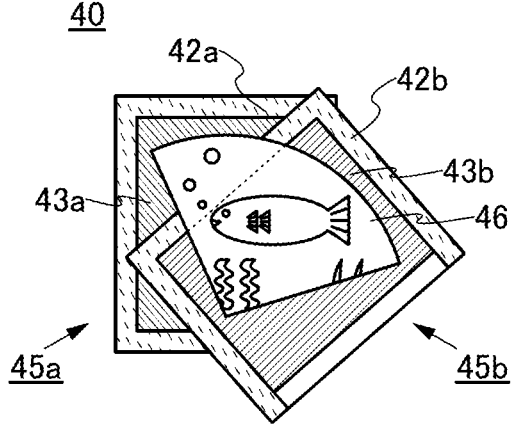

FIG. 10B is a schematic top view of the display device 40 including two display panels 45 shown in FIG. 10A. A display panel 45a overlaps a display panel 45b. In the initial state of the display panel 45b, the auxiliary display region 43b is in the non-light-emitting state. A region 44 overlapping the display region 41a is operated as a light-emitting portion, so that a seamless image 46 can be displayed on the display region of the display device 40 (see FIG. 10C).

The display surface of the display panel 45a and the surface of the display panel 45b opposite to its display surface may be bonded so as not to shift their relative position or may be fixed to be attachable thereto and detachable therefrom. When the display panels 45a and 45b are detachable, the display panels can be easily replaced. A film having attachability and the like can be used so that the display panels can be attachable thereto and detachable therefrom. The film having attachability has a function of removing the air between an object and the film to make a low-pressure state or a vacuum state, thereby being absorbed on the object. Alternatively, a film having viscosity may be used.

Also when the position of the display panels 45*a* and 45*b* is changed, that is, the size of the region 44 is changed, the display device 40 can keep displaying a seamless smooth image on the display region by the detection means 31 and the compensation means 32 of the display system 10, which is one embodiment of the present invention. Since the compensation means 32 has a function of freely changing the display regions 41*a* and 41*b* and the auxiliary display regions 43*a* and 43*b* of the display panel 45*a* and 45*b*, the display device 40 can perform display on a free-shaped display region.

Figure 10D:
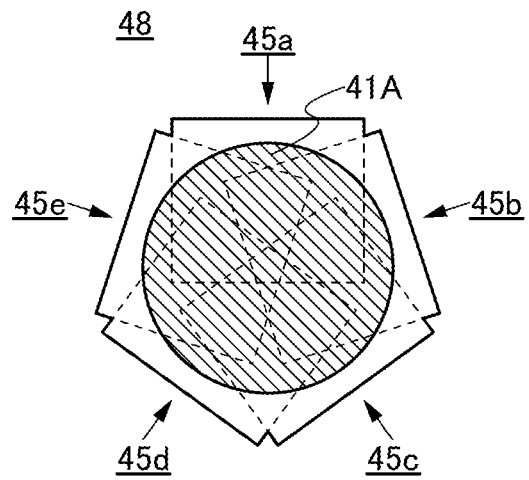
Figure 10E:
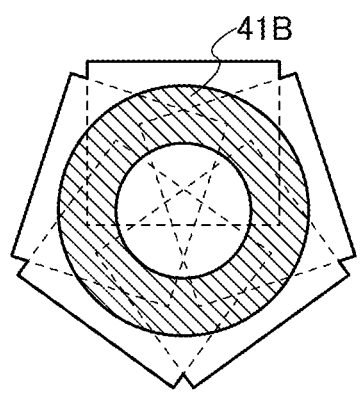

FIG. 10D is a schematic top view of a display device 48 including five display panels 45 (display panels 45*a* to 45*e*). The display region 41 of the display panel 45 in FIG. 10A is changed so that a circular display region 41A can be formed as shown in FIG. 10D, for example. A doughnut-shaped display region 41B as in FIG. 10E can be formed. Note that transparent portions and auxiliary display regions of the display panels 45*a* to 45*e* are not shown in FIGS. 10D to 10E.

Figure 10F:
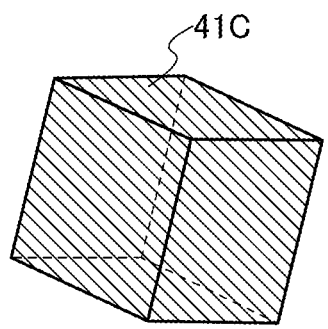

In the display system 10, the display region can have an elliptical shape, a polygonal shape, and any other two-dimensional shapes which can be formed on a flat surface by combination with a plurality of display panels 45. Without limitation to two-dimensional shapes, the display region can be seamlessly formed on the surface of a polyhedron, such as a tetrahedron and a hexahedron, and other three-dimensional shapes having a curved surface, such as a cone and a sphere. FIG. 10F is a perspective schematic view of a display device 49 including a hexahedron-shaped display region 41C.

For example, in this specification and the like, a display element, a display device which is a device including a display element, a light-emitting element, and a light-emitting device which is a device including a light-emitting element can employ a variety of modes or can include a variety of elements. A display element, a display device, a light-emitting element, or a light-emitting device includes, for example, at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, and a display element including a carbon nanotube. Other than the above, display media whose contrast, luminance, reflectivity, transmittance, or the like is changed by electrical or magnetic effect may be included. Examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers is stacked. As described above, provision of graphene or graphite enables easy formation of a nitride semiconductor film thereover, such as an n-type GaN semiconductor layer including crystals. A p-type GaN semiconductor layer including crystals or the like can be provided thereover, and thus the LED can be formed. Note that an MN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

In this specification and the like, an active matrix method in which an active element is included in a pixel or a passive matrix method in which an active element is not included in a pixel can be used, for example.

In an active matrix method, as an active element (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Since an active element (a non-linear element) is not used, the aperture ratio can be improved, so that power consumption can be reduced or higher luminance can be achieved, for example.

Note that an example of the case where a variety of display is performed using the display device is shown here; however, one embodiment of the present invention is not limited thereto. For example, data is not necessarily displayed. As an example, the display device may be used as a lighting device. By using the display device as a lighting device, it can be used as interior lighting having an attractive design. Alternatively, it can be used as lighting with which various directions can be illuminated. Further alternatively, it may be used as a light source, for example, a backlight, a front light, or the like. In other words, it may be used as a lighting device for the display panel.

At least part of this embodiment can be implemented in combination with any of the embodiments described in this specification as appropriate.

Embodiment 3

In this embodiment, structure examples and application examples of a display device of one embodiment of the present invention are described with reference to drawings.

Structure Example 1

Figure 11A:
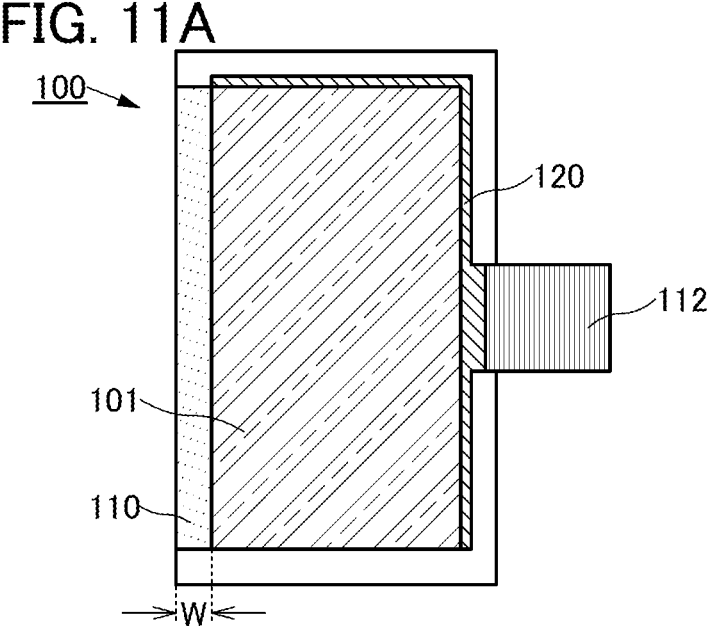
FIGS. 11A and 11B illustrate a display device of one embodiment.

FIG. 11A is a schematic top view of a display panel 100 included in a display device of one embodiment of the present invention.

The display panel 100 includes a display region 101, and a transparent portion 110 transmitting visible light and a region 120 blocking visible light that are adjacent to the display region 101. Furthermore, the display panel 100 is provided with a flexible printed circuit (FPC) 112 in the example illustrated in FIG. 11A.

The display region 101 includes a plurality of pixels arranged in matrix and can display an image. One or more display elements are provided in each pixel. As the display element, typically, a light-emitting element such as an organic EL element, a liquid crystal element, or the like can be used.

In the transparent portion 110, for example, a pair of substrates included in the display panel 100, a sealant for sealing the display element sandwiched between the pair of substrates, and the like may be provided. Here, for members provided in the transparent portion 110, materials that transmit visible light are used.

In the region 120, for example, a wiring electrically connected to the pixels included in the display region 101 is provided. In addition to the wiring, driver circuits (such as a scan line driver circuit and a signal line driver circuit) for driving the pixels may be provided. Furthermore, in the region 120, a terminal electrically connected to the FPC 112 (also referred to as a connection terminal), a wiring electrically connected to the terminal, and the like may be provided.

Figure 11B:
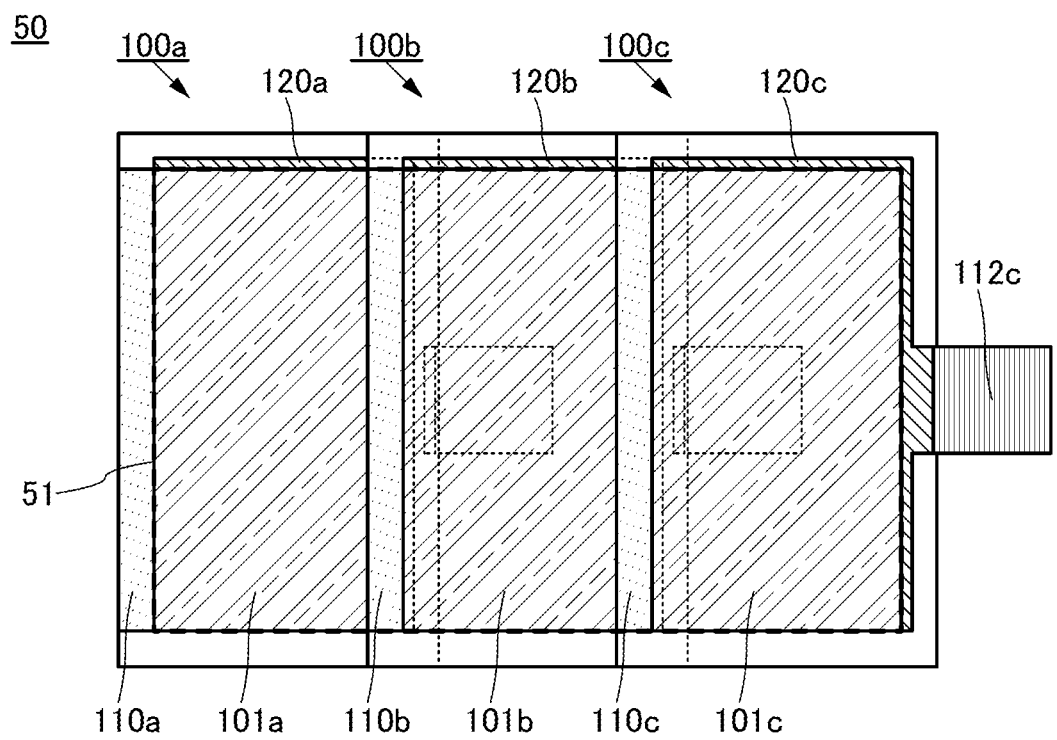

A display device 50 of one embodiment of the present invention includes a plurality of such display panels 100. FIG. 11B is a schematic top view of the display device 50 including three display panels.

Hereinafter, to distinguish the display panels from each other, the same components included in the display panels from each other, or the same components relating to the display panels from each other, letters are added to reference numerals. Unless otherwise specified, "a" is added to reference numerals for a display panel and components placed on the lowest side (the side opposite to the display surface side), and to one or more display panels and components placed thereover, "b" or letters after "b" in alphabetical order are added from the lower side. Furthermore, unless otherwise specified, in describing a structure in which a plurality of display panels is included, letters are not added when a common part of the display panels or the components is described.

The display device 50 in FIG. 11B includes a display panel 100a, a display panel 100b, and a display panel 100c.

The display panel 100b is placed so that part of the display panel 100b overlaps an upper side (a display surface side) of the display panel 100a. Specifically, the display panel 100b is placed so that a transparent portion 110b transmitting visible light of the display panel 100b overlaps part of a display region 101a of the display panel 100a, and the display region 101a of the display panel 100a and a region 120b blocking visible light of the display panel 100b do not overlap each other.

Furthermore, the display panel 100c is placed so that part of the display panel 100c overlaps an upper side (a display surface side) of the display panel 100b. Specifically, the display panel 100c is placed so that a transparent portion 110c transmitting visible light of the display panel 100c overlaps part of a display region 101b of the display panel 100b, and the display region 101b of the display panel 100b and a region 120c blocking visible light of the display panel 100c do not overlap each other.

The transparent portion 110b overlaps the display region 101a; thus, the whole display region 101a can be visually recognized from the display surface side. Similarly, the whole display region 101b can also be visually recognized from the display surface side when the transparent portion 110c overlaps the display region 101b. Therefore, a region where the display region 101a, the display region 101b, and the display region 101c are placed seamlessly (a region surrounded by a bold dashed line in FIG. 11B) can serve as a display region 51 of the display device 50.

Here, the width W of the transparent portion 110 in FIG. 11A is greater than or equal to 0.5 mm and less than or equal to 150 mm, preferably greater than or equal to 1 mm and less than or equal to 100 mm, and further preferably greater than or equal to 2 mm and less than or equal to 50 mm. The transparent portion 110 serves as a sealing region, and as the width W of the transparent portion 110 is larger, the distance between an end surface of the display panel 100 and the display region 101 can become longer, so that entry of an impurity such as water into the display region 101 from the outside can be effectively suppressed. In particular, in this structure example, the transparent portion 110 is provided adjacent to the display region 101; thus, it is important to set the width W of the transparent portion 110 at an appropriate value. For example, in the case where an organic EL element is used as the display element, the width W of the transparent portion 110 is set to be greater than or equal to 1 mm, whereby deterioration of the organic EL element can be effectively suppressed. Note that also in a part other than the transparent portion 110, the distance between the end portion of the display region 101 and the end surface of the display panel 100 is preferably in the above range.

Structure Example 2

In FIG. 11B, the plurality of display panels 100 overlap each other in one direction; however, a plurality of display panels 100 may overlap each other in two directions of the vertical and horizontal directions.

Figure 12A:
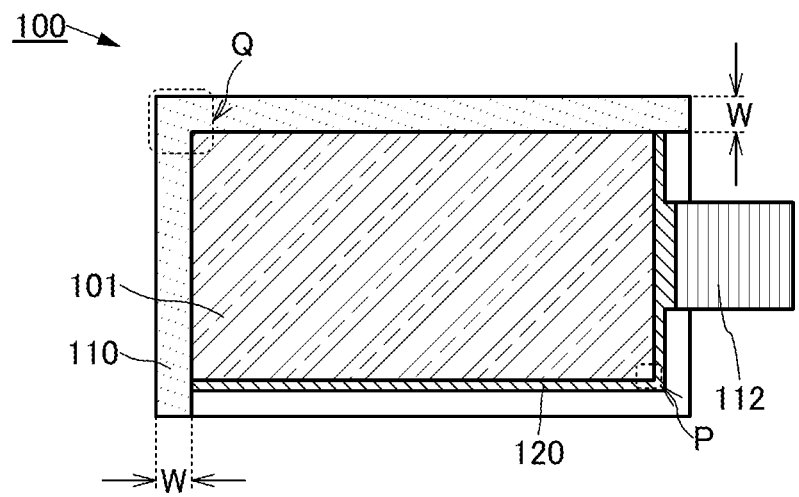
FIGS. 12A to 12C illustrate a display device of one embodiment.

FIG. 12A shows an example of the display panel 100 in which the shape of the transparent portion 110 is different from that in FIG. 11A. In the display panel 100 in FIG. 12A, the transparent portion 110 is placed along adjacent two sides of the display region 101.

Figure 12B:
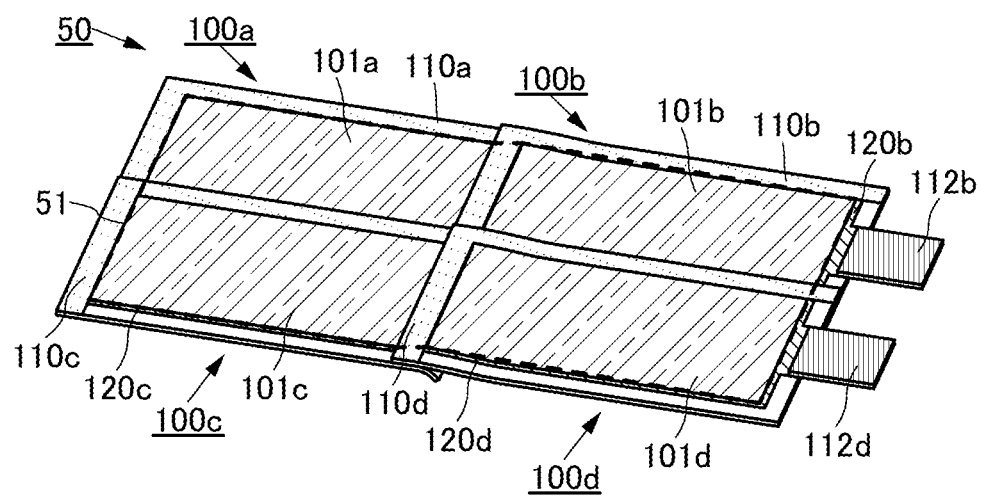
Figure 12C:
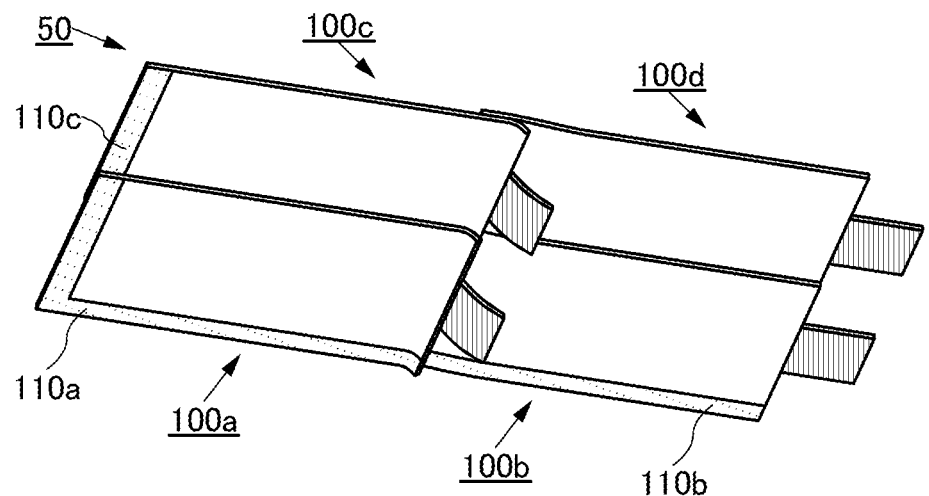

FIG. 12B is a schematic perspective view of the display device 50 in which the display panels 100 in FIG. 12A are arranged two by two in both vertical and horizontal directions. FIG. 12C is a schematic perspective view of the display device 50 when seen from a side opposite to the display surface side.

In FIGS. 12B and 12C, part of the transparent portion 110b of the display panel 100b overlaps a region along a short side of the display region 101a of the display panel 100a. In addition, part of the transparent portion 110c of the display panel 100c overlaps a region along a long side of the display region 101a of the display panel 100a. Moreover, the transparent portion 110d of the display panel 100d overlaps both a region along a long side of the display region 101b of the display panel 100b and a region along a short side of the display region 101c of the display panel 100c.

Therefore, as illustrated in FIG. 12B, a region where the display region 101a, the display region 101b, the display region 101c, and the display region 101d are placed seamlessly can serve as the display region 51 of the display device 50.

Here, it is preferable that a flexible material be used for the pair of substrates included in the display panel 100 and the display panel 100 have flexibility. Thus, as is the case of the display panel 100a in FIGS. 12B and 12C, part of the display panel 100a on the FPC 112a side is curved when the FPC 112a and the like are provided on the display surface side, whereby the FPC 112a can be placed under the display region 101b of the adjacent display panel 100b so as to overlap with the display region 101b, for example. As a result, the FPC 112a can be placed without physical interference with the rear surface of the display panel 100b. Furthermore, when the display panel 100a and the display panel 100b overlap and are bonded to each other, it is not necessary to consider the thickness of the FPC 112a; thus, the difference in height between the top surface of the transparent portion 110b of the display panel 100b and the top surface of the display region 101a of the display panel 100a can be reduced. As a result, the end portion over the display region 101a of the display panel 100b can be prevented from being visually recognized.

Moreover, each display panel 100 has flexibility, whereby the display panel 100b can be curved gently so that the top surface of the display region 101b of the display panel 100b and the top surface of the display region 101a of the display panel 100a are equal to each other in height. Thus, the heights of the display regions can be equal to each other except in the vicinity of the region where the display panel 100a and the display panel 100b overlap each other, so that the display quality of an image displayed on the display region 51 of the display device 50 can be improved.

Although, the relation between the display panel 100a and the display panel 100b is taken as an example in the above description, the same can apply to the relation between any two adjacent display panels.

Furthermore, to reduce the step between two adjacent display panels 100, the thickness of the display panel 100 is preferably small. For example, the thickness of the display panel 100 is preferably less than or equal to 1 mm, further preferably less than or equal to 300 µm, still further preferably less than or equal to 100 µm.

Figure 13A:
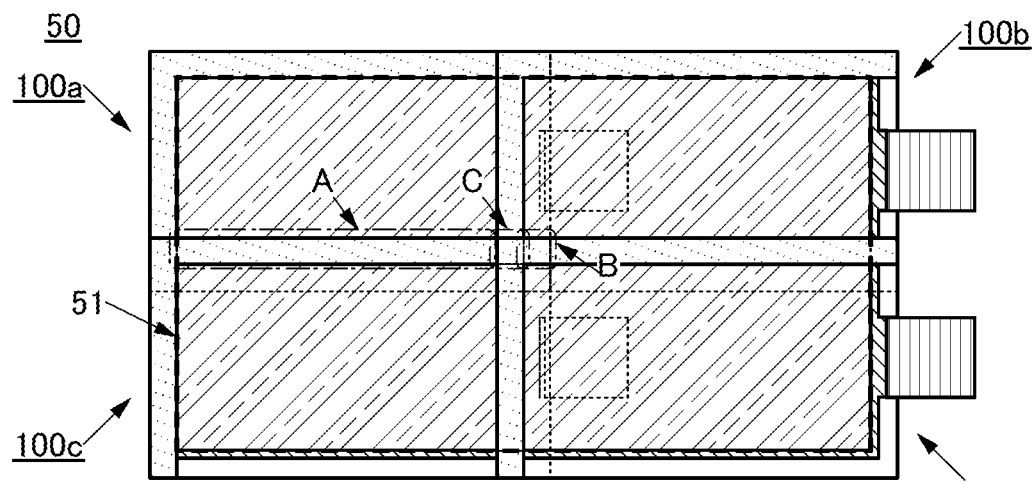
FIGS. 13A and 13B illustrate a display device of one embodiment.

FIG. 13A is a schematic top view of the display device 50 in FIGS. 12B and 12C when seen from the display surface side.

Here, when the transparent portion 110 of one display panel 100 does not have sufficiently high transmittance with respect to visible light (e.g., light with a wavelength of greater than or equal to 400 nm and less than or equal to 700 nm), luminance of a displayed image may be decreased depending on the number of display panels 100 overlapping the display regions 101. For example, in a region A in FIG. 13A, one display panel 100c overlaps the display region 101a of the display panel 100a. In a region B, the two display panels 100 (the display panels 100c and 100d) overlap the display region 101b of the display panel 100b. In a region C, the three display panels 100 (the display panels 100b, 100c and 100d) overlap the display region 101a of the display panel 100a.

In this case, it is preferable that data of the displayed image be corrected so that the gray scale of the pixels is locally increased depending on the number of display panels 100 overlapping the display regions 101. In this manner, a decrease in the display quality of the image displayed on the display region 51 of the display device 50 can be suppressed.

Alternatively, the position of the display panel 100 placed in the upper portion may be shifted, whereby the number of display panels 100 overlapping the display regions 101 of the lower display panels 100 can be reduced.

Figure 13B:
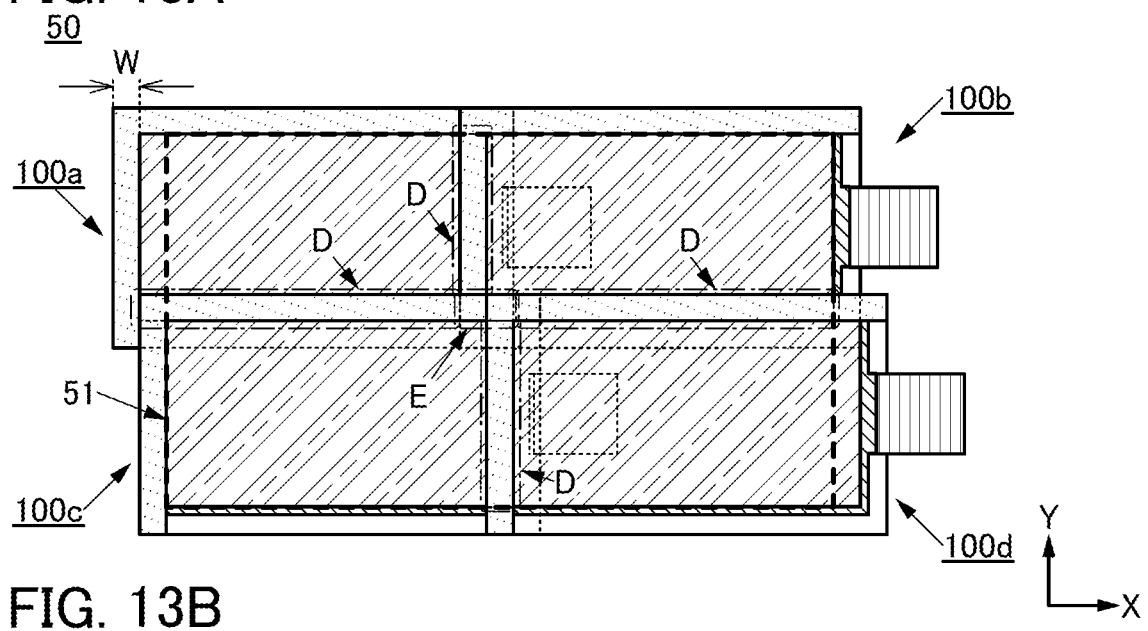

In FIG. 13B, the display panel 100c and the display panel 100d placed on the display panel 100a and the display panel 100b are relatively shifted in one direction (X direction) by the distance of the width W of the transparent portion 110. At this time, there are two kinds of regions: a region D in which one display panel 100 overlaps a display region 101 of another display panel 100, and a region E in which two display panels 100 overlap a display region 101 of another display panel 100.

Note that the display panel 100 may be relatively shifted in a direction perpendicular to the X direction (Y direction).

In the case where the display panel 100 placed in the upper portion is relatively shifted, the shape of the contour of a region in which the display regions 101 of the display panels 100 are combined is different from a rectangular shape. Thus, in the case where the shape of the display region 51 of the display device 50 is set to a rectangular shape as illustrated in FIG. 13B, the display device 50 may be driven so that no image is displayed on the display regions 101 of the display panels 100 that are placed outside the display region 51. Here, considering the number of pixels in a region where an image is not displayed, more pixels than the number obtained by dividing the number of all the pixels in the rectangular display region 51 by the number of display panels 100 may be provided in the display region 101 of the display panel 100.

Although the distance of relative shift of each display panel 100 is set to an integral multiple of the width W of the transparent portion 110 in the above example, the distance is not limited thereto, and may be set as appropriate in consideration of the shape of the display panel 100, the shape of the display region 51 of the display device 50, in which the display panels 100 are combined, and the like.

Cross-Sectional Structure Example

Figure 14A:
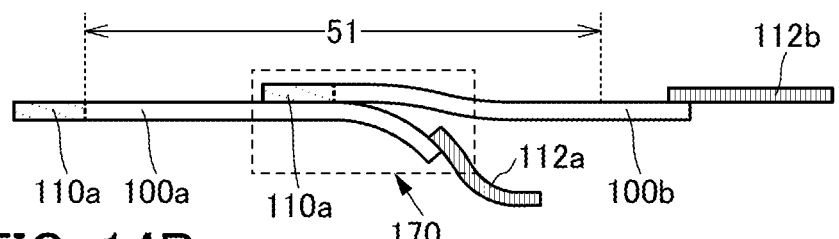
FIGS. 14A to 14D illustrate a display device of one embodiment.

FIG. 14A is a schematic cross-sectional view when the two display panels 100 are bonded to each other. In FIG. 14A, the FPC 112a and an FPC 112b are connected to the display panel 100a and the display panel 100b on the display surface side, respectively.

Figure 14B:
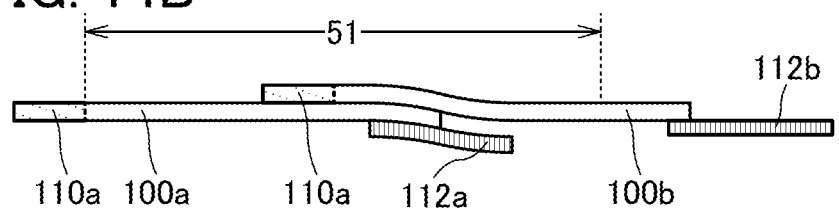

Alternatively, as illustrated in FIG. 14B, the FPC 112a and the FPC 112b may be connected to the display panel 100a and the display panel 100b on a side opposite to the display surface side, respectively. With this structure, the end portion of the display panel 100a positioned on the lower side can be attached to the rear surface of the display panel 100b; thus, the attachment area can be increased and the mechanical strength of the attached portion can be increased.

Figure 14C:
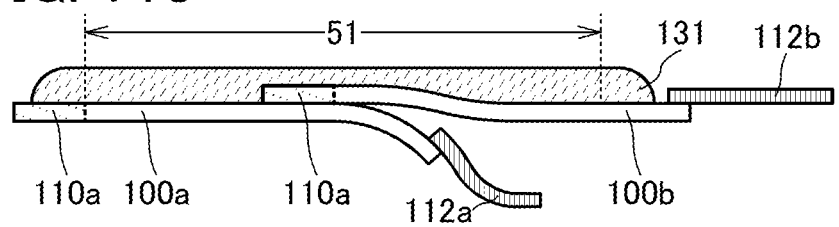
Figure 14D:
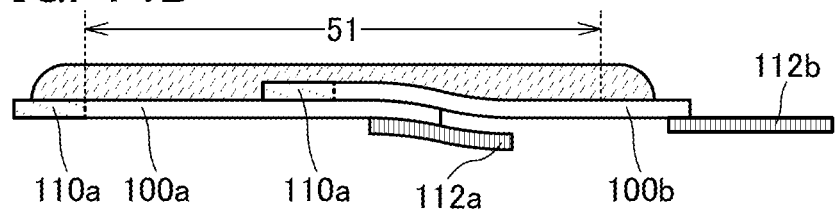

Alternatively, as illustrated in FIGS. 14C and 14D, a light-transmitting resin layer 131 may be provided to cover the top surfaces of the display panel 100a and the display panel 100b. Specifically, the resin layer 131 is preferably provided to cover the display regions of the display panels 100a and 100b and a region where the display panel 100a and the display panel 100b overlap.

By providing the resin layer 131 over the plurality of display panels 100, the mechanical strength of the display device 50 can be increased. In addition, the resin layer 131 is formed to have a flat surface, whereby the display quality of an image displayed on the display region 51 can be increased. For example, when a coating apparatus such as a slit coater, a curtain coater, a gravure coater, a roll coater, or a spin coater is used, the resin layer 131 with high flatness can be formed.

Furthermore, a difference in refractive index between the resin layer 131 and the substrate on the display surface side of the display panel 100 is preferably less than or equal to 20%, further preferably less than or equal to 10%, still further preferably less than or equal to 5%. By using the resin layer 131 having such a refractive index, the refractive index difference between the display panel 100 and the resin can be reduced and light can be efficiently extracted outside. In addition, the resin layer 131 with such a refractive index is provided to cover a step portion between the display panel 100a and the display panel 100b, whereby the step portion is not easily recognized visually, and the display quality of an image displayed on the display region 51 of the display device 50 can be increased.

As a material used for the resin layer 131, for example, an organic resin such as an epoxy resin, an aramid resin, an acrylic resin, a polyimide resin, a polyamide resin, or a polyamide-imide resin can be used.

Figure 15A:
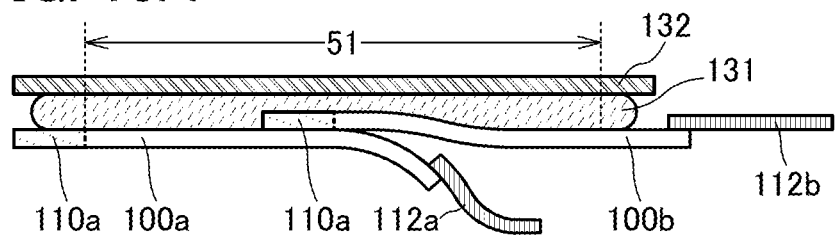
FIGS. 15A to 15D illustrate a display device of one embodiment.
Figure 15B:
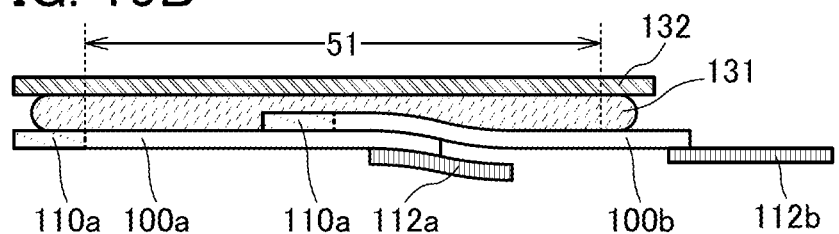

Alternatively, as illustrated in FIGS. 15A and 15B, a protective substrate 132 is preferably provided over the display device 50 with the resin layer 131 provided therebetween. Here, the resin layer 131 may serve as a bonding layer for bonding the protective substrate 132 to the display device 50. With the protective substrate 132, the surface of the display device 50 can be protected, and moreover, the mechanical strength of the display device 50 can be increased. For the protective substrate 132 in a region overlapping at least the display region 51, a light-transmitting material is used. Furthermore, the protective substrate 132 in a region other than the region overlapping the display region 51 may have a light-blocking property not to be visually recognized.

The protective substrate 132 may have a function of a touch panel. In the case where the display panel 100 is flexible and can be bent, the protective substrate 132 is also preferably flexible.

Furthermore, a difference in refractive index between the protective substrate 132 and the substrate on the display surface side of the display panel 100 or the resin layer 131 is preferably less than or equal to 20%, further preferably less than or equal to 10%, still further preferably less than or equal to 5%.

As the protective substrate 132, a plastic substrate that is formed as a film, for example, a plastic substrate made from polyimide (PI), an aramid, polyethylene terephthalate (PET), polyethersulfone (PES), polyethylene naphthalate (PEN), polycarbonate (PC), nylon, polyetheretherketone (PEEK), polysulfone (PSF), polyetherimide (PEI), polyarylate (PAR), polybutylene terephthalate (PBT), a silicone resin, and the like, or a glass substrate can be used. The protective substrate 132 is preferably flexible. The protective substrate 132 includes a fiber or the like (e.g., a prepreg). Furthermore, the protective substrate 132 is not limited to the resin film, and a transparent nonwoven fabric formed by processing pulp into a continuous sheet, a sheet including an artificial spider's thread fiber containing protein called fibroin, a complex in which the transparent nonwoven fabric or the sheet and a resin are mixed, a stack of a resin film and a nonwoven fabric containing a cellulose fiber whose fiber width is 4 nm or more and 100 nm or less, or a stack of a resin film and a sheet including an artificial spider's thread fiber may be used.

Figure 15C:
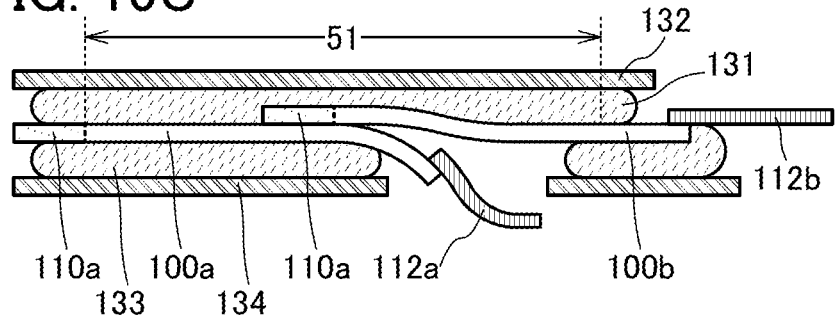
Figure 15D:
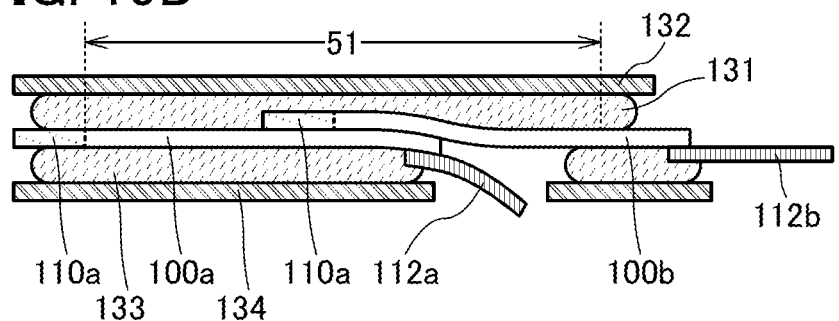

Alternatively, as illustrated in FIGS. 15C and 15D, a resin layer 133 may be provided on a surface opposite to the display surfaces of the display panel 100a and the display panel 100b, and a protective substrate 134 may be provided with the resin layer 133 provided between the protective substrate 134 and each of the display panels 100a and 100b. In this manner, the display panels 100a and 100b are sandwiched between the two protective substrates, whereby the mechanical strength of the display device 50 can be further increased. Furthermore, when the thicknesses of the resin layers 131 and 133 are substantially equal to each other, and for the protective substrates 132 and 134, materials having thicknesses which are substantially equal to each other are used, the plurality of display panels 100 can be located at the center of the stack. For example, when the stack including the display panel 100 is bent, by locating the display panel 100 at the center in the thickness direction, stress in the lateral direction applied to the display panel 100 by bending can be relieved, so that damage can be prevented.

As illustrated in FIGS. 15C and 15D, an opening for extracting the FPC 112a is preferably provided in the resin layer 133 and the protective substrate 134, which are located on the rear surface sides of the display panels 100a and 100b. At this time, by providing the resin layer 133 to cover part of the FPC 112a, the mechanical strength at a connection portion between the display panel 100a and the FPC 112a can be increased, and defects such as peeling of the FPC 112a can be suppressed. Similarly, the resin layer 133 is preferably provided to cover part of the FPC 112b.

Note that the resin layer 133 and the protective substrate 134, which are provided on the side opposite to the display surface, do not necessarily have a light-transmitting property, and a material which absorbs or reflects visible light may be used. When the resin layers 133 and 131, or the protective substrates 134 and 132 have the same materials, manufacturing cost can be reduced.

Structure Example of Display Region

Figure 16A:
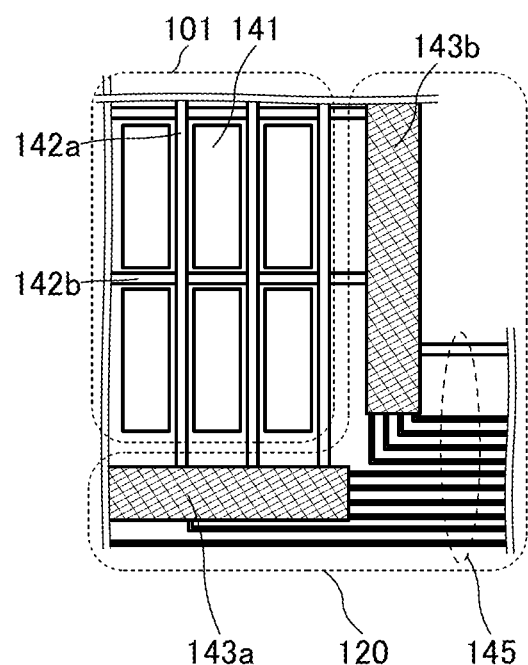
FIGS. 16A to 16C illustrate a display panel of one embodiment.
Figure 16B:
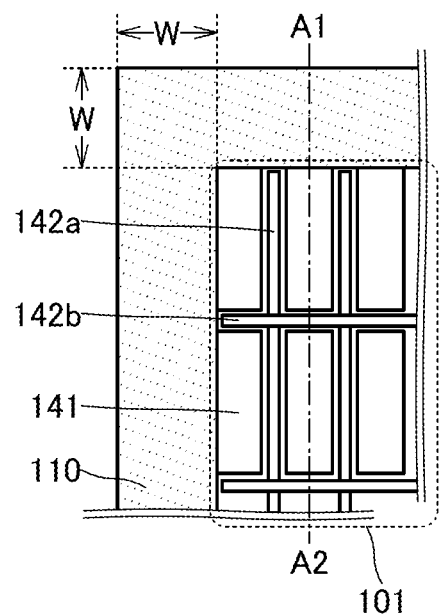

Next, a structure example of the display region 101 of the display panel 100 is described. FIG. 16A is a schematic top view in which a region P in FIG. 12A is enlarged, and FIG. 16B is a schematic top view in which a region Q in FIG. 12A is enlarged.

As illustrated in FIG. 16A, in the display region 101, a plurality of pixels 141 is arranged in matrix. In the case where the display panel 100 which is capable of full color display with three colors of red, blue, and green is formed, the pixel 141 can display any of the three colors. Alternatively, a pixel which can display white or yellow in addition to the three colors may be provided. A region including the pixels 141 corresponds to the display region 101.

A wiring 142a and a wiring 142b are electrically connected to one pixel 141. The plurality of wirings 142a each intersects with the wiring 142b, and is electrically connected to a circuit 143a. The plurality of wirings 142b is electrically connected to a circuit 143b. One of the circuits 143a and 143b can function as a scan line driver circuit, and the other can function as a signal line driver circuit. A structure without one of the circuits 143a and 143b or both of them may be employed.

In FIG. 16A, a plurality of wirings 145 electrically connected to the circuit 143a or the circuit 143b is provided. The wiring 145 is electrically connected to an FPC 123 in an unillustrated region and has a function of supplying a signal from the outside to the circuits 143a and 143b.

In FIG. 16A, a region including the circuit 143a, the circuit 143b, and the plurality of wirings 145 corresponds to the region 120 blocking visible light.

In FIG. 16B, a region outside the pixel 141 provided closest to the end corresponds to the transparent portion 110 transmitting visible light. The transparent portion 110 does not include the members blocking visible light, such as the pixel 141, the wiring 142a, and the wiring 142b. Note that in the case where part of the pixel 141, the wiring 142a, or the wiring 142b transmits visible light, the part of the pixel 141, the wiring 142a, or the wiring 142b may be provided to extend to the transparent portion 110.

Here, the width W of the transparent portion 110 indicates the narrowest width of the transparent portion 110 provided in the display panel 100 in some cases. In the case where the width W of the display panel 100 varies depending on the positions, the shortest length can be referred to as the width W. In FIG. 16B, the distance between the pixel 141 and the end surface of the substrate (that is, the width W of the transparent portion 110) in the vertical direction is the same as that in the horizontal direction.

Figure 16C:
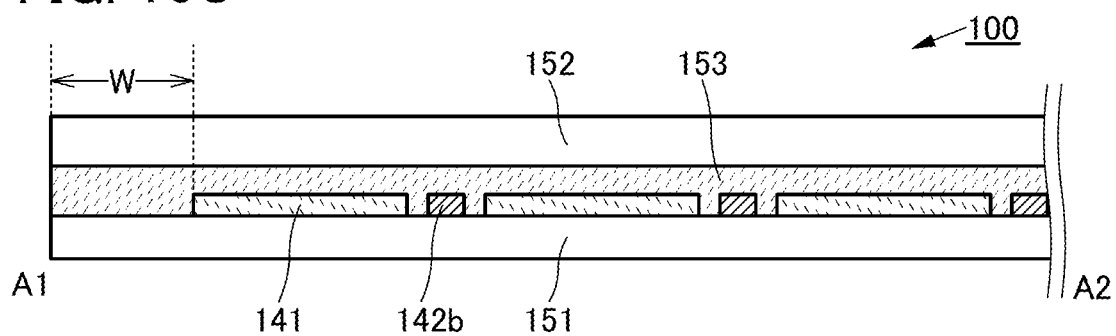

FIG. 16C is a schematic cross-sectional view taken along line A1-A2 in FIG. 16B. The display panels 100 include a pair of light-transmitting substrates (a substrate 151 and a substrate 152). The substrate 151 and the substrate 152 are bonded to each other with a bonding layer 153. Here, the substrate on which the pixel 141, the wiring 142b, and the like are formed is referred to as the substrate 151.

As illustrated in FIGS. 16B and 16C, in the case where the pixel 141 is positioned closest to the end of the display region 101, the width W of the transparent portion 110 transmitting visible light is the distance between the end portion of the substrate 151 or the substrate 152 and the end portion of the pixel 141.

Note that the end portion of the pixel 141 refers to the end portion of the member that is positioned closest to the end and blocks visible light in the pixel 141. Alternatively, in the case where a light-emitting element including a layer containing a light-emitting organic compound between a pair of electrodes (also referred to as an organic EL element) is used as the pixel 141, the end portion of the pixel 141 may be any of the end portion of the lower electrode, the end portion of the layer containing a light-emitting organic compound, and the end portion of the upper electrode.

Figure 17A:
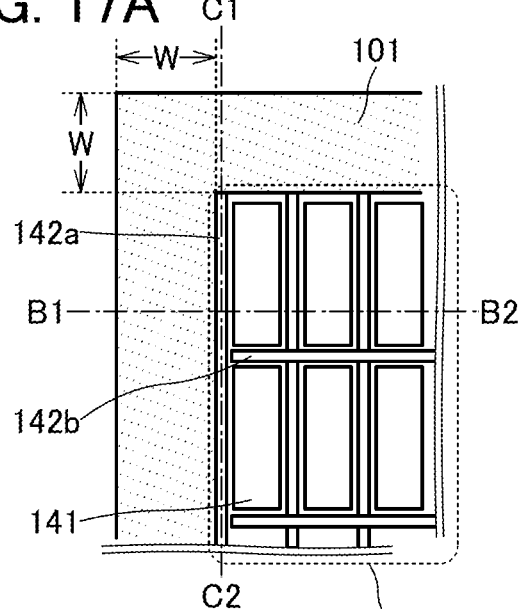
FIGS. 17A to 17C illustrate a display panel of one embodiment.
Figure 17B:
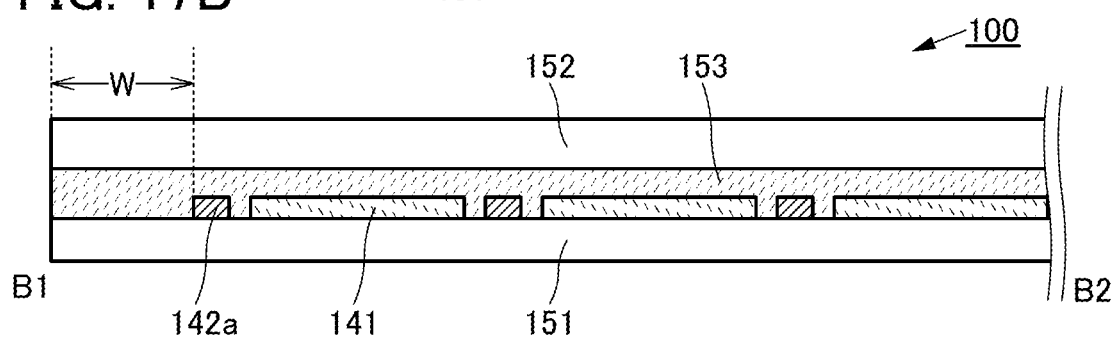

FIG. 17A shows the case where the position of the wiring 142a is different from that in FIG. 16B. FIG. 17B is a schematic cross-sectional view taken along line B1-B2 in FIG. 17A, and FIG. 17C is a schematic cross-sectional view taken along line C1-C2 in FIG. 17A.

Figure 17C:
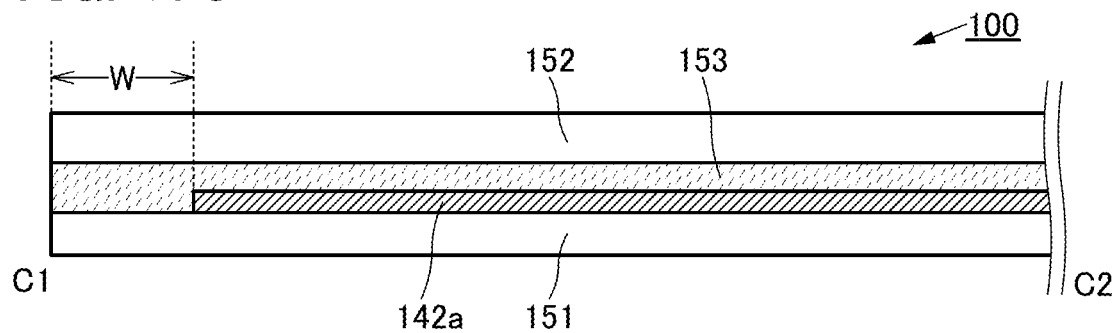

As illustrated in FIGS. 17A to 17C, in the case where the wiring 142a is positioned closest to the end of the display region 101, the width W of the transparent portion 110 transmitting visible light is the distance between the end portion of the substrate 151 or the substrate 152 and the end portion of the wiring 142a. In the case where the wiring 142a transmits visible light, the transparent portion 110 may include a region where the wiring 142a is provided.

Here, in the case where the density of pixels provided in the display region 101 of the display panel 100 is high, a portion where pixels are arranged discontinuously may be formed when the two display panels 100 are bonded or when there is a change in relative position of the two display panels described in the above embodiment.

Figure 18A:
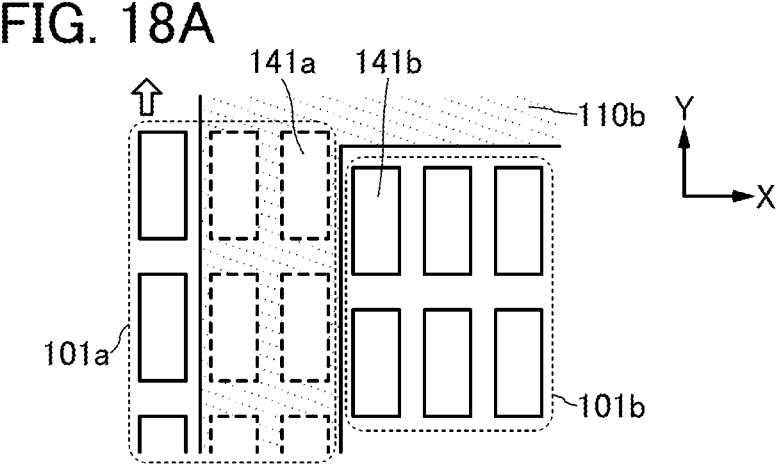
FIGS. 18A to 18C each illustrate a positional relationship between display panels of one embodiment.

FIG. 18A shows a positional relation between the display region 101a of the display panel 100a provided on the lower side and the display region 101b of the display panel 100b provided on the upper side, seen from the display surface side. FIG. 18A shows the vicinities of the corner portions of the display regions 101a and 101b. Part of the display region 101a is covered with the transparent portion 110b.

Figure 18B:
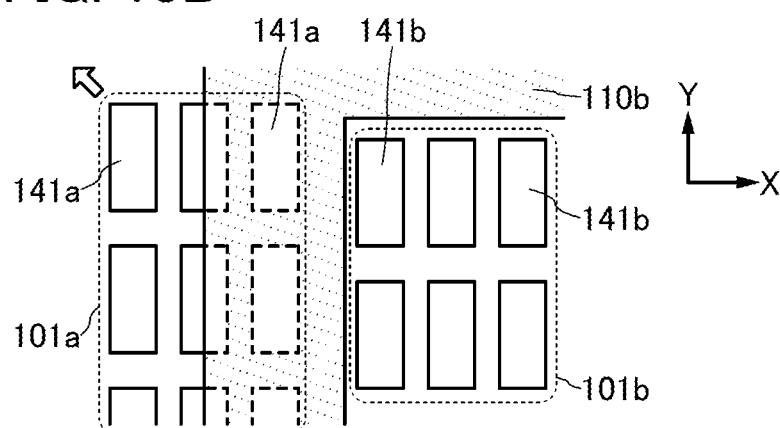

FIG. 18A shows an example in which adjacent pixels 141a and 141b are relatively deviated in one direction (Y direction). The arrow in the drawing denotes a direction in which the display panel 100a is deviated from the display panel 100b. FIG. 18B shows an example in which the adjacent pixels 141a and 141b are relatively deviated in a vertical direction and a horizontal direction (X direction and Y direction).

In the examples of FIGS. 18A and 18B, the distances deviated in the vertical direction and the horizontal direction are each shorter than the length of one pixel. In this case, image data of the image displayed on either one of the display regions 101a and 101b is corrected depending on the deviation distance, whereby the display quality can be maintained. Specifically, when the deviation makes the distance between the pixels smaller, the data is corrected so that the gray level (luminance) of the pixels is low, and when the deviation makes the distance between the pixels larger, the data is corrected so that the gray level (luminance) of the pixels is high. Alternatively, when the two pixels overlap, the data is corrected so that the pixel positioned on a lower side is not driven and the image data is shifted by one column.

Figure 18C:
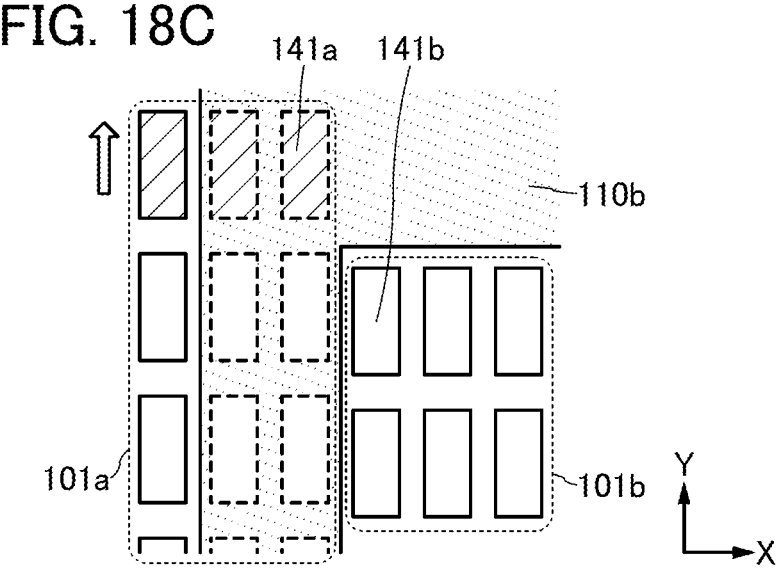

FIG. 18C shows an example in which the pixels 141a and 141b, which should be adjacent, are relatively deviated in one direction (Y direction) by a distance of more than one pixel. When the deviation of more than one pixel occurs, the pixels are driven so that projecting pixels (pixels which are hatched) are not displayed. Note that the same applies to the case where the deviation direction is the X direction.

When the plurality of display panels 100 are bonded, in order to suppress misalignment, each of the display panels 100 is preferably provided with an alignment marker or the like. Alternatively, a projection and a depression may be formed on the surfaces of the display panels 100, and the projection and the depression may be attached to each other in a region where the two display panels 100 overlap.

At least part of this embodiment can be implemented in combination with any of the embodiments described in this specification as appropriate.

Embodiment 4

In this embodiment, structure examples of a display panel which can be used in a display device of one embodiment of the present invention are described with reference to drawings.

Although a display panel mainly including an organic EL element is described in this embodiment as an example, a display panel which can be used in a display device of one embodiment of the present invention is not limited to this example. A light-emitting panel or a display panel including another light-emitting element or display element which will be described in Embodiment 1 as an example can also be used in a display device of one embodiment of the present invention.

Figure 19A:
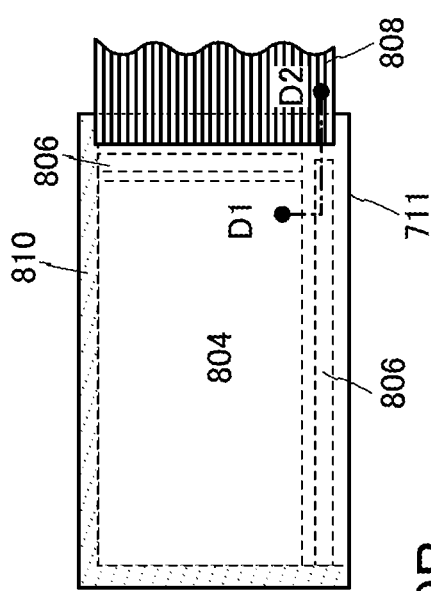
FIGS. 19A and 19B illustrate a display panel of one embodiment.
Figure 19B:
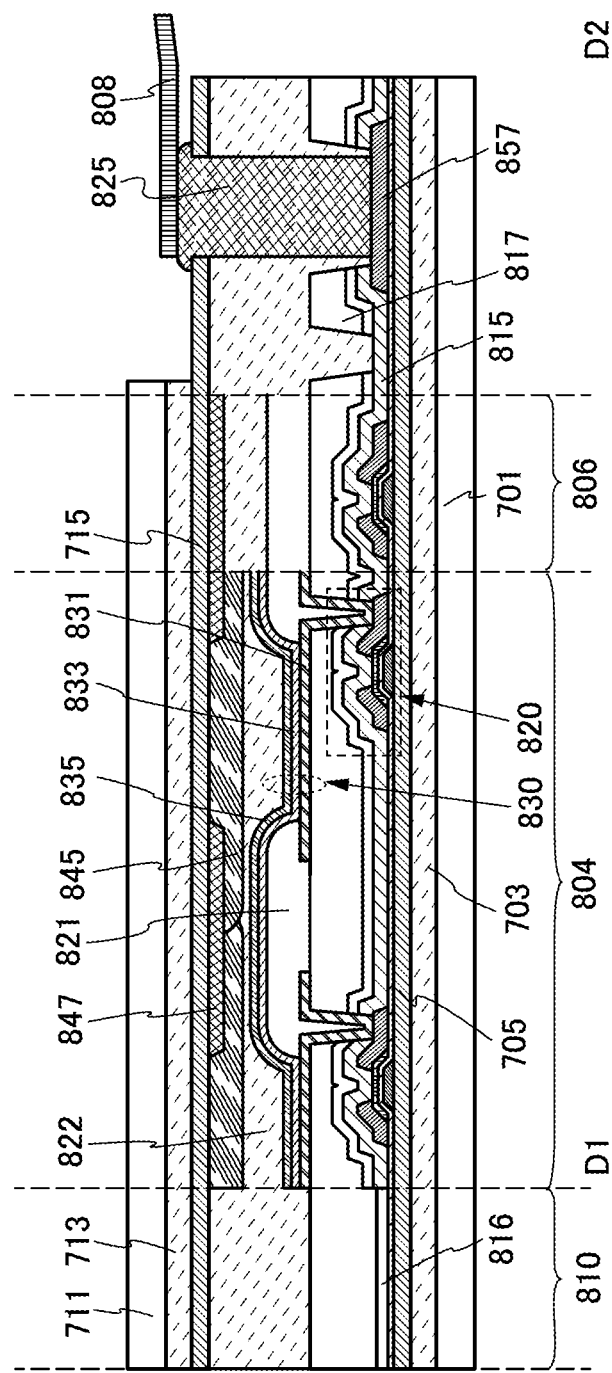

FIG. 19A is a plan view of the display panel, and FIG. 19B is an example of a cross-sectional view taken along the dashed-dotted line D1-D2 in FIG. 19A. FIG. 19B also shows an example of a cross-sectional view of a transparent portion 810.

The display panel in Structure Example 1 is a top-emission display panel using a color filter method. In this embodiment, the display panel can have a structure in which subpixels of three colors of red (R), green (G), and blue (B), for example, express one color; a structure in which subpixels of four colors of R, G, B, and white (W) express one color; a structure in which subpixels of four colors of R, G, B, and yellow (Y) express one color; or the like. There is no particular limitation on color elements, and colors other than R, G, B, W, and Y may be used. For example, cyan, magenta, or the like may be used.

The display panel shown in FIG. 19A includes the transparent portion 810, a display portion 804, an operating circuit portion 806, and an FPC 808. The transparent portion 810 is adjacent to the display portion 804 and provided along two sides of the display portion 804. The operating circuit portion 806 includes a scan line driver circuit, a signal line driver circuit, and the like. The transparent portion 810 includes a region transmitting visible light. The operation circuit portion 806 includes a region blocking visible light.

The display panel illustrated in FIG. 19B includes a substrate 701, an adhesive layer 703, an insulating layer 705, a plurality of transistors, a conductive layer 857, an insulating layer 815, an insulating layer 816, an insulating layer 817, a plurality of light-emitting elements, an insulating layer 821, an adhesive layer 822, a coloring layer 845, a light-blocking layer 847, an insulating layer 715, an adhesive layer 713, and a substrate 711. The adhesive layer 822, the insulating layer 715, the adhesive layer 713, and the substrate 711 transmit visible light. Light-emitting elements and transistors included in the display portion 804 and the operating circuit portion 806 are sealed with the insulating layer 705, the insulating layer 715, and the adhesive layer 822.

The display portion 804 includes a transistor 820 and a light-emitting element 830 over the substrate 701 with the adhesive layer 703 and the insulating layer 705 provided therebetween. The light-emitting element 830 includes a lower electrode 831 over the insulating layer 817, an EL layer 833 over the lower electrode 831, and an upper electrode 835 over the EL layer 833. That is, the light-emitting element 830 includes the lower electrode 831, the upper electrode 835, and the EL layer 833 provided between the lower electrode 831 and the upper electrode 835.

The lower electrode 831 is electrically connected to a source electrode or a drain electrode of the transistor 820. An end portion of the lower electrode 831 is covered with the insulating layer 821. The lower electrode 831 preferably reflects visible light. The upper electrode 835 transmits visible light.

In addition, the display portion 804 includes the coloring layer 845 overlapping with the light-emitting element 830 and the light-blocking layer 847 overlapping with the insulating layer 821. The space between the light-emitting element 830 and the coloring layer 845 is filled with the adhesive layer 822.

The insulating layer 815 and the insulating layer 816 have an effect of inhibiting diffusion of impurities to a semiconductor included in the transistors. As the insulating layer 817, an insulating layer having a planarization function is preferably selected in order to reduce surface unevenness due to the transistor.

Note that the insulating layer 815 and/or the insulating layer 816 may be omitted in a region where a transistor is not provided in the display panel. In particular, it is preferable that the insulating layer 815 and/or the insulating layer 816 not be formed in the transparent portion 810 because the transmittance is improved. FIGS. 19A and 19B show structures in each of which the insulating layer 815 is not formed in the transparent portion 810. For example, silicon nitride and silicon oxynitride can be used as the insulating layer 815 and the insulating layer 816, respectively.

The operating circuit portion 806 includes a plurality of transistors over the substrate 701 with the adhesive layer 703 and the insulating layer 705 provided therebetween. In FIG. 19B, one of transistors included in the operating circuit portion 806 is illustrated.

The insulating layer 705 and the insulating layer 715 are preferably highly resistant to moisture, in which case entry of impurities such as water into the light-emitting element 830 or the transistor 820 can be inhibited, leading to higher reliability of the display panel. When the display panel includes a substrate, the surface of the display panel can be protected from a physical impact, which is preferable. The substrate 701 is bonded to the insulating layer 705 with the adhesive layer 703. The substrate 711 is bonded to the insulating layer 715 with the adhesive layer 713.

The conductive layer 857 is electrically connected to an external electrode through which a signal (e.g., a video signal, a clock signal, a start signal, or a reset signal) or a potential from the outside is transmitted to the operating circuit portion 806. Here, an example in which the FPC 808 is provided as the external electrode is described. To prevent an increase in the number of manufacturing steps, the conductive layer 857 is preferably formed using the same material and the same step(s) as those of the electrode or the wiring in the display portion or the driver circuit portion. Here, an example is described in which the conductive layer 857 is formed using the same material and the same step(s) as those of the electrodes of the transistor 820.

In the display panel in FIG. 19B, the FPC 808 is positioned over the insulating layer 715. The connector 825 is connected to the conductive layer 857 through an opening provided in the insulating layer 715, the adhesive layer 822, the insulating layer 817, the insulating layer 816, and the insulating layer 815. The connector 825 is also connected to the FPC 808. The FPC 808 and the conductive layer 857 are electrically connected to each other via the connector 825.

Figure 20:
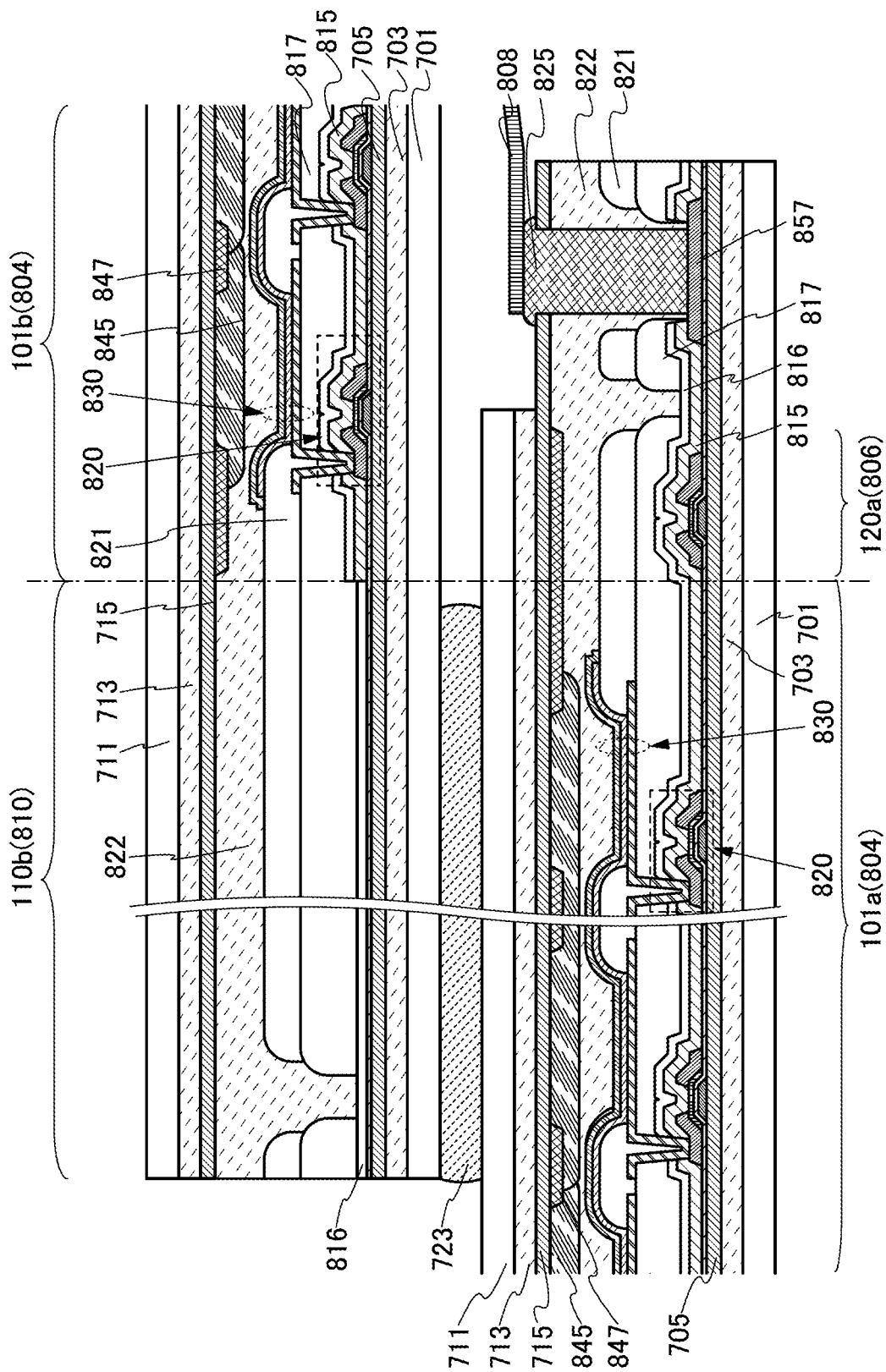
FIG. 20 illustrates a display device of one embodiment.

FIG. 20 shows an example of a cross-sectional view of a state where two display panels each shown in FIG. 19B are attached to each other with an adhesive layer 723 therebetween. Note that the two display panels may be fixed to each other so as to be attachable to and detachable from each other using an adsorptive layer instead of the adhesive layer 723.

FIG. 20 shows the display region 101*a* (corresponding to the display portion 804 shown in FIG. 19A) and the region blocking visible light 120*a* (corresponding to the operating circuit portion 806 and the like shown in FIG. 19A) of the lower (rear) display panel and the display region 101*b* (corresponding to the display portion 804 shown in FIG. 19A) and the transparent portion 101*b* (corresponding to the transparent portion 810 shown in FIG. 19A) of the upper (front) display panel. Furthermore, the cross-sectional view shown in FIG. 20 shows an example of an overlapping portion (the region 170 in FIG. 14A) where the two display panels 100*a* and 100*b* described in Embodiment 2 overlap with each other.

In FIG. 20, the display panel positioned on the upper side (the display surface side) includes the transparent portion 810 adjacent to the display portion 804. Furthermore, the display portion 804 of the lower display panel and the transparent portion 810 of the upper display panel overlap each other. Thus, a non-display region between the display regions of the two overlapping display panels can be reduced and even removed. As a result, a large-sized display device in which a joint portion of the display panels is hardly seen by the user can be obtained.

In FIG. 20, the adhesive layer 723 transmitting visible light is provided between the display portion 804 of the lower display panel and the transparent portion 810 of the upper display panel. The difference in refractive index between the adhesive layer 723 and the substrate 701 of the upper display panel and/or the substrate 711 of the lower display panel is preferably small. Such a structure can reduce reflection by the interface due to the difference in refractive index in a stack located over the display portion 804 of the lower display panel. In addition, display unevenness or luminance unevenness of a large display device can be suppressed.

Examples of Materials and Formation Method

Next, materials and the like that can be used for the display panel are described. Note that description of the components already described in this specification and the like is omitted in some cases.

For each of the substrates, a material such as glass, quartz, an organic resin, a metal, or an alloy can be used. The substrate through which light is extracted from the light-emitting element is formed using a material which transmits the light.

In particular, a flexible substrate is preferably used. For example, an organic resin; or glass, a metal, or an alloy that is thin enough to have flexibility can be used.

An organic resin, which has a specific gravity smaller than that of glass, is preferably used for the flexible substrate, in which case the display panel can be lightweight as compared with the case where glass is used.

The substrate is preferably formed using a material with high toughness. In that case, a display panel with high impact resistance that is less likely to be broken can be provided. For example, when an organic resin substrate or a thin metal or alloy substrate is used, the display panel can be lightweight and unlikely to be broken as compared with the case where a glass substrate is used.

A metal material and an alloy material, which have high thermal conductivity, are preferable because they can easily conduct heat to the whole substrate and accordingly can prevent a local temperature rise in the display panel. The thickness of a substrate using a metal material or an alloy material is preferably greater than or equal to 10 µm and less than or equal to 200 µm, further preferably greater than or equal to 20 µm and less than or equal to 50 µm.

There is no particular limitation on a material of the metal substrate or the alloy substrate, but it is preferable to use, for example, aluminum, copper, nickel, or a metal alloy such as an aluminum alloy or stainless steel.

Furthermore, when a material with high thermal emissivity is used for the substrate, the surface temperature of the display panel can be prevented from rising, leading to inhibition of breakage or a decrease in reliability of the display panel. For example, the substrate may have a stacked-layer structure of a metal substrate and a layer with high thermal emissivity (the layer can be formed using a metal oxide or a ceramic material, for example).

As the substrate having flexibility and a light-transmitting property, a plastic substrate that is formed as a film, for example, a plastic substrate made from polyimide (PI), an aramid, polyethylene terephthalate (PET), polyethersulfone (PES), polyethylene naphthalate (PEN), polycarbonate (PC), nylon, polyetheretherketone (PEEK), polysulfone (PSF), polyetherimide (PEI), polyarylate (PAR), polybutylene terephthalate (PBT), a silicone resin, and the like, or a glass substrate can be used. The substrate may include a fiber or the like (e.g., a prepreg). Furthermore, the substrate is not limited to the resin film, and a transparent nonwoven fabric formed by processing pulp into a continuous sheet, a sheet including an artificial spider's thread fiber containing protein called fibroin, a complex in which the transparent nonwoven fabric or the sheet and a resin are mixed, a stack of a resin film and a nonwoven fabric containing a cellulose fiber whose fiber width is 4 nm or more and 100 nm or less, or a stack of a resin film and a sheet including an artificial spider's thread fiber may be used.

The flexible substrate may have a stacked-layer structure in which a hard coat layer (e.g., a silicon nitride layer) by which a surface of the device is protected from damage, a layer which can disperse pressure (e.g., an aramid resin layer), or the like is stacked over a layer of any of the above-mentioned materials.

The flexible substrate may be formed by stacking a plurality of layers. When a glass layer is used, a barrier property against water and oxygen can be improved and thus a highly reliable display panel can be provided.

For example, a flexible substrate in which a glass layer, an adhesive layer, and an organic resin layer are stacked from the side closer to a light-emitting element can be used. The thickness of the glass layer is greater than or equal to 20 µm and less than or equal to 200 µm, preferably greater than or equal to 25 µm and less than or equal to 100 µm. With such a thickness, the glass layer can have both a high barrier property against water and oxygen and high flexibility. The thickness of the organic resin layer is greater than or equal to 10 µm and less than or equal to 200 µm, preferably greater than or equal to 20 µm and less than or equal to 50 µm. By providing such an organic resin layer, occurrence of a crack or a break in the glass layer can be inhibited and mechanical strength can be improved. With the substrate that includes such a composite material of a glass material and an organic resin, a highly reliable flexible display panel can be provided.

Here, a method for forming a flexible display panel is described.

For convenience, a structure including a pixel and a driver circuit, a structure including an optical member such as a color filter, a structure including a touch sensor, or a structure including a functional member is referred to as an element layer. An element layer includes a display element, for example, and may include a wiring electrically connected to a display element or an element such as a transistor used in a pixel or a circuit in addition to the display element.

Here, a support provided with an insulating surface over which an element layer is formed is called a base material.

As a method for forming an element layer over a flexible base material, there are a method in which an element layer is formed directly over a base material, and a method in which an element layer is formed over a supporting base material that is different from the base material and has stiffness and then the element layer is separated from the supporting base material and transferred to the base material.

In the case where a material of the base material can withstand heating temperature in the process for forming the element layer, it is preferred that the element layer be formed directly over the base material, in which case a manufacturing process can be simplified. At this time, the element layer is preferably formed in a state where the base material is fixed to the supporting base material, in which case the transfer of the element layer in a device and between devices can be easy.

In the case of employing the method in which the element layer is formed over the supporting base material and then transferred to the base material, first, a separation layer and an insulating layer are stacked over a supporting base material, and then the element layer is formed over the insulating layer. Then, the element layer is separated from the supporting base material and then transferred to the base material. At this time, a material is selected such that separation at an interface between the supporting base material and the separation layer, at an interface between the separation layer and the insulating layer, or in the separation layer occurs. With such a method, the element layer can be formed at temperatures higher than the upper temperature limit of the base material, which improves the reliability of the display panel.

For example, it is preferable that stacked layers of a layer including a high-melting-point metal material, such as tungsten, and a layer including an oxide of the metal material be used as the separation layer, and stacked layers of a plurality of layers as the insulating layer, such as a silicon nitride layer and a silicon oxynitride layer be used over the separation layer. By using a high-melting-point metal material, a high-temperature process can be performed to form the element layer, resulting in high reliability. For example, impurities contained in the element layer can be further reduced, and the crystallinity of a semiconductor or the like included in the element layer can be further increased. For the base material, any of the above flexible materials can be preferably used.

Examples of the separation include peeling off by application of mechanical power, removal of the separation layer by etching, or separation by dripping of a liquid into part of the separation interface to penetrate the entire separation interface.

The separation layer is not necessarily provided in the case where separation can occur at an interface between the supporting base material and the insulating layer. For example, glass may be used as the supporting base material, an organic resin such as polyimide may be used as the insulating layer, a separation trigger may be formed by locally heating part of the organic resin by laser light or the like, and separation may be performed at an interface between the glass and the insulating layer. Alternatively, it is possible that a layer containing a material with high thermal conductivity (e.g., a metal or a semiconductor) is provided between the supporting base material and the insulating layer containing an organic resin, and this layer is heated by current so that separation easily occurs, and then separation is performed. In this case, the insulating layer containing an organic resin can also be used as the base material.

As the adhesive layer, a variety of curable resins such as a reactive curable resin, a thermosetting resin, an anaerobic resin, and a photo curable resin such as an ultraviolet curable resin can be used. Examples of such resins include an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, and the like. In particular, a material with low moisture permeability, such as an epoxy resin, is preferable. Alternatively, a two-component-mixture-type resin may be used. Further alternatively, an adhesive sheet or the like may be used.

Furthermore, the resin may include a drying agent. For example, a substance which adsorbs moisture by chemical adsorption, such as an oxide of an alkaline earth metal (e.g., calcium oxide or barium oxide), can be used. Alternatively, a substance that adsorbs moisture by physical adsorption, such as zeolite or silica gel, may be used. The drying agent is preferably included, in which case entry of impurities such as moisture into the light-emitting element can be inhibited and the reliability of the display panel can be improved.

In addition, a filler with a high refractive index or a light scattering member is mixed into the resin, in which case the efficiency of light extraction from the light-emitting element can be improved. For example, titanium oxide, barium oxide, zeolite, zirconium, or the like can be used.

Insulating films with high resistance to moisture are preferably used for the insulating layer 705 and the insulating layer 715. Alternatively, the insulating layer 705 and the insulating layer 715 preferably have a function of preventing diffusion of impurities to a light-emitting element.

As an insulating film having an excellent moisture-proof property, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film having an excellent moisture-proof property is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], still further preferably lower than or equal to $1\times10^{-8}$ [g/(m$^2$·day)].

In the display panel, it is necessary that at least one of the insulating layers 705 and 715, which is on the light-emitting surface side, transmit light emitted from the light-emitting element. In the case where the display panel includes the insulating layers 705 and 715, one of the insulating layers 705 and 715, which transmits light emitted from the light-emitting element, preferably has higher average transmittance than the other in a wavelength of 400 nm or more and 800 nm or less.

The insulating layers 705 and 715 each preferably include oxygen, nitrogen, and silicon. The insulating layers 705 and 715 each preferably include, for example, silicon oxynitride. Moreover, the insulating layers 705 and 715 each preferably include silicon nitride or silicon nitride oxide. It is preferable that the insulating layers 705 and 715 be each formed using a silicon oxynitride film and a silicon nitride film, which are in contact with each other. The silicon oxynitride film and the silicon nitride film are alternately stacked so that anti-phase interference occurs more often in a visible region, whereby the stack can have higher transmittance of light in the visible region.

There is no particular limitation on the structure of the transistor in the display panel. For example, a forward staggered transistor or an inverted staggered transistor may be used. Furthermore, a top-gate transistor or a bottom-gate transistor may be used. A semiconductor material used for the transistors is not particularly limited, and for example, silicon, germanium, or an organic semiconductor can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be inhibited.

For stable characteristics of the transistor, a base film is preferably provided. The base film can be formed to have a single-layer structure or a stacked-layer structure using an inorganic insulating film such as a silicon oxide film, a silicon nitride film, a silicon oxynitride film, or a silicon nitride oxide film. The base film can be formed by a sputtering method, a chemical vapor deposition (CVD) method (e.g., a plasma CVD method, a thermal CVD method, or a metal organic CVD (MOCVD) method), an atomic layer deposition (ALD) method, a coating method, a printing method, or the like. Note that the base film is not necessarily provided. In each of the above structure examples, the insulating layer 705 can serve as a base film of the transistor.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may have any of a top emission structure, a bottom emission structure, and a dual emission structure. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide (ZnO), or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; a nitride of any of these metal materials (e.g., titanium nitride); or the like can be formed thin so as to transmit light. Alternatively, a stacked film of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material, such as aluminum, gold, platinum, silver, nickel, tungsten, chromium, molybdenum, iron, cobalt, copper, or palladium or an alloy including any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La), or an alloy containing silver such as an alloy of silver and copper, an alloy of silver, palladium, and copper (Ag—Pd—Cu, also referred to as APC), or an alloy of silver and magnesium can be used for the conductive film. An alloy of silver and copper is preferable because of its high heat resistance. Moreover, a metal film or a metal oxide film is stacked on an aluminum alloy film, whereby oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, a stacked film of silver and ITO or a stacked film of an alloy of silver and magnesium and ITO can be used.

The lower electrode 831 and the upper electrode 835 can be formed of the conductive film that transmits visible light or the conductive film that reflects visible light.

The electrodes may be formed separately by an evaporation method or a sputtering method. Alternatively, a discharging method such as an ink-jet method, a printing method such as a screen printing method, or a plating method may be used.

When a voltage higher than the threshold voltage of the light-emitting element is applied between the lower electrode 831 and the upper electrode 835, holes are injected to the EL layer 833 from the anode side and electrons are injected to the EL layer 833 from the cathode side. The injected electrons and holes are recombined in the EL layer 833 and a light-emitting substance contained in the EL layer 833 emits light.

The EL layer 833 includes at least a light-emitting layer. In addition to the light-emitting layer, the EL layer 833 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 833, either a low molecular compound or a high molecular compound can be used, and an inorganic compound may also be used. Each of the layers included in the EL layer 833 can be formed by any of the following methods: an evaporation method (including a vacuum evaporation method), a transfer method, a printing method, an inkjet method, a coating method, and the like.

The light-emitting element 830 may contain two or more kinds of light-emitting substances. Thus, for example, a light-emitting element that emits white light can be achieved. For example, a white emission can be obtained by selecting light-emitting substances so that two or more kinds of light-emitting substances emit light of complementary colors. A light-emitting substance that emits red (R) light, green (G) light, blue (B) light, yellow (Y) light, or orange (O) light or a light-emitting substance that emits light containing spectral components of two or more of R light, G light, and B light can be used, for example. A light-emitting substance that emits blue light and a light-emitting substance that emits yellow light may be used, for example. At this time, the emission spectrum of the light-emitting substance that emits yellow light preferably contains spectral components of G light and R light. The emission spectrum of the light-emitting element 830 preferably has two or more peaks in the wavelength range in a visible region (e.g., greater than or equal to 350 nm and less than or equal to 750 nm or greater than or equal to 400 nm and less than or equal to 800 nm).

The EL layer 833 may include a plurality of light-emitting layers. In the EL layer 833, the plurality of light-emitting layers may be stacked in contact with one another or may be stacked with a separation layer provided therebetween. The separation layer may be provided between a fluorescent layer and a phosphorescent layer, for example.

The separation layer can be provided, for example, to prevent energy transfer by the Dexter mechanism (particularly triplet energy transfer) from a phosphorescent material or the like in an excited state which is generated in the phosphorescent layer to a fluorescent material or the like in the fluorescent layer. The thickness of the separation layer may be several nanometers. Specifically, the thickness of the separation layer may be greater than or equal to 0.1 nm and less than or equal to 20 nm, greater than or equal to 1 nm and less than or equal to 10 nm, or greater than or equal to 1 nm and less than or equal to 5 nm. The separation layer contains a single material (preferably, a bipolar substance) or a plurality of materials (preferably, a hole-transport material and an electron-transport material).

The separation layer may be formed using a material contained in a light-emitting layer in contact with the separation layer. This facilitates the manufacture of the light-emitting element and reduces the drive voltage. For example, in the case where the phosphorescent layer includes a host material, an assist material, and a phosphorescent material (guest material), the separation layer may be formed using the host material and the assist material. In other words, the separation layer includes a region not containing the phosphorescent material and the phosphorescent layer includes a region containing the phosphorescent material in the above structure. Accordingly, the separation layer and the phosphorescent layer can be evaporated separately depending on whether a phosphorescent material is used or not. With such a structure, the separation layer and the phosphorescent layer can be formed in the same chamber. Thus, the manufacturing costs can be reduced.

Moreover, the light-emitting element 830 may be a single element including one EL layer or a tandem element in which EL layers are stacked with a charge generation layer provided therebetween.

The light-emitting element is preferably provided between a pair of insulating films having an excellent moisture-proof property. In that case, entry of an impurity such as moisture into the light-emitting element can be inhibited, leading to inhibition of a decrease in the reliability of the display panel.

As the insulating layer 815 and the insulating layer 816, for example, an inorganic insulating film such as a silicon oxide film, a silicon oxynitride film, or an aluminum oxide film can be used. Note that the insulating layer 815 and the insulating layer 816 may be formed using different materials. As the insulating layer 817, an organic material such as polyimide, acrylic, polyamide, polyimide amide, or a benzocyclobutene-based resin can be used, for example. Alternatively, a low-dielectric constant material (a low-k material) or the like can be used. Furthermore, each insulating layer may be formed by stacking a plurality of insulating films.

The insulating layer 821 is formed using an organic insulating material or an inorganic insulating material. As the resin, for example, a polyimide resin, a polyamide resin, an acrylic resin, a siloxane resin, an epoxy resin, or a phenol resin can be used. It is particularly preferable that the insulating layer 821 be formed using a photosensitive resin material to have an opening portion over the lower electrode 831 so that a side wall of the opening portion is formed as an inclined surface with a continuous curvature.

There is no particular limitation on the method for forming the insulating layer 821; a photolithography method, a sputtering method, an evaporation method, a droplet discharging method (e.g., an inkjet method), a printing method (e.g., a screen printing method or an off-set printing method), or the like may be used.

For example, a conductive layer functioning as an electrode or a wiring of the transistor, an auxiliary electrode of the light-emitting element, or the like, which is used for the display panel, can be formed to have a single-layer structure or a stacked-layer structure using any of metal materials such as molybdenum, titanium, chromium, tantalum, tungsten, aluminum, copper, neodymium, and scandium, and an alloy material containing any of these elements. Alternatively, the conductive layer may be formed using a conductive metal oxide. As the conductive metal oxide, indium oxide (e.g., $In_2O_3$), tin oxide (e.g., $SnO_2$), ZnO, ITO, indium zinc oxide (e.g., $In_2O_3$—ZnO), or any of these metal oxide materials in which silicon oxide is contained can be used.

The coloring layer is a colored layer that transmits light in a specific wavelength range. For example, a color filter for transmitting light in a red, green, blue, or yellow wavelength range can be used. Each coloring layer is formed in a desired position with any of various materials by a printing method, an inkjet method, an etching method using a photolithography method, or the like. In a white sub-pixel, a resin such as a transparent resin or a white resin may be provided so as to overlap with the light-emitting element.

The light-blocking layer is provided between the adjacent coloring layers. The light-blocking layer blocks light emitted from an adjacent light-emitting element to inhibit color mixture between adjacent light-emitting elements. Here, the coloring layer is provided such that its end portion overlaps with the light-blocking layer, whereby light leakage can be reduced. As the light-blocking layer, a material that can block light from the light-emitting element can be used; for example, a black matrix is formed using a resin material containing a metal material, pigment, or dye. Note that it is preferable to provide the light-blocking layer in a region other than the display portion, such as a driver circuit portion, in which case undesired leakage of guided light or the like can be inhibited.

Furthermore, an overcoat covering the coloring layer and the light-blocking layer may be provided. The overcoat can prevent an impurity and the like contained in the coloring layer from being diffused into the light-emitting element. The overcoat is formed with a material that transmits light emitted from the light-emitting element; for example, an inorganic insulating film such as a silicon nitride film or a silicon oxide film, an organic insulating film such as an acrylic film or a polyimide film can be used, and further, a stacked-layer structure of an organic insulating film and an inorganic insulating film may be employed.

In the case where upper surfaces of the coloring layer and the light-blocking layer are coated with a material of the adhesive layer, a material which has high wettability with respect to the material of the adhesive layer is preferably used as the material of the overcoat. For example, an oxide conductive film such as an ITO film or a metal film such as an Ag film which is thin enough to transmit light is preferably used as the overcoat.

As the connector, any of a variety of anisotropic conductive films (ACF), anisotropic conductive pastes (ACP), and the like can be used.

This embodiment can be combined as appropriate with any of the other embodiments.

Embodiment 5

In this embodiment, a touch panel that can be used in a display device of one embodiment of the present invention will be described with reference to drawings. Note that the above description can be referred to for the components of the touch panel, which are similar to those of the display panel described in the above embodiments. Although a touch panel including a light-emitting element is described as an example in this embodiment, one embodiment of the present invention is not limited thereto. For example, a touch panel including another element (e.g., a display element), the example of which is shown in the above embodiment, can also be used in the display device of one embodiment of the present invention.

Structure Example 1

FIG. 21A is a top view of the touch panel. FIG. 21B is a cross-sectional view taken along the dashed-dotted line A-B and the dashed-dotted line C-D in FIG. 21A. FIG. 21C is a cross-sectional view taken along the dashed-dotted line E-F in FIG. 21A.

A touch panel 390 illustrated in FIG. 21A includes a display portion 301 (serving also as an input portion), a scan line driver circuit 303g(1), an imaging pixel driver circuit 303g(2), an image signal line driver circuit 303s(1), and an imaging signal line driver circuit 303s(2).

The display portion 301 includes a plurality of pixels 302 and a plurality of imaging pixels 308.

The pixel 302 includes a plurality of sub-pixels. Each sub-pixel includes a light-emitting element and a pixel circuit.

The pixel circuits can supply electric power for driving the light-emitting element. The pixel circuits are electrically connected to wirings through which selection signals are supplied. The pixel circuits are also electrically connected to wirings through which image signals are supplied.

The scan line driver circuit 303g(1) can supply selection signals to the pixels 302.

The image signal line driver circuit 303s(1) can supply image signals to the pixels 302.

A touch sensor can be formed using the imaging pixels 308. Specifically, the imaging pixels 308 can sense a touch of a finger or the like on the display portion 301.

The imaging pixels 308 include photoelectric conversion elements and imaging pixel circuits.

The imaging pixel circuits can drive photoelectric conversion elements. The imaging pixel circuits are electrically connected to wirings through which control signals are supplied. The imaging pixel circuits are also electrically connected to wirings through which power supply potentials are supplied.

Examples of the control signal include a signal for selecting an imaging pixel circuit from which a recorded imaging signal is read, a signal for initializing an imaging pixel circuit, and a signal for determining the time it takes for an imaging pixel circuit to sense light.

The imaging pixel driver circuit 303g(2) can supply control signals to the imaging pixels 308.

The imaging signal line driver circuit 303s(2) can read out imaging signals.

As illustrated in FIGS. 21B and 21C, the touch panel 390 includes the substrate 701, the adhesive layer 703, the insulating layer 705, the substrate 711, the adhesive layer 713, and the insulating layer 715. The substrates 701 and 711 are bonded to each other with an adhesive layer 360.

The substrate 701 and the insulating layer 705 are bonded to each other with the adhesive layer 703. The substrate 711 and the insulating layer 715 are bonded to each other with the adhesive layer 713.

The substrates 701 and 711 are preferably flexible.

Embodiment 2 can be referred to for materials used for the substrates, the adhesive layers, and the insulating layers.

Each of the pixels 302 includes the sub-pixel 302R, a sub-pixel 302G, and a sub-pixel 302B (see FIG. 21C). The sub-pixel 302R includes a light-emitting module 380R, the sub-pixel 302G includes a light-emitting module 380G, and the sub-pixel 302B includes a light-emitting module 380B.

For example, the sub-pixel 302R includes the light-emitting element 350R and the pixel circuit. The pixel circuit includes a transistor 302t that can supply electric power to the light-emitting element 350R. Furthermore, the light-emitting module 380R includes the light-emitting element 350R and an optical element (e.g., a coloring layer 367R that transmits red light).

The light-emitting element 350R includes a lower electrode 351R, an EL layer 353, and an upper electrode 352, which are stacked in this order (see FIG. 21C).

The EL layer 353 includes a first EL layer 353a, an intermediate layer 354, and a second EL layer 353b, which are stacked in this order.

Note that a microcavity structure can be provided for the light-emitting module 380R so that light with a specific wavelength can be efficiently extracted. Specifically, an EL layer may be provided between a film that reflects visible light and a film that partly reflects and partly transmits visible light, which are provided so that light with a specific wavelength can be efficiently extracted.

The light-emitting module 380R, for example, includes the adhesive layer 360 that is in contact with the light-emitting element 350R and the coloring layer 367R.

The coloring layer 367R is positioned in a region overlapping with the light-emitting element 350R. Accordingly, part of light emitted from the light-emitting element 350R passes through the adhesive layer 360 and the coloring layer 367R and is emitted to the outside of the light-emitting module 380R as indicated by an arrow in FIG. 21B or 21C.

The touch panel 390 includes a light-blocking layer 367BM. The light-blocking layer 367BM is provided so as to surround the coloring layer (e.g., the coloring layer 367R).

The touch panel 390 includes an anti-reflective layer 367p positioned in a region overlapping with the display portion 301. As the anti-reflective layer 367p, a circular polarizing plate can be used, for example.

The touch panel 390 includes an insulating layer 321. The insulating layer 321 covers the transistor 302t and the like. Note that the insulating layer 321 can be used as a layer for covering unevenness caused by the pixel circuits and the imaging pixel circuits. An insulating layer on which a layer that can inhibit diffusion of impurities to the transistor 302t and the like is stacked can be used as the insulating layer 321.

The touch panel 390 includes a partition 328 that overlaps with an end portion of the lower electrode 351R. In addition, a spacer 329 that controls the distance between the substrate 701 and the substrate 711 is provided on the partition 328.

The image signal line driver circuit 303s(1) includes a transistor 303t and a capacitor 303c. Note that the driver circuit can be formed in the same process and over the same substrate as those of the pixel circuits. As illustrated in FIG. 21B, the transistor 303t may include a second gate 304 over the insulating layer 321. The second gate 304 may be electrically connected to a gate of the transistor 303t, or different potentials may be supplied to these gates. Alternatively, if necessary, the second gate 304 may be provided for a transistor 308t, the transistor 302t, or the like.

The imaging pixels 308 each include a photoelectric conversion element 308p and an imaging pixel circuit. The imaging pixel circuit can sense light received by the photoelectric conversion element 308p. The imaging pixel circuit includes the transistor 308t.

For example, a PIN photodiode can be used as the photoelectric conversion element 308p.

The touch panel 390 includes a wiring 311 through which a signal is supplied. The wiring 311 is provided with a terminal 319. Note that an FPC 309 through which a signal such as an image signal or a synchronization signal is supplied is electrically connected to the terminal 319. Note that a printed wiring board (PWB) may be attached to the FPC 309.

Note that transistors such as the transistors 302t, 303t, and 308t can be formed in the same process. Alternatively, the transistors may be formed in different processes.

Structure Example 2

Figure 22A:
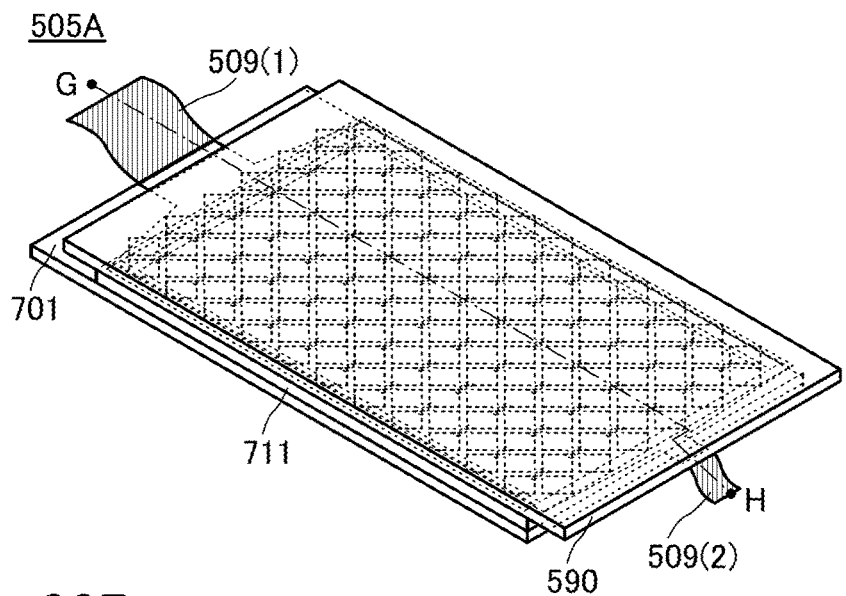
FIGS. 22A to 22B illustrate a touch panel of one embodiment.
Figure 22B:
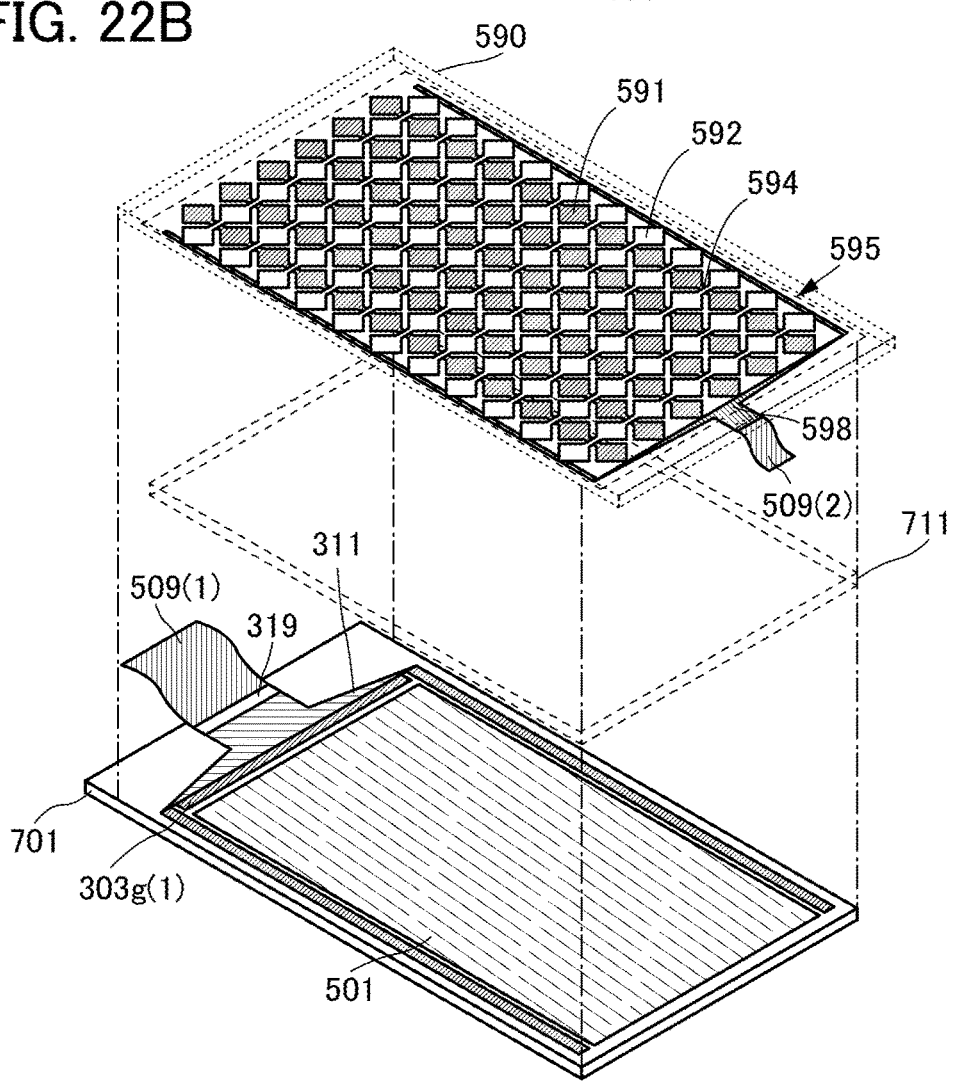
Figure 23A:
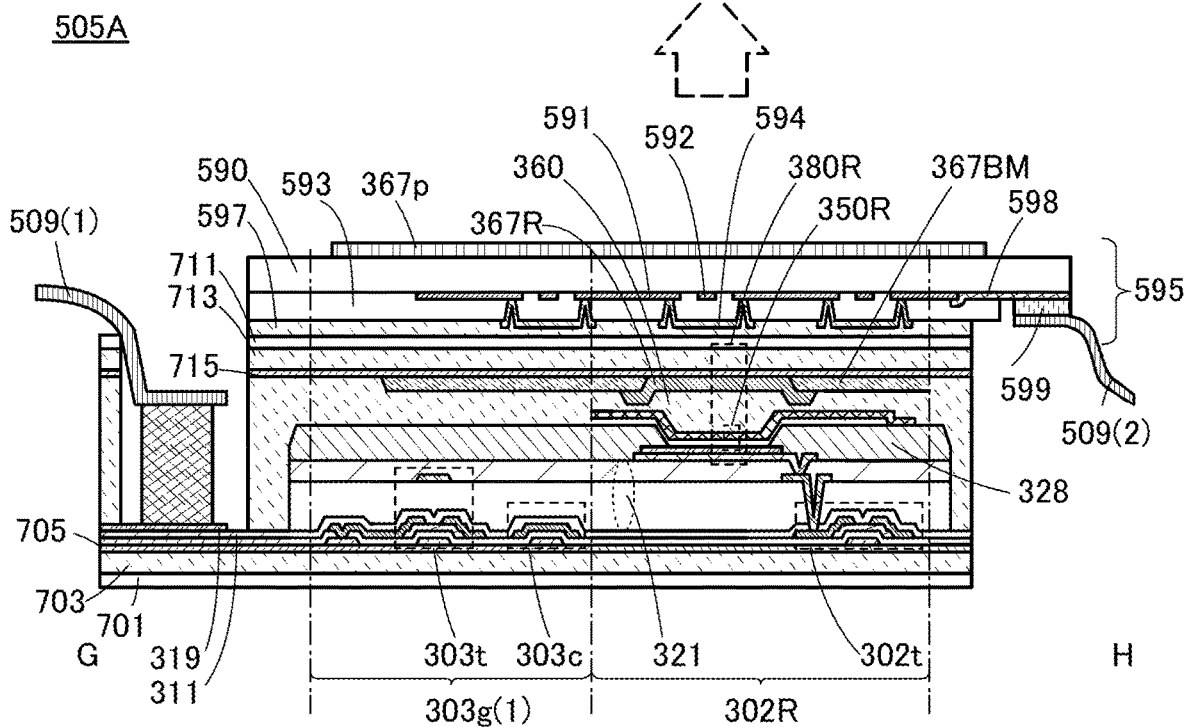
FIGS. 23A to 23C illustrate a touch panel of one embodiment.

FIGS. 22A and 22B are perspective views of a touch panel 505A. Note that FIGS. 22A and 22B illustrate only main components for simplicity. FIG. 23A is a cross-sectional view taken along the dashed-dotted line G-H in FIG. 22A.

As illustrated in FIGS. 22A and 22B, the touch panel 505A includes a display portion 501, the scan line driver circuit 303g(1), a touch sensor 595, and the like. Furthermore, the touch panel 505A includes the substrate 701, the substrate 711, and a substrate 590.

The touch panel 505A includes a plurality of pixels and a plurality of wirings 311. The plurality of wirings 311 can supply signals to the pixels. The plurality of wirings 311 are led to a peripheral portion of the substrate 701, and part of the plurality of wirings 311 form the terminal 319. The terminal 319 is electrically connected to an FPC 509(1).

The touch panel 505A includes the touch sensor 595 and a plurality of wirings 598. The plurality of wirings 598 are electrically connected to the touch sensor 595. The plurality of wirings 598 are led to a peripheral portion of the substrate 590, and part of the plurality of wirings 598 form a terminal. The terminal is electrically connected to an FPC 509(2). Note that in FIG. 22B, electrodes, wirings, and the like of the touch sensor 595 provided on the back side of the substrate 590 (the side facing the substrate 701) are indicated by solid lines for clarity.

As the touch sensor 595, for example, a capacitive touch sensor can be used. Examples of the capacitive touch sensor include a surface capacitive touch sensor and a projected capacitive touch sensor. An example of using a projected capacitive touch sensor is described here.

Examples of the projected capacitive touch sensor include a self capacitive touch sensor and a mutual capacitive touch sensor, which differ mainly in the driving method. The use of a mutual capacitive type is preferred because multiple points can be sensed simultaneously.

Note that a variety of sensors that can sense the closeness or the contact of a sensing target such as a finger can be used as the touch sensor 595.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 22A and 22B.

The electrodes 591 each have a quadrangular shape and are arranged in a direction intersecting with the direction in which the electrodes 592 extend. Note that the plurality of electrodes 591 is not necessarily arranged in the direction orthogonal to one electrode 592 and may be arranged to intersect with one electrode 592 at an angle of less than 90 degrees.

The wiring 594 intersects with the electrode 592. The wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

Note that a more specific structure example of the touch sensor 595 will be described later.

As illustrated in FIG. 23A, the touch panel 505A includes the substrate 701, the adhesive layer 703, the insulating layer 705, the substrate 711, the adhesive layer 713, and the insulating layer 715. The substrates 701 and 711 are bonded to each other with the adhesive layer 360.

An adhesive layer 597 bonds the substrate 590 to the substrate 711 so that the touch sensor 595 overlaps with the display portion 501. The adhesive layer 597 transmits light.

The electrodes 591 and the electrodes 592 are formed using a conductive material that transmits light. As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film including graphene oxide. As a reducing method, a method with application of heat or the like can be employed.

The resistance of a material used for conductive films such as the electrodes 591, the electrodes 592, and the wiring 594, i.e., a wiring and an electrode in the touch panel, is preferably low. Examples of the material include ITO, indium zinc oxide, ZnO, silver, copper, aluminum, a carbon nanotube, and graphene. Alternatively, a metal nanowire including a number of conductors with an extremely small width (for example, a diameter of several nanometers) may be used. Note that a metal nanowire, a carbon nanotube, graphene, or the like may be used for an electrode of the display element, e.g., a pixel electrode or a common electrode because of its high transmittance.

The electrodes 591 and the electrodes 592 may be formed by depositing a light-transmitting conductive material on the substrate 590 by a sputtering method and then removing an unnecessary portion by a variety of patterning technique such as photolithography.

The electrodes 591 and the electrodes 592 are covered with an insulating layer 593. Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and the electrodes 592 can be favorably used for the wiring 594 because electric resistance can be reduced.

Note that an insulating layer covering the insulating layer 593 and the wiring 594 may be provided to protect the touch sensor 595.

Furthermore, a connection layer 599 electrically connects the wirings 598 to the FPC 509(2).

The display portion 501 includes a plurality of pixels arranged in a matrix. Each pixel has the same structure as Structure Example 1; thus, description is omitted.

Any of various kinds of transistors can be used in the touch panel. A structure in the case of using bottom-gate transistors is illustrated in FIGS. 23A and 23B.

For example, a semiconductor layer containing an oxide semiconductor, amorphous silicon, or the like can be used in the transistor 302t and the transistor 303t illustrated in FIG. 23A.

Figure 23B:
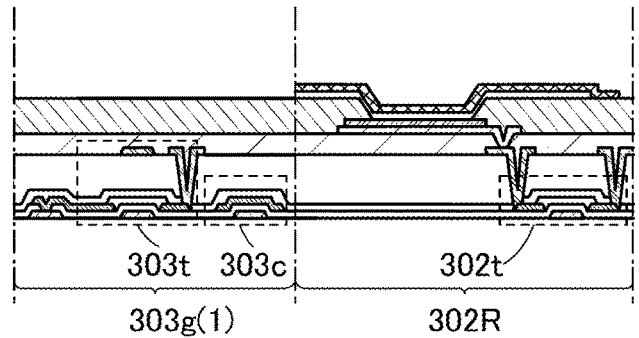

For example, a semiconductor layer containing polycrystalline silicon that is obtained by crystallization process such as laser annealing can be used in the transistor 302t and the transistor 303t illustrated in FIG. 23B.

Figure 23C:
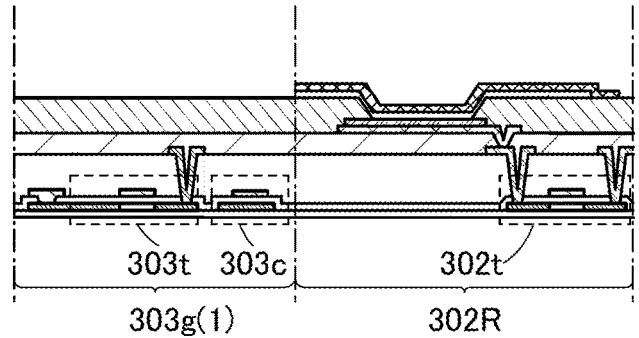

A structure in the case of using top-gate transistors is illustrated in FIG. 23C.

For example, a semiconductor layer including polycrystalline silicon, a single crystal silicon film that is transferred from a single crystal silicon substrate, or the like can be used in the transistor 302t and the transistor 303t illustrated in FIG. 23C.

Structure Example 3

Figure 24A:
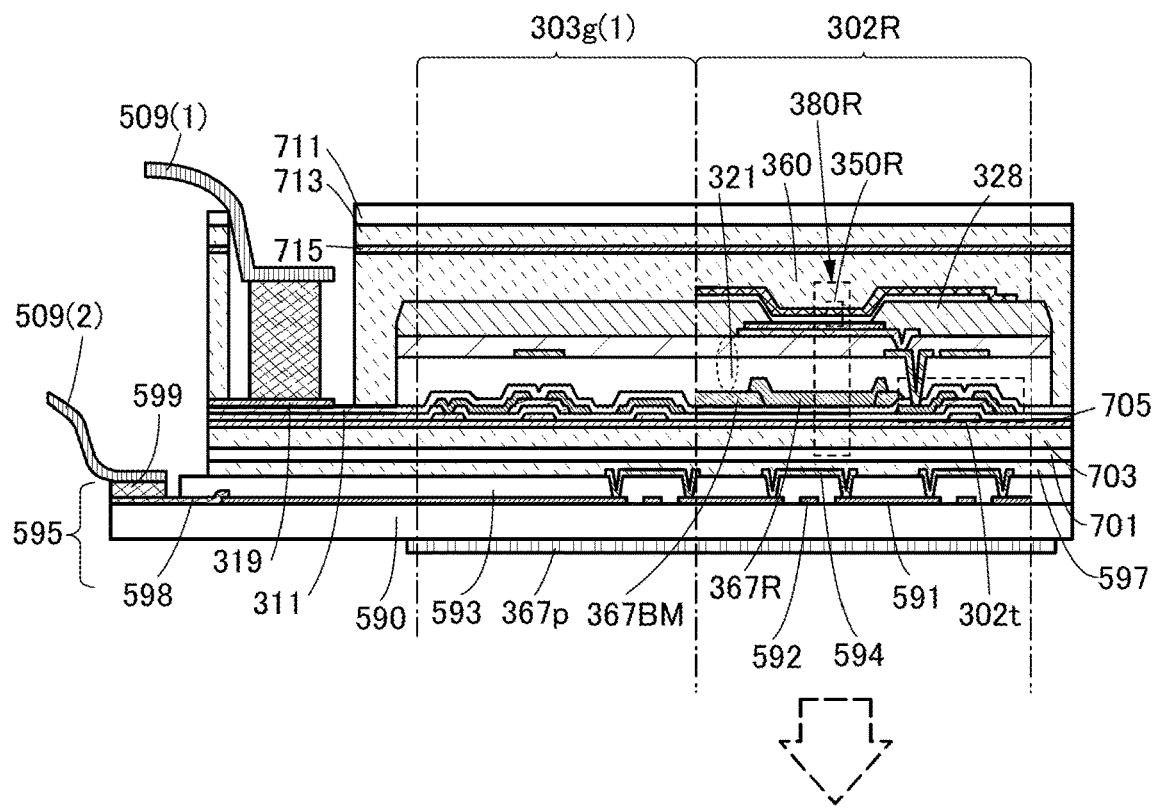
FIGS. 24A to 24C illustrate a touch panel of one embodiment.
Figure 24B:
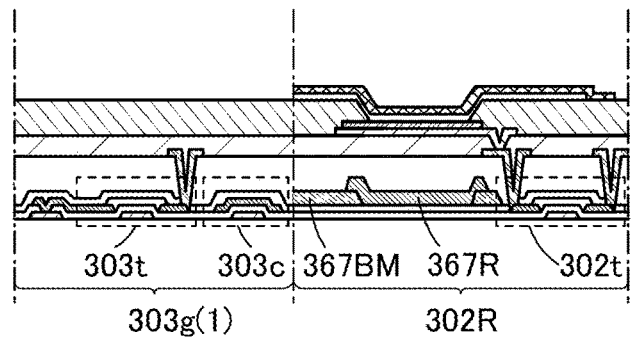
Figure 24C:
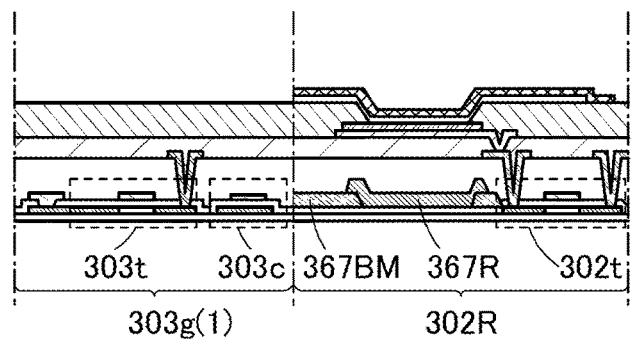

FIGS. 24A to 24C are cross-sectional views of a touch panel 505B. The touch panel 505B described in this embodiment is different from the touch panel 505A in Structure Example 2 in that received image data is displayed on the side where the transistors are provided, that the touch sensor is provided on the substrate 701 side of the display portion, and that the FPC 509(2) is provided on the same side as the FPC 509(1). Different structures will be described in detail below, and the above description is referred to for the other similar structures.

The coloring layer 367R is positioned in a region overlapping with the light-emitting element 350R. The light-emitting element 350R illustrated in FIG. 24A emits light to the side where the transistor 302t is provided. Accordingly, part of light emitted from the light-emitting element 350R passes through the coloring layer 367R and is emitted to the outside of the light-emitting module 380R as indicated by an arrow in FIG. 24A.

The touch panel 505B includes the light-blocking layer 367BM on the light extraction side. The light-blocking layer 367BM is provided so as to surround the coloring layer (e.g., the coloring layer 367R).

The touch sensor 595 is provided not on the substrate 711 side but on the substrate 701 side (see FIG. 24A).

The adhesive layer 597 bonds the substrate 590 to the substrate 701 so that the touch sensor 595 overlaps with the display portion. The adhesive layer 597 transmits light.

Note that a structure in the case of using bottom-gate transistors in the display portion 501 is illustrated in FIGS. 24A and 24B.

For example, a semiconductor layer containing an oxide semiconductor, amorphous silicon, or the like can be used in the transistor 302t and the transistor 303t illustrated in FIG. 24A.

For example, a semiconductor layer containing polycrystalline silicon can be used in the transistor 302t and the transistor 303t illustrated in FIG. 24B.

A structure in the case of using top-gate transistors is illustrated in FIG. 24C.

For example, a semiconductor layer containing polycrystalline silicon, a single crystal silicon film that is transferred, or the like can be used in the transistor 302t and the transistor 303t illustrated in FIG. 24C.

Structural Example of Touch Sensor

A more specific structure example of the touch sensor 595 is described below with reference to drawings.

Figure 25A:
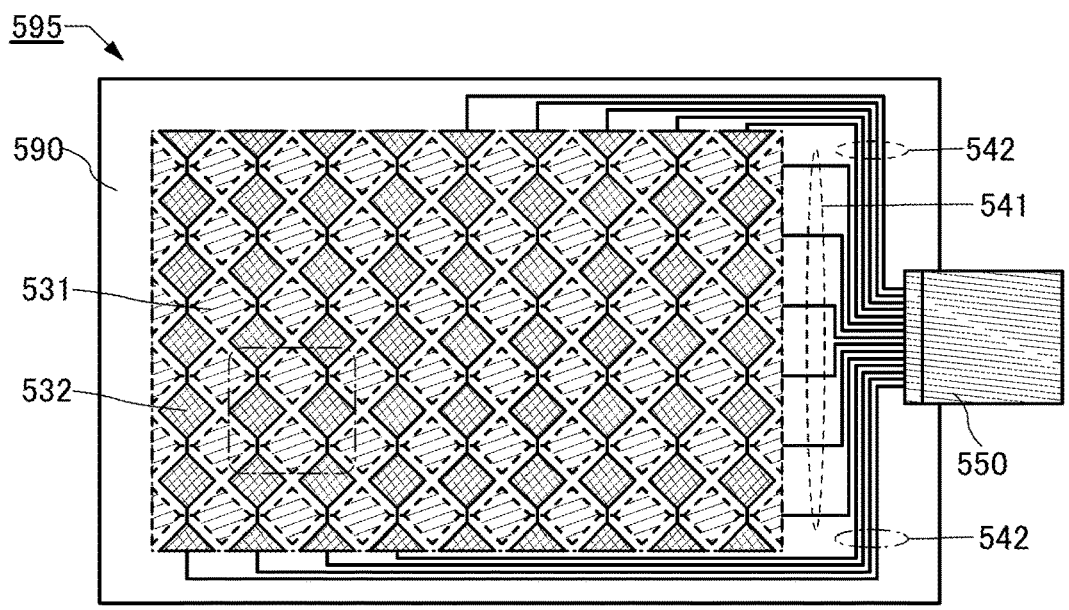
FIGS. 25A to 25D illustrate a touch panel of one embodiment.

FIG. 25A is a schematic top view of the touch sensor 595. The touch sensor 595 includes a plurality of electrodes 531, a plurality of electrodes 532, a plurality of wirings 541, and a plurality of wirings 542 over a substrate 590. The substrate 590 is provided with an FPC 550 which is electrically connected to each of the plurality of wirings 541 and the plurality of wirings 542.

Figure 25B:
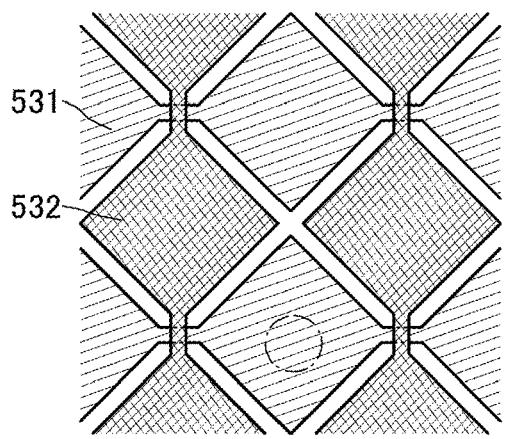

FIG. 25B shows an enlarged view of a region surrounded by a dashed dotted line in FIG. 25A. The electrodes 531 are each in the form of a series of rhombic electrode patterns aligned in a lateral direction of this figure. The rhombic electrode patterns aligned in a line are electrically connected to each other. The electrodes 532 are also each in the form of a series of rhombic electrode patterns aligned in a longitudinal direction in this figure and the rhombic electrode patterns aligned in a line are electrically connected. Part of the electrode 531 and part of the electrode 532 overlap and intersect with each other. At this intersection portion, an insulator is sandwiched in order to avoid an electrical short-circuit between the electrode 531 and the electrode 532.

Figure 25C:
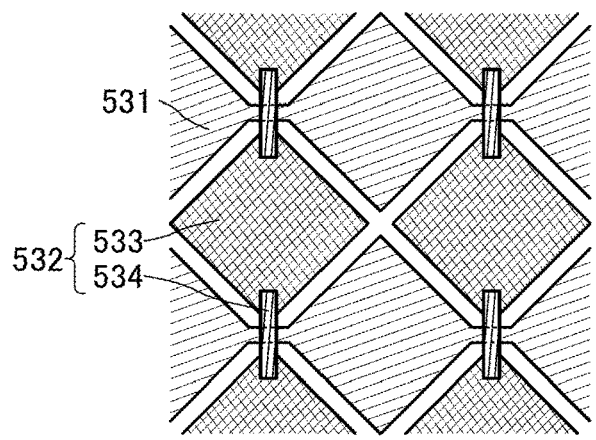

As shown in FIG. 25C, the electrodes 532 may form a plurality of island-shape rhombic electrodes 533 and bridge electrodes 534. The plurality of island-shape rhombic electrodes 533 are aligned in a longitudinal direction in this figure, and two adjacent electrodes 533 are electrically connected to each other by the bridge electrode 534. Such a structure makes it possible that the electrodes 533 and the electrodes 531 can be formed at the same time by processing the same conductive film. This can prevent variations in the thickness of these films, and can prevent the resistance value and the light transmittance of each electrode from varying from place to place. Note that although the electrodes 532 include the bridge electrodes 534 here, the electrodes 531 may have such a structure.

Figure 25D:
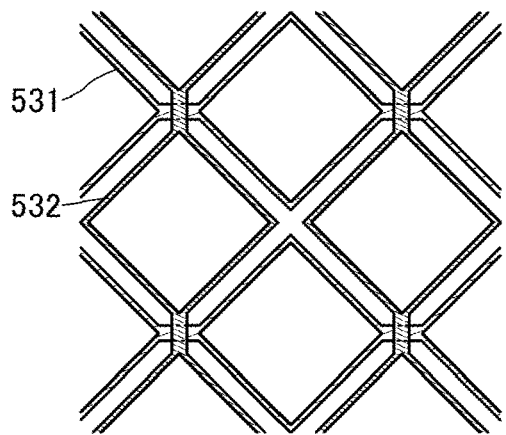

As shown in FIG. 25D, a design in which rhombic electrode patterns of the electrodes 531 and 532 shown in FIG. 25B are hollowed out and only edge portions are left may be used. At that time, when the electrodes 531 and the electrodes 532 are too small in width for the users to see, the electrodes 531 and the electrodes 532 can be formed using a light-blocking material such as a metal or an alloy, as described later. In addition, either the electrodes 531 or the electrodes 532 shown in FIG. 25D may include the above bridge electrodes 534.

One of the electrodes 531 is electrically connected to one of the wirings 541. One of the electrodes 532 is electrically connected to one of the wirings 542.

When a touch panel is formed in such a manner that the touch sensor 595 is stacked over a display surface of the display panel, a light-transmitting conductive material is preferably used for the electrodes 531 and the electrodes 532. In the case where a light-transmitting conductive material is used for the electrodes 531 and the electrodes 532 and light from the display panel is extracted through the electrodes 531 or the electrodes 532, it is preferable that a conductive film containing the same conductive material be arranged between the electrodes 531 and the electrodes 532 as a dummy pattern. Part of a space between the electrodes 531 and the electrodes 532 is filled with the dummy pattern, which can reduce variation in light transmittance. As a result, unevenness in luminance of light transmitted through the touch sensor 595 can be reduced.

As a light-transmitting conductive material, a conductive oxide such as indium oxide, indium tin oxide, indium zinc oxide, zinc oxide, or zinc oxide to which gallium is added can be used. Note that a film including graphene can be used as well. The film including graphene can be formed, for example, by reducing a film containing graphene oxide. As a reducing method, a method with application of heat or the like can be employed.

Further, a metal film or an alloy film which is thin enough to have a light-transmitting property can be used. For example, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material or the alloy material (e.g., titanium nitride), or the like may be used. Alternatively, a stacked film in which two or more of conductive films containing the above materials are stacked may be used.

For the electrodes 531 and the electrodes 532, a conductive film which is processed to be too thin to see by the users may be used. Such a conductive film is processed into a lattice shape (a mesh shape), for example, which makes it possible to achieve high conductivity and high visibility of the display device. It is preferable that the conductive film have a portion in which the width is greater than or equal to 30 nm and less than or equal to 100 µm, preferably greater than or equal to 50 nm and less than or equal to 50 µm, and further preferably greater than or equal to 50 nm and less than or equal to 20 µm. In particular, the conductive film having the pattern width of 10 µm or less is extremely difficult to see by the users, which is preferable.

Figure 26A:
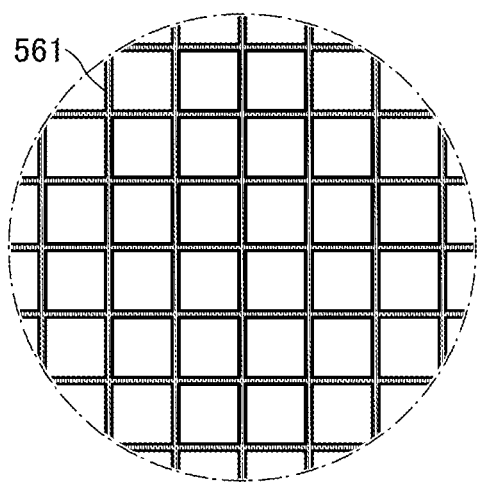
FIGS. 26A to 26D illustrate a touch panel of one embodiment.

As examples, enlarged schematic views of part of the electrodes 531 or the electrodes 532 (part in a circle formed by a dashed-dotted line in FIG. 25B) are shown in FIGS. 26A to 26D. FIG. 26A shows an example of the case in which a lattice-shape conductive film 561 is used. The lattice-shape conductive film 561 is preferably placed so as not to overlap the display element included in the display device because light from the display device is not blocked. In that case, it is preferable that the direction of the lattice be provided so as to be the same as the direction of the display element arrangement and that the pitch of the lattice be an integer multiple of the pitch of the display element arrangement.

Figure 26B:
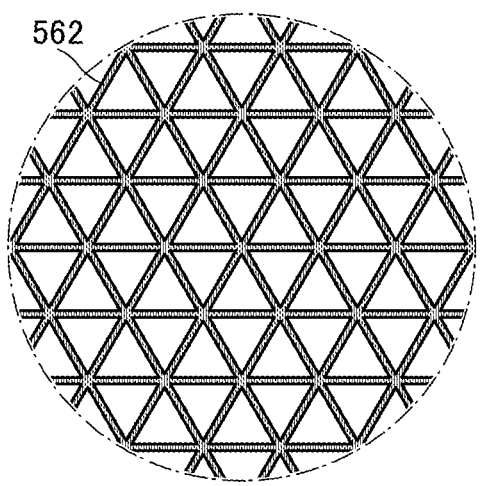

FIG. 26B shows an example of a lattice-shape conductive film 562, which is processed so as to be provided with triangle openings. Such a structure makes it possible to further reduce the resistance compared with the structure shown in FIG. 26A.

Figure 26C:
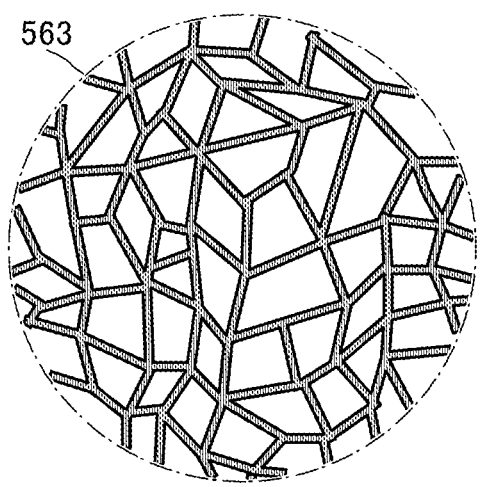

In addition, a conductive film 563, which has an irregular pattern shape, may be used as shown in FIG. 26C. Such a structure can prevent generation of moiré when overlapping with the display portion of the display device. Note that "moiré" refers to a fringe pattern created by diffraction or interference when external light or the like passes through or external light is reflected by narrow conductive films or the like spaced uniformly.

Figure 26D:
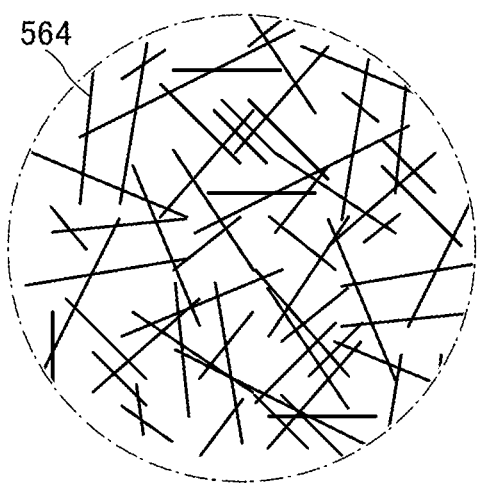

Conductive nanowires may be used for the electrodes 531 and the electrodes 532. FIG. 26D shows an example of the case in which nanowires 564 are used. The nanowires 564 are dispersed at appropriate density so as to be in contact with the adjacent nanowires, which can form a two-dimensional network; therefore, a conductive film with extremely high light-transmitting property can be provided. For example, a nanowire which has a mean value of the diameters of greater than or equal to 1 nm and less than or equal to 100 nm, preferably greater than or equal to 5 nm and less than or equal to 50 nm, further preferably greater than or equal to 5 nm and less than or equal to 25 nm can be used. As the nanowire 564, a metal nanowire such as an Ag nanowire, a Cu nanowire, and an Al nanowire, a carbon nanotube, or the like can be used. In the case of using an Ag nanowire, for example, light transmittance of 89% or more and a sheet resistance of 40 ohm/square or more and 100 ohm/square or less can be achieved.

Although examples in which a plurality of rhombuses are aligned in one direction are shown in FIG. 25A and the like as top surface shapes of the electrodes 531 and the electrodes 532, the shapes of the electrodes 531 and the electrodes 532 are not limited thereto and can have various top surface shapes such as a belt shape (a rectangular shape), a belt shape having a curve, and a zigzag shape. In addition, although the above shows the electrodes 531 and the electrodes 532 are arranged to be perpendicular to each other, they are not necessarily arranged to be perpendicular and the angle formed by two of the electrodes may be less than 90°.

Figure 27A:
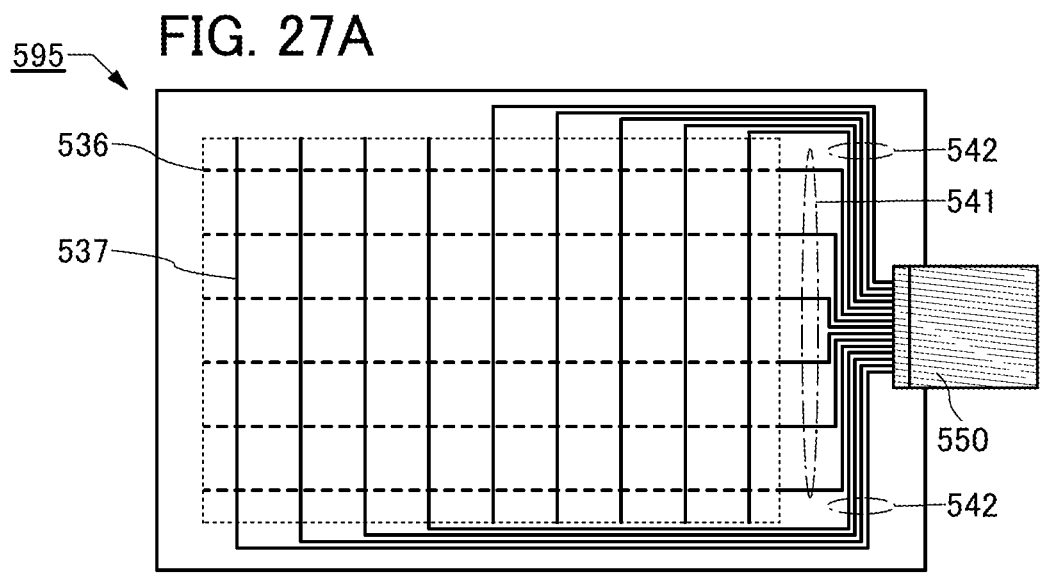
FIGS. 27A to 27C illustrate a touch panel of one embodiment.
Figure 27B:
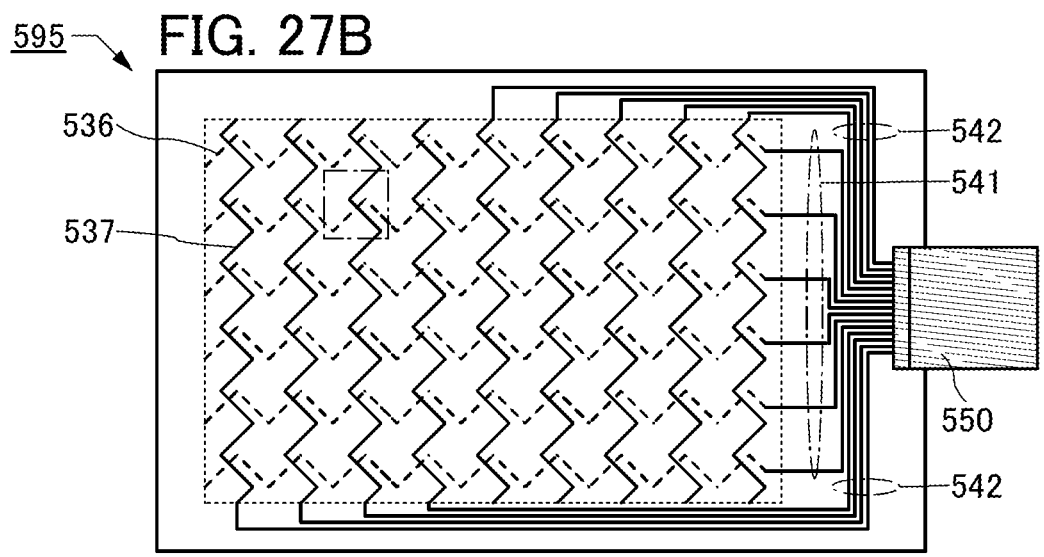
Figure 27C:
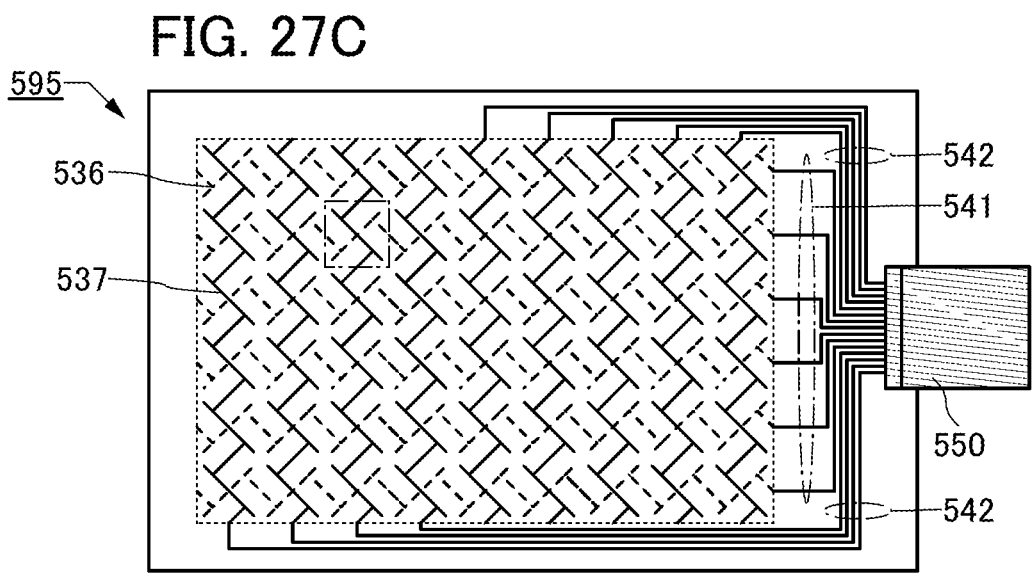

FIGS. 27A to 27C illustrate examples of the case where electrodes 536 and electrodes 537, which have a top surface shape of thin lines, are used instead of the electrodes 531 and the electrodes 532. FIG. 27A shows an example in which linear electrodes 536 and 537 are arranged so as to form a lattice shape.

FIG. 27B shows an example in which the electrodes 536 and the electrodes 537 have a top surface shape of a zigzag shape. As shown in FIG. 27B, the electrodes 536 and the electrodes 537 are arranged so as not to cross the straight-line portions at the centers but so as to place the centers of the straight-line portions in different positions from each other; therefore, the length of closely facing parallel parts of the electrodes 536 and the electrodes 537 can be longer. This is preferable because the capacitance between the electrodes can be increased and the sensitivity can be increased. Alternatively, as shown in FIG. 27C, the electrodes 536 and the electrodes 537 are arranged so as to have a design in which part of the straight-line portion of a zigzag shape is projected, which can increase the capacitance between the electrodes because the length of the parts facing each other can be longer even when the centers of the straight-line portions are placed in the same position.

Figure 28A:
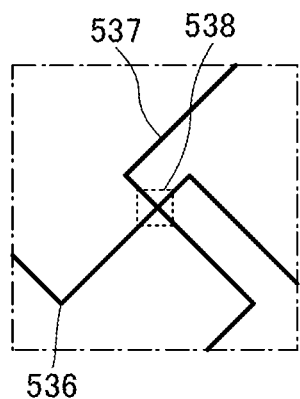
FIGS. 28A to 28F illustrate a touch panel of one embodiment.
Figure 28B:
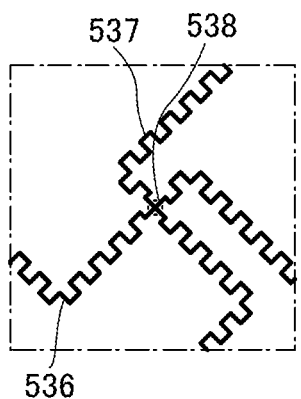
Figure 28C:
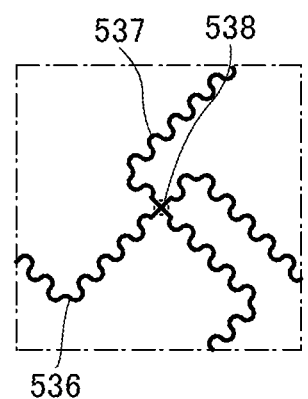
Figure 28D:
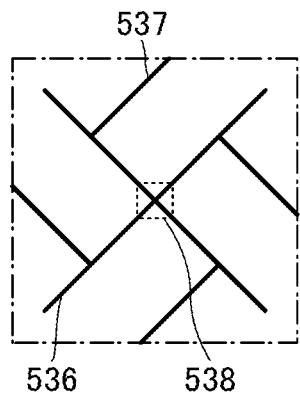
Figure 28E:
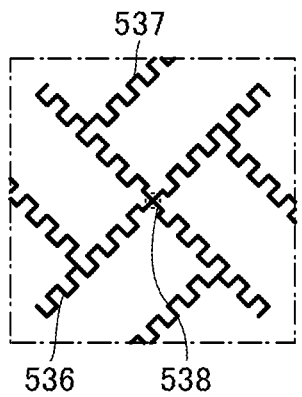
Figure 28F:
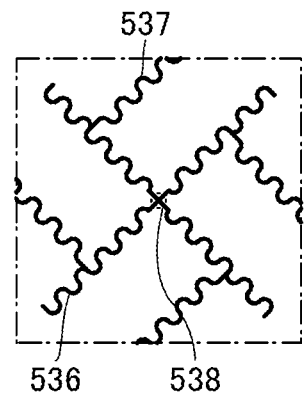

FIGS. 28A to 28C show enlarged views of a region surrounded by a dashed dotted line in FIG. 27B, and FIGS. 28D to 28F show enlarged views of a region surrounded by a dashed dotted line in FIG. 27C. In these drawings, the electrodes 536, the electrodes 537, and intersection portions 538 at which the electrodes 536 and the electrodes 537 intersect are illustrated. The straight-line portions of the electrodes 536 and the electrodes 537 shown in FIGS. 28A and 28D may have a serpentine shape that meanders with angled corners as shown in FIGS. 28B and 28E or may have a serpentine shape that continuously meanders as shown in FIGS. 28C and 28F.

Structure Example 4

Figure 29:
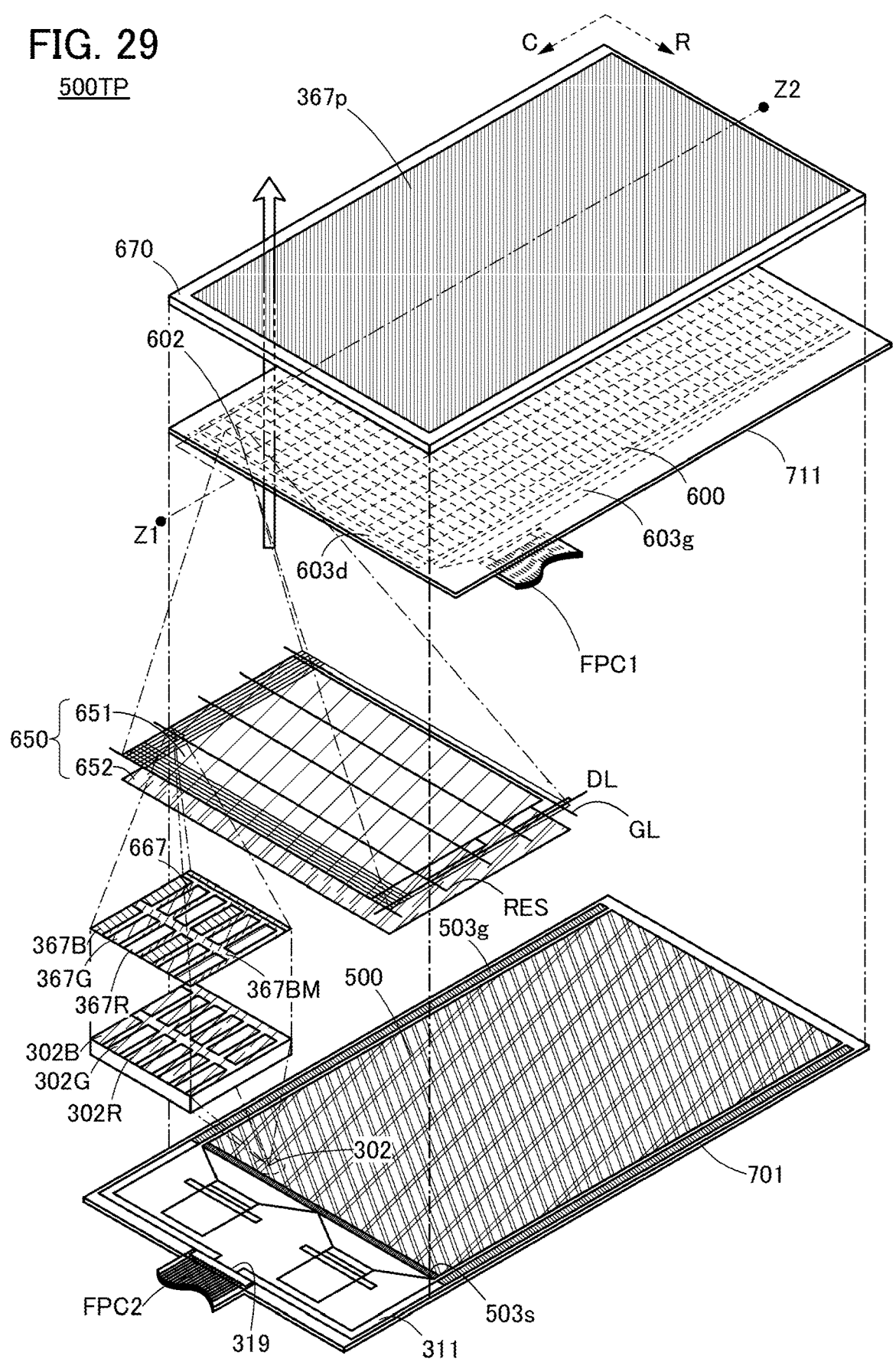
FIG. 29 illustrates a touch panel of one embodiment.
Figure 30:
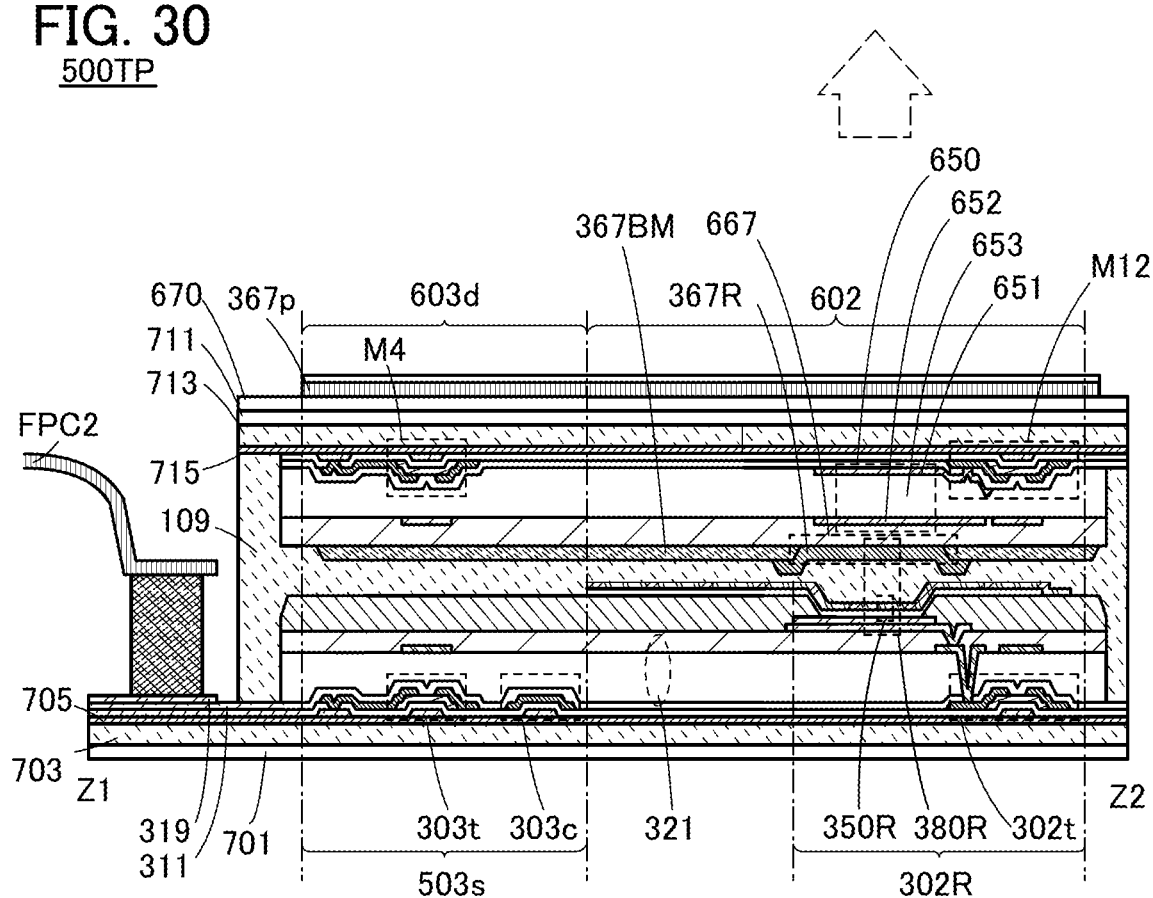
FIG. 30 illustrates a touch panel of one embodiment.

As illustrated in FIG. 29, a touch panel 500TP includes a display portion 500 and an input portion 600 that overlap each other. FIG. 30 is a cross-sectional view taken along the dashed-dotted line Z1-Z2 in FIG. 29.

Individual components included in the touch panel 500TP are described below. Note that these components cannot be clearly distinguished and one component also serves as another component or include part of another component in some cases. Note that the touch panel 500TP in which the input portion 600 overlaps with the display portion 500 is also referred to as a touch panel.

The input portion 600 includes a plurality of sensing units 602 arranged in a matrix. The input portion 600 also includes a selection signal line GL, a control line RES, a signal line DL, and the like.

The selection signal line GL and the control line RES are electrically connected to the plurality of sensing units 602 that are arranged in the row direction (indicated by the arrow R in FIG. 29). The signal line DL is electrically connected to the plurality of sensing units 602 that are arranged in the column direction (indicated by the arrow C in FIG. 29).

The sensing unit 602 senses an object that is close thereto or in contact therewith and supplies a sensing signal. For example, the sensing unit 602 senses, for example, capacitance, illuminance, magnetic force, electric waves, or pressure and supplies data based on the sensed physical quantity. Specifically, a capacitor, a photoelectric conversion element, a magnetic sensing element, a piezoelectric element, a resonator, or the like can be used as the sensing element.

The sensing unit 602 senses, for example, a change in capacitance between the sensing unit 602 and an object close thereto or an object in contact therewith.

Note that when an object having a dielectric constant higher than that of the air, such as a finger, comes close to a conductive film in the air, the capacitance between the finger and the conductive film changes. The sensing unit 602 can sense the capacitance change and supply sensing data.

For example, distribution of charge occurs between the conductive film and the capacitor owing to the change in the electrostatic capacitance, so that the voltage across the capacitor is changed. This voltage change can be used as the sensing signal.

The sensing unit 602 is provided with a sensor circuit. The sensor circuit is electrically connected to the selection signal line GL, the control line RES, the signal line DL, or the like.

The sensor circuit includes a transistor, a sensor element, and/or the like. For example, a conductive film and a capacitor electrically connected to the conductive film can be used for the sensor circuit. A capacitor and a transistor electrically connected to the capacitor can also be used for the sensor circuit.

For example, a capacitor 650 including an insulating layer 653, and a first electrode 651 and a second electrode 652 between which the insulating layer 653 is provided can be used for the sensor circuit (see FIG. 30). Specifically, the voltage between the electrodes of the capacitor 650 changes when an object approaches the conductive film which is electrically connected to one electrode of the capacitor 650.

The sensing unit 602 includes a switch that can be turned on or off in accordance with a control signal. For example, a transistor M12 can be used as the switch.

A transistor which amplifies a sensing signal can be used in the sensing unit 602.

Transistors manufactured through the same process can be used as the transistor that amplifies a sensing signal and the switch. This allows the input portion 600 to be provided through a simplified process.

The sensing unit 602 includes a plurality of window portions 667 arranged in a matrix. The window portions 667 transmit visible light. A light-blocking layer BM may be provided between the window portions 667.

A coloring layer is provided in a position overlapping with the window portion 667 in the touch panel 500TP. The coloring layer transmits light of a predetermined color. Note that the coloring layer can be referred to as a color filter. For example, a coloring layer 367B transmitting blue light, a coloring layer 367G transmitting green light, and a coloring layer 367R transmitting red light can be used. Alternatively, a coloring layer transmitting yellow light or white light may be used.

The display portion 500 includes the plurality of pixels 302 arranged in a matrix. The pixel 302 is positioned so as to overlap with the window portions 667 of the input portion 600. The pixels 302 may be arranged at higher density than the sensing units 602. Each pixel has the same structure as Structure Example 1; thus, description is omitted.

The touch panel 500TP includes the input portion 600 that includes the plurality of sensing units 602 arranged in a matrix and the window portions 667 transmitting visible light, the display portion 500 that includes the plurality of pixels 302 overlapping with the window portions 667, and the coloring layers between the window portions 667 and the pixels 302. Each of the sensing units includes a switch that can reduce interference in another sensing unit.

Thus, sensing data obtained by each sensor unit can be supplied together with the positional information of the sensor unit. In addition, sensing data can be supplied in relation to the positional data of the pixel for displaying an image. In addition, the sensor unit which does not supply the sensing data is not electrically connected to a signal line, whereby interference with the sensor unit which supplies a sensing signal can be reduced. Consequently, the novel touch panel 500TP that is highly convenient or highly reliable can be provided.

For example, the input portion 600 of the touch panel 500TP can sense sensing data and supply the sensing data together with the positional data. Specifically, a user of the touch panel 500TP can make a variety of gestures (e.g., tap, drag, swipe, and pinch-in operation) using, as a pointer, his/her finger or the like on the input portion 600.

The input portion 600 can sense a finger or the like that comes close to or is in contact with the input portion 600 and supply sensing data including a sensed position, path, or the like.

An arithmetic unit determines whether or not supplied data satisfies a predetermined condition on the basis of a program or the like and executes an instruction associated with a predetermined gesture.

Thus, a user of the input portion 600 can make the predetermined gesture with his/her finger or the like and make the arithmetic unit execute an instruction associated with the predetermined gesture.

For example, first, the input portion 600 of the touch panel 500TP selects one sensing unit X from the plurality of sensing units that can supply sensing data to one signal line. Then, electrical continuity between the signal line and the sensing units other than the sensing unit X is not established. This can reduce interference of the other sensing units in the sensing unit X.

Specifically, interference of sensing elements of the other sensing units in a sensing element of the sensing unit X can be reduced.

For example, in the case where a capacitor and a conductive film to which one electrode of the capacitor is electrically connected are used for the sensing element, interference of the potentials of the conductive films of the other sensing units in the potential of the conductive film of the sensing unit X can be reduced.

Thus, the touch panel 500TP can drive the sensing unit and supply sensing data independently of its size. The touch panel 500TP can have a variety of sizes, for example, ranging from a size for a hand-held device to a size for an electronic blackboard.

The touch panel 500TP can be folded and unfolded. Even in the case where interference of the other sensing units in the sensing unit X is different between the folded state and the unfolded state, the sensing unit can be driven and sensing data can be supplied without dependence on the state of the touch panel 500TP.

The display portion 500 of the touch panel 500TP can be supplied with display data. For example, an arithmetic unit can supply the display data.

In addition to the above structure, the touch panel 500TP can have the following structure.

The touch panel 500TP may include a driver circuit 603g or a driver circuit 603d. In addition, the touch panel 500TP may be electrically connected to an FPC1.

The driver circuit 603g can supply selection signals at predetermined timings, for example. Specifically, the driver circuit 603g supplies selection signals to the selection signal lines GL row by row in a predetermined order. Any of a variety of circuits can be used as the driver circuit 603g. For example, a shift register, a flip flop circuit, a combination circuit, or the like can be used.

The driver circuit 603d supplies sensing data on the basis of a sensing signal supplied from the sensing unit. Any of a variety of circuits can be used as the driver circuit 603d. For example, a circuit that can form a source follower circuit or a current mirror circuit by being electrically connected to the sensing circuit in the sensing unit can be used as the driver circuit 603d. In addition, an analog-to-digital converter circuit that converts a sensing signal into a digital signal may be provided in the driver circuit 603d.

The FPC1 supplies a timing signal, a power supply potential, or the like and is supplied with a sensing signal.

The touch panel 500TP may include a driver circuit 503g, a driver circuit 503s, a wiring 311, and a terminal 319. In addition, the touch panel 500TP may be electrically connected to an FPC2.

In addition, a protective layer 670 that prevents damage and protects the touch panel 500TP may be provided. For example, a ceramic coat layer or a hard coat layer can be used as the protective layer 670. Specifically, a layer containing aluminum oxide or a UV curable resin can be used.

In the case of a transflective liquid crystal display or a reflective liquid crystal display, some of or all of pixel electrodes function as reflective electrodes. For example, some or all of pixel electrodes are formed to contain aluminum, silver, or the like.

Furthermore, a memory circuit such as an SRAM can be provided under the reflective electrodes, leading to lower power consumption. A structure suitable for employed display elements can be selected from among a variety of structures of pixel circuits.

The touch panel described in this embodiment can be used instead of the display panel 100 included in the display device 10 in Embodiment 1 and Embodiment 3. In this case, a touch panel with a structure in which a plurality of FPCs connected to the touch panel are extracted from the same side, such as the touch panel 390 and the touch panel 505B, can be preferably used. Note that in the case where a touch panel is used instead of the display panel 100, the display device 10 can be referred to as an input/output device.

In the same manner of FIG. 15A, in the case where the protective substrate 132 is provided so as to overlap a plurality of the touch panels described in this embodiment with the resin layer 131 provided therebetween, the resin layer 131 that bonds to the protective substrate 132 is preferably provided so that the top surfaces of the touch sensors 595 (or the input portions 600) of these touch panels are level with each other and the top surfaces are parallel to the protective substrate 132. The distances between the surface of the input/output device (i.e., the surface of the protective substrate 132) and the touch sensors 595 (or the input portions 600) of the touch panels are made the same, whereby location dependence (also called in-plane variation) of detection sensitivity can be reduced.

At least part of this embodiment can be implemented in combination with any of the embodiments described in this specification as appropriate.

Embodiment 6

In this embodiment, electronic devices and lighting devices of one embodiment of the present invention will be described with reference to drawings.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The electronic device or the lighting device of one embodiment of the present invention has flexibility and therefore can be incorporated along a curved inside/outside wall surface of a house or a building or a curved interior/exterior surface of a car.

The electronic device of one embodiment of the present invention may include a secondary battery. It is preferable that the secondary battery be capable of being charged by non-contact power transmission.

As examples of the secondary battery, a lithium ion secondary battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include an antenna. When a signal is received by the antenna, the electronic device can display an image, data, or the like on a display portion. When the electronic device includes a secondary battery, the antenna may be used for contactless power transmission.

In the display device of one embodiment of the present invention, by increasing the number of display panels, the area of the display region can be increased unlimitedly. Thus, the display device can be favorably used for applications such as digital signage and a PID. Furthermore, by changing the arrangement of the display panels, the contour of the display device of one embodiment of the present invention can have any of a variety of shapes.

Figure 31A:
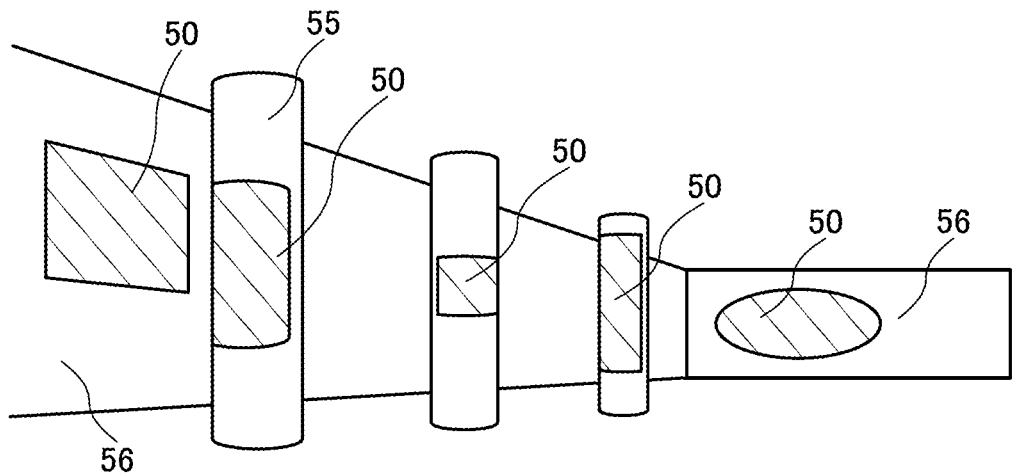
FIGS. 31A to 31F illustrate examples of electronic devices and lighting devices.

FIG. 31A shows an example in which the display device 50 of one embodiment of the present invention is provided for a column 55 and a wall 56. A flexible display panel is used as the display panel 100 included in the display device 50, whereby the display device 10 can be placed along a curved surface.

Here, in particular, in the case where the display device of one embodiment of the present invention is used in digital signage and a PID, it is preferable to use a touch panel in a display panel because a device with such a structure can be operated by viewers intuitively as well as displaying a still or moving image on a display region. In the case where the display device of one embodiment of the present invention is used for providing information such as route information and traffic information, usability can be enhanced by intuitive operation. In the case of providing the display device on the walls of buildings, public facilities, and the like, a touch panel is not necessarily used in the display panel.

FIGS. 31B to 31E illustrate examples of an electronic device including a display portion 7000 with a curved surface. The display surface of the display portion 7000 is curved, and images can be displayed on the curved display surface. The display portion 7000 may be flexible.

The display portion 7000 each included in the electronic devices in FIGS. 31B to 31E is formed using the light-emitting device, the display device, the input-output device, or the like of one embodiment of the present invention.

Figure 31B:
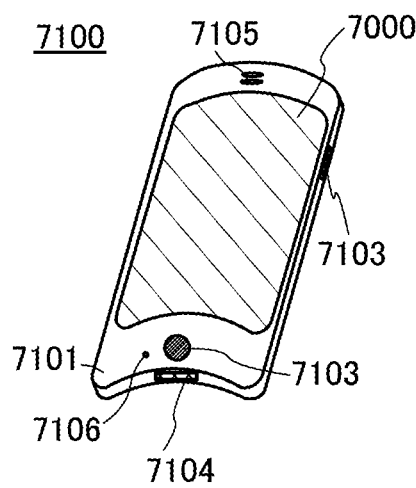

FIG. 31B illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 illustrated in FIG. 31B includes a touch sensor in the display portion 7000. Moreover, operations such as making a call and inputting characters can be performed by touch on the display portion 7000 with a finger, a stylus, or the like.

With the operation buttons 7103, power ON or OFF can be switched. In addition, types of images displayed on the display portion 7000 can be switched; switching images from a mail creation screen to a main menu screen, for example.

Figure 31C:
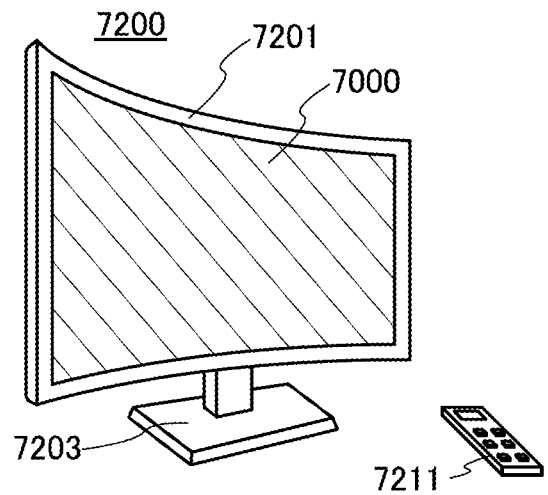

FIG. 31C illustrates an example of a television set. In the television set 7200, the display portion 7000 is incorporated into the housing 7201. Here, the housing 7201 is supported by a stand 7203.

The television set 7200 illustrated in FIG. 31C can be operated with an operation switch of the housing 7201 or a separate remote controller 7211. The display portion 7000 may include a touch sensor. The television set 7200 can be operated by touching the display portion 7000 with a finger or the like. The remote controller 7211 may be provided with a display portion for displaying data output from the remote controller 7211. With operation keys or a touch panel of the remote controller 7211, channels and volume can be controlled and images displayed on the display portion 7000 can be controlled.

The television set 7200 is provided with a receiver, a modem, and the like. A general television broadcast can be received with the receiver. When the television set is connected to a communication network with or without wires via the modem, one-way (from a transmitter to a receiver) or two-way (between a transmitter and a receiver or between receivers) data communication can be performed.

Figure 31D:
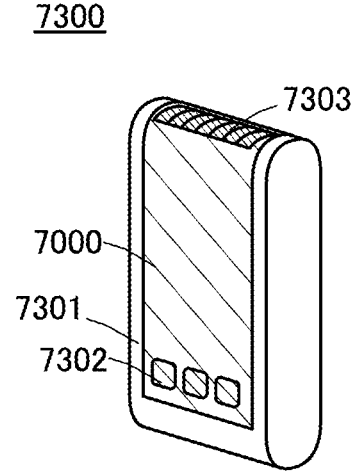

FIG. 31D illustrates an example of a portable information terminal. A portable information terminal 7300 includes a housing 7301 and the display portion 7000. The portable information terminal 7300 may also include an operation button, an external connection port, a speaker, a microphone, an antenna, a battery, or the like. The display portion 7000 is provided with a touch sensor. An operation of the portable information terminal 7300 can be performed by touching the display portion 7000 with a finger, a stylus, or the like.

Figure 31E:
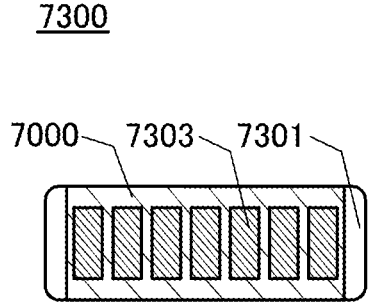

FIG. 31D is a perspective view of the portable information terminal 7300. FIG. 31E is a top view of the portable information terminal 7300.

Each of the portable information terminals illustrated in this embodiment functions as, for example, one or more of a telephone set, a notebook, and an information browsing system. Specifically, the portable information terminals each can be used as a smartphone. Each of the portable information terminals described in this embodiment is capable of executing a variety of applications such as mobile phone calls, e-mailing, reading and editing texts, music reproduction, Internet communication, and a computer game, for example.

The portable information terminal 7300 can display characters and image data on its plurality of surfaces. For example, as illustrated in FIG. 31D, three operation buttons 7302 can be displayed on one surface, and data 7303 indicated by a rectangle can be displayed on another surface. FIGS. 31D and 31E illustrate an example in which data is displayed at the top of the portable information terminal. Information may be displayed on the side of the portable information terminal. Information may also be displayed on three or more surfaces of the portable information terminal.

Examples of the data include notification from a social networking service (SNS), display indicating reception of e-mail or an incoming call, the title of e-mail or the like, the sender of e-mail or the like, the date, the time, remaining battery, the reception strength of an antenna, and the like. Instead of the data, an operation button, an icon, or the like may be displayed on the position where the data is displayed.

For example, a user of the portable information terminal 7300 can see the display (here, the data 7303) with the portable information terminal 7300 put in a breast pocket of his/her clothes.

Specifically, a caller's phone number, name, or the like of an incoming call is displayed in a position that can be seen from above the portable information terminal 7300. Thus, the user can see the display without taking out the portable information terminal 7300 from the pocket and decide whether to answer the call.

Figure 31F:
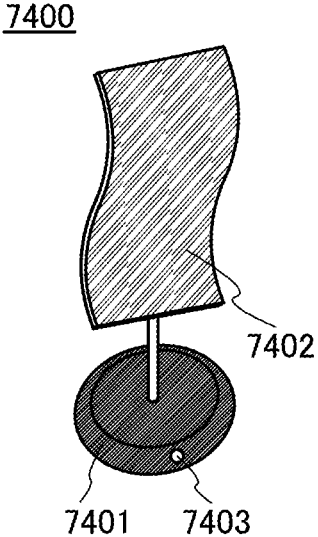

FIG. 31F illustrates an example of a lighting device having a curved light-emitting portion.

The light-emitting portion included in the lighting device illustrated in FIG. 31F can be manufactured using the display device of one embodiment of the present invention.

A lighting device 7400 illustrated in FIG. 31F includes a light-emitting portion 7402 having a wave-shaped light-emitting surface, which is a good-design lighting device.

The light-emitting portion included in the lighting device 7400 may be flexible. The light-emitting portion may be fixed on a plastic member, a movable frame, or the like so that an emission surface of the light-emitting portion can be curved freely depending on the intended use.

The lighting device 7400 includes a stage 7401 provided with an operation switch 7403 and a light-emitting portion supported by the stage 7401.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a depressed shape, whereby a particular region can be brightly illuminated, or the light-emitting surface is curved to have a projecting shape, whereby a whole room can be brightly illuminated.

FIGS. 32A-1, 32A-2, and 32B to 32I illustrate examples of a portable information terminal including a display portion 7001 having flexibility.

The display portion 7001 is manufactured using the light-emitting device, the display device, the input-output device, or the like of one embodiment of the present invention. For example, a light-emitting device, a display device, or an input-output device that can be bent with a radius of curvature of greater than or equal to 0.01 mm and less than or equal to 150 mm can be used. The display portion 7001 may include a touch sensor so that the portable information terminal can be operated by touching the display portion 7001 with a finger or the like.

Figure 32B:
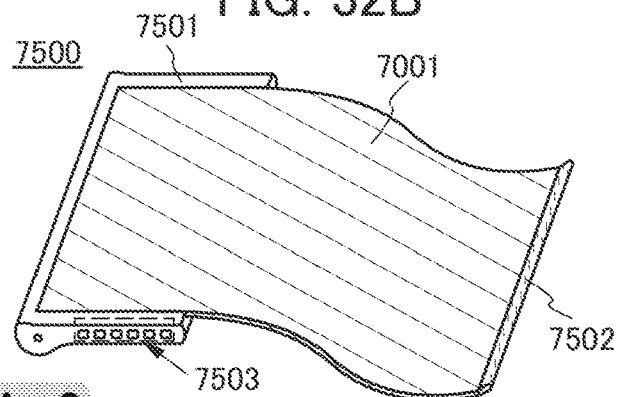

FIG. 32A-1 is a perspective view illustrating an example of a portable information terminal and FIG. 32B is a side view illustrating an example of the portable information terminal. A portable information terminal 7500 includes a housing 7501, the display portion 7001, a display portion tab 7502, operation buttons 7503, and the like.

The portable information terminal 7500 includes a rolled flexible display portion 7001 in the housing 7501.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal or power can be directly supplied from the outside with a wiring.

By pressing the operation buttons 7503, power ON/OFF, switching of displayed videos, and the like can be performed. Although FIGS. 32A-1, 32A-2, and 32B illustrate an example where the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

FIG. 32B illustrates the portable information terminal 7500 in a state where the display portion 7001 is pulled out. Videos can be displayed on the display portion 7001 in this state. In addition, the portable information terminal 7500 may perform different displays in the state where part of the display portion 7001 is rolled as shown in FIG. 32A-1 and in the state where the display portion 7001 is pulled out with the display portion tab 7502 as shown in FIG. 32B. For example, in the state shown in FIG. 32A-1, the rolled portion of the display portion 7001 is put in a non-display state, which results in a reduction in power consumption of the portable information terminal 7500.

A reinforcement frame may be provided for a side portion of the display portion 7001 so that the display portion 7001 has a flat display surface when pulled out.

Note that in addition to this structure, a speaker may be provided for the housing so that sound is output with an audio signal received together with a video signal.

Figures 32C, 32D, 32E:
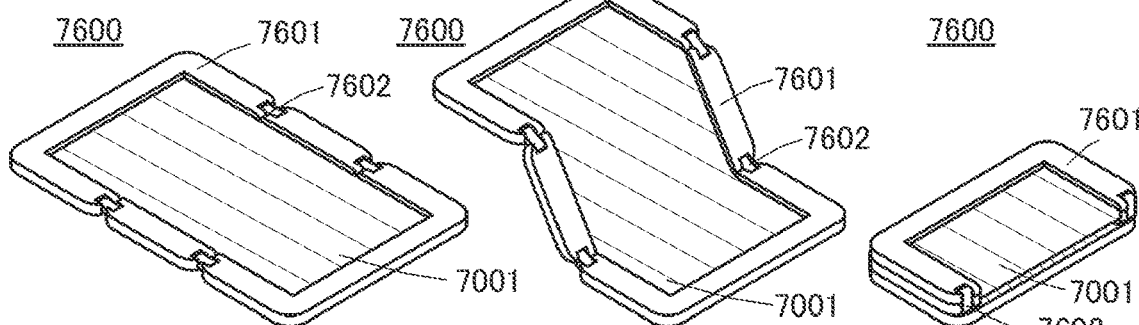

FIGS. 32C to 32E illustrate an example of a foldable portable information terminal. FIG. 32C illustrates a portable information terminal 7600 that is opened. FIG. 32D illustrates the portable information terminal 7600 that is being opened or being folded. FIG. 32E illustrates the portable information terminal 7600 that is folded. The portable information terminal 7600 is highly portable when folded, and is highly browsable when opened because of a large seamless display area.

The display portion 7001 is supported by three housings 7601 joined together by shafts 7602. By folding the portable information terminal 7600 at a connection portion between two housings 7601 with the shafts 7602, the portable information terminal 7600 can be reversibly changed in shape from an opened state to a folded state.

Figure 32F:
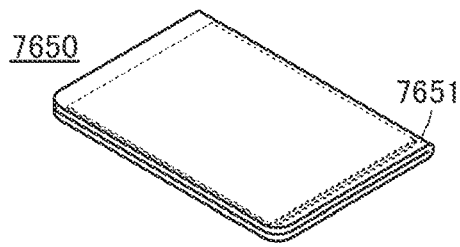
Figure 32G:
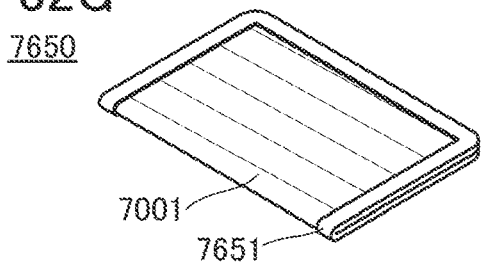

FIGS. 32F and 32G illustrate an example of a foldable portable information terminal. FIG. 32F illustrates a portable information terminal 7650 that is folded so that the display portion 7001 is on the inside. FIG. 32G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged.

Figure 32H:
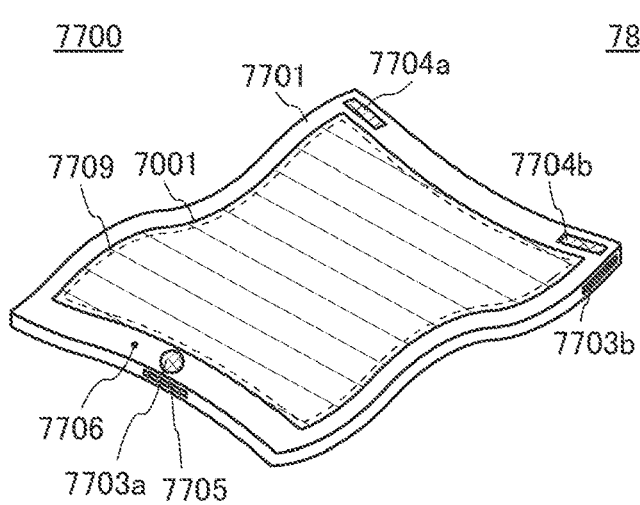

FIG. 32H illustrates an example of a flexible portable information terminal. A portable information terminal 7700 includes a housing 7701 and the display portion 7001. The portable information terminal 7700 may include buttons 7703a and 7703b which serve as input means, speakers 7704a and 7704b which serve as sound output means, an external connection port 7705, a microphone 7706, or the like. A flexible battery 7709 can be mounted on the portable information terminal 7700. The battery 7709 may be arranged to overlap with the display portion 7001, for example.

The housing 7701, the display portion 7001, and the battery 7709 are flexible. Thus, it is easy to curve the portable information terminal 7700 into a desired shape or to twist the portable information terminal 7700. For example, the portable information terminal 7700 can be curved so that the display portion 7001 is on the inside or in the outside. The portable information terminal 7700 can be used in a rolled state. Since the housing 7701 and the display portion 7001 can be changed in shape freely in this manner, the portable information terminal 7700 is less likely to be broken even when the portable information terminal 7700 falls down or external stress is applied to the portable information terminal 7700.

The portable information terminal 7700 can be used effectively in various situations because the portable information terminal 7700 is lightweight. For example, the portable information terminal 7700 can be used in the state where the upper portion of the housing 7701 is suspended by a clip or the like, or in the state where the housing 7701 is fixed to a wall by magnets or the like.

Figure 32I:
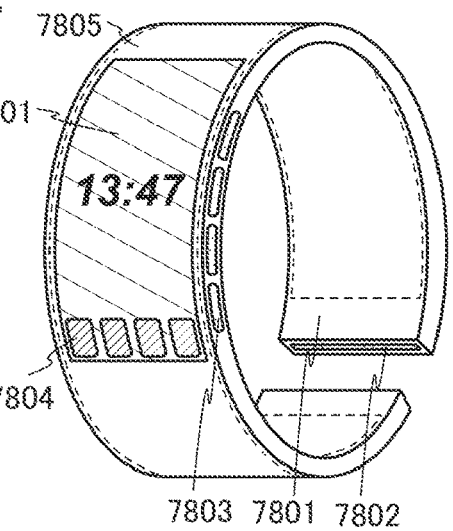

FIG. 32I illustrates an example of a wrist-watch-type portable information terminal. The portable information terminal 7800 includes a band 7801, the display portion 7001, an input-output terminal 7802, operation buttons 7803, and the like. The band 7801 has a function of a housing. A flexible battery 7805 can be mounted on the portable information terminal 7800. The battery 7805 may overlap with the display portion 7001 and the band 7801, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of silent mode, and setting and cancellation of power saving mode can be performed. For example, the functions of the operation button 7803 can be set freely by the operating system incorporated in the portable information terminal 7800.

By touching an icon 7804 displayed on the display portion 7001 with a finger or the like, application can be started.

The portable information terminal 7800 can employ near field communication that is a communication method based on an existing communication standard. In that case, for example, mutual communication between the portable information terminal 7800 and a headset capable of wireless communication can be performed, and thus hands-free calling is possible.

The portable information terminal 7800 may include the input-output terminal 7802. In the case where the input-output terminal 7802 is included, data can be directly transmitted to and received from another information terminal via a connector. Charging through the input-output terminal 7802 is also possible. Note that charging of the portable information terminal described as an example in this embodiment can be performed by non-contact power transmission without using the input-output terminal.

Figure 33A:
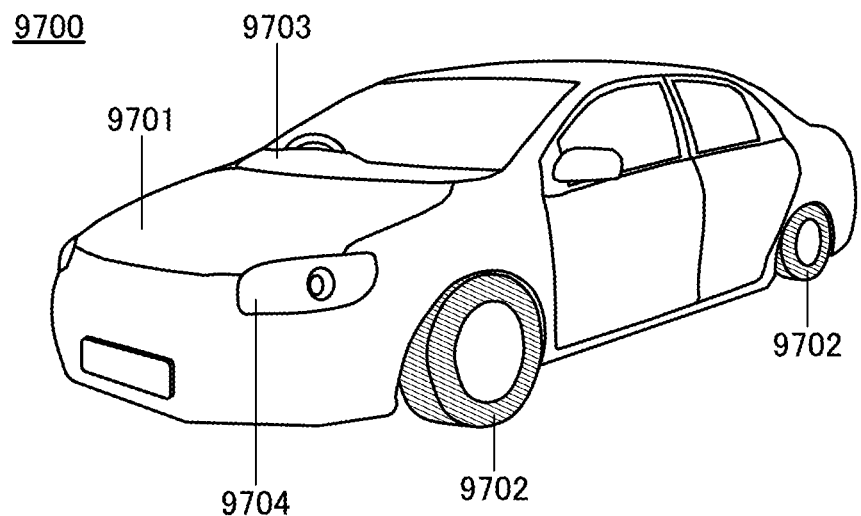
FIGS. 33A and 33B illustrate an example of an electronic device.
Figure 33B:
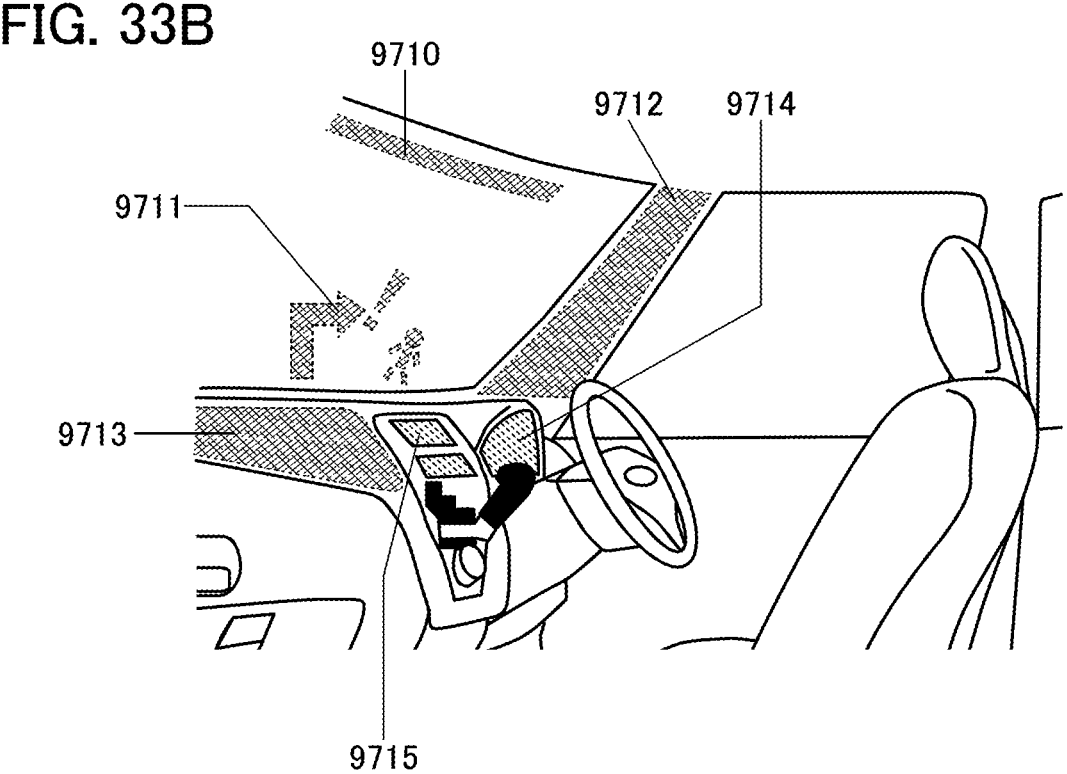

FIG. 33A is an external view of an automobile 9700. FIG. 33B illustrates a driver's seat of the automobile 9700. The automobile 9700 includes a car body 9701, wheels 9702, a dashboard 9703, lights 9704, and the like. The display device of one embodiment of the present invention can be used in a display portion or the like of the automobile 9700. For example, the display device of one embodiment of the present invention can be used in display portions 9710 to 9715 illustrated in FIG. 33B.

The display portion 9710 and the display portion 9711 are display devices provided in an automobile windshield. The display device of one embodiment of the present invention can be a see-through device, through which the opposite side can be seen, by using a light-transmitting conductive material for its electrodes and wirings. The see-through display device does not hinder driver's vision during driving of the automobile 9700. Therefore, the display device of one embodiment of the present invention can be provided in the windshield of the automobile 9700. Note that in the case where a transistor or the like for driving the display device is provided, a transistor having a light-transmitting property, such as an organic transistor using an organic semiconductor material or a transistor using an oxide semiconductor, is preferably used.

The display portion 9712 is a display device provided on a pillar portion. For example, an image taken by an imaging unit provided in the car body is displayed on the display portion 9712, whereby the view hindered by the pillar portion can be compensated. The display portion 9713 is a display device provided on the dashboard. For example, an image taken by an imaging unit provided in the car body is displayed on the display portion 9713, whereby the view hindered by the dashboard can be compensated. That is, by displaying an image taken by an imaging unit provided on the outside of the automobile, blind areas can be eliminated and safety can be increased. Displaying an image to compensate for the area which a driver cannot see makes it possible for the driver to confirm safety easily and comfortably.

Figure 34:
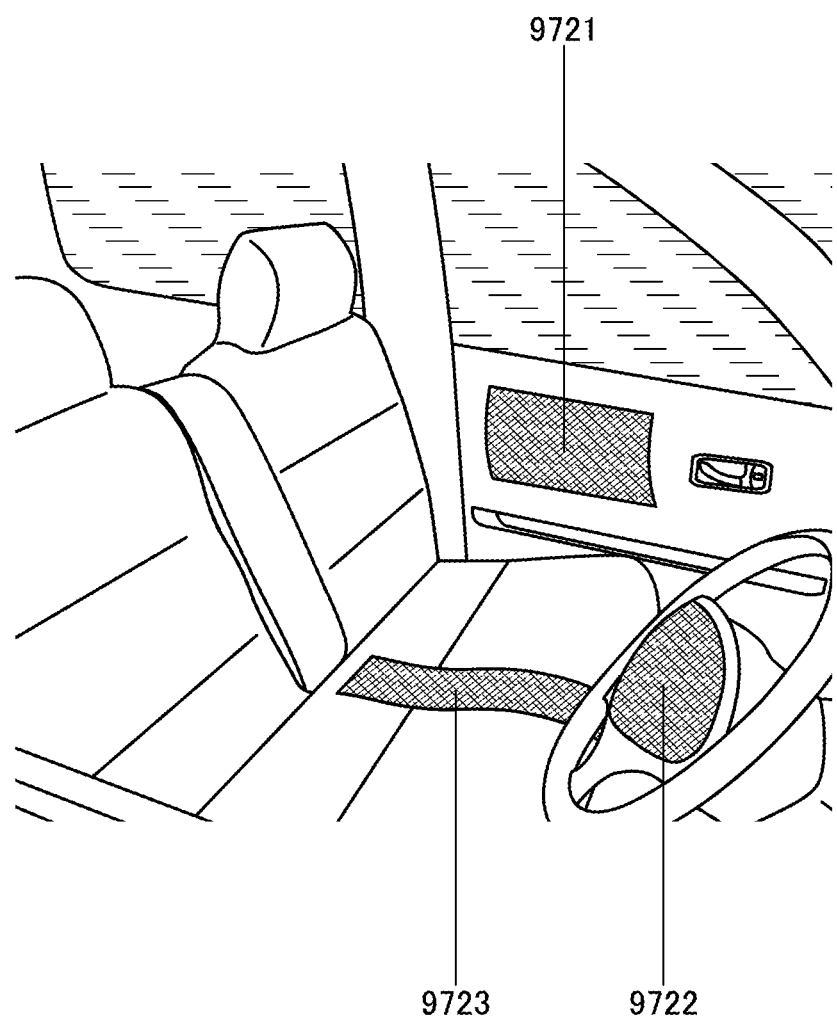
FIG. 34 illustrates an example of electronic device.

FIG. 34 illustrates the inside of a car in which bench seats are used for a driver seat and a front passenger seat. A display portion 9721 is a display device provided in a door portion. For example, an image taken by an imaging unit provided in the car body is displayed on the display portion 9721, whereby the view hindered by the door can be compensated. A display portion 9722 is a display device provided in a steering wheel. A display portion 9723 is a display device provided in the middle of a seating face of the bench seat. Note that the display device can be used as a seat heater by providing the display device on the seating face or backrest and by using heat generation of the display device as a heat source.

The display portion 9714, the display portion 9715, and the display portion 9722 can provide a variety of kinds of data such as navigation data, a speedometer, a tachometer, a mileage, a fuel meter, a gearshift indicator, and air-condition setting. The content, layout, or the like of the display on the display portions can be changed freely by a user as appropriate. The data listed above can also be displayed on the display portions 9710 to 9713, 9721, and 9723. The display portions 9710 to 9715 and 9721 to 9723 can also be used as lighting devices. The display portions 9710 to 9715 and 9721 to 9723 can also be used as heating devices.

It is needless to say that one embodiment of the present invention is not limited to the above-described electronic devices and lighting devices as long as the display device of one embodiment of the present invention is included.

Note that the structures, methods, and the like described in this embodiment can be used as appropriate in combination with any of the structures, methods, and the like described in the other embodiments.

EXPLANATION OF REFERENCE

10: display system, 11: region, 11A: region, 11B: region, 11C: region, 11D: region, 15: display image, 15A: display image, 15B: display image, 20: display device, 20a: display panel, 20b: display panel, 21a: display region, 21b: display region, 22b: transparent portion, 23a: auxiliary display region, 23b: auxiliary display region, 25: display device, 25a: display panel, 25b: display panel, 31: detection means, 31a: detection means, 31b: detection means, 32: compensation means, 35: display device, 36: display panel, 37: display region, 38: transparent portion, 39: non-display region, 40: display device, 41: display region, 41a: display region, 41A: display region, 41B: display region, 41C: display region, 42: transparent portion, 43: auxiliary display region, 43b: auxiliary display region, 44: region, 45: display panel, 45a: display panel, 45b: display panel, 45e: display panel, 46: display image, 48: display device, 49: display device, 50: display device, 51: display region, 55: column, 56: wall, 100: display panel, 100a: display panel, 100b: display panel, 100c: display panel, 100d: display panel, 101: display region, 101a: display region, 101b: display region, 101c: display region, 101d: display region, 103: display region, 104: FPC, 105: protective member, 110: transparent portion, 110b: transparent portion, 110c: transparent portion, 110d: transparent portion, 112: FPC, 112a: FPC, 112b: FPC, 120: region, 120a: region, 120b: region, 120c: region, 123: FPC, 131: resin layer, 132: protective substrate, 133: resin layer, 134: protective substrate, 141: pixel, 141a: pixel, 141b: pixel, 142a: wiring, 142b: wiring, 143a: circuit, 143b: circuit, 145: wiring, 151: substrate, 152: substrate, 153: adhesive layer, 170: region, 200: display device, 201: shaft, 202: rotation mechanism, 203: bearing, 211: cord, 212: rod, 213: cord, 221: wall, 222: cover, 230: table, 231: housing, 232: cover, 240: display appliance, 241: housing, 242: rod, 243: frame, 244: leg, 301: display portion, 302: pixel, 302B: sub-pixel, 302G: sub-pixel, 302R: sub-pixel, 302t: transistor, 303c: capacitor, 303g(1): scan line driver circuit, 303g(2): imaging pixel driver circuit, 303s(1): image signal line driver circuit, 303s(2): imaging signal line driver circuit, 303t: transistor, 304: gate, 308: imaging pixel, 308p: photoelectric conversion element, 308t: transistor, 309: FPC, 311: wiring, 319: terminal, 321: insulating layer, 328: partition, 329: spacer, 350R: light-emitting element, 351R: lower electrode, 352: upper electrode, 353: EL layer, 353a: EL layer, 353b: EL layer, 354: intermediate layer, 360: adhesive layer, 367B: coloring layer, 367BM: light-blocking layer, 367G: coloring layer, 367p: anti-reflective layer, 367R: coloring layer, 380B: light-emitting module, 380G: light-emitting module, 380R: light-emitting module, 390: touch panel, 500: display portion, 500TP: touch panel, 501: display portion, 503g: driver circuit, 503s: driver circuit, 505A: touch panel, 505B: touch panel, 509: FPC, FPC, 531: electrode, 532: electrode, 533: electrode, 534: bridge electrode, 536: electrode, 537: electrode, 538: intersection portion, 541: wiring, 542: wiring, 550: FPC, 561: conductive film, 562: conductive film, 563: conductive film, 564: nanowire, 590: substrate, 591: electrode, 592: electrode, 593: insulating layer, 594: wiring, 595: touch sensor, 597: adhesive layer, 598: wiring, 599: connection layer, 600: input portion, 602: sensing unit, 603d: driver circuit, 603g: driver circuit, 650: capacitor, 651: electrode, 652: electrode, 653: insulating layer, 667: window portion, 670: protective layer, 701: substrate, 703: adhesive layer, 705: insulating layer, 711: substrate, 713: adhesive layer, 715: insulating layer, 723: adhesive layer, 804: display portion, 806: operating circuit portion, 808: FPC, 810: transparent portion, 815: insulating layer, 816: insulating layer, 817: insulating layer, 820: transistor, 821: insulating layer, 822: adhesive layer, 825: connector, 830: light-emitting element, 831: lower electrode, 833: EL layer, 835: upper electrode, 845: coloring layer, 847: light-blocking layer, 857: conductive layer, 7000: display portion, 7001: display portion, 7100: mobile phone, 7101: housing, 7103: operation buttons, 7104: external connection port, 7105: speaker, 7106: microphone, 7200: television set, 7201: housing, 7203: stand, 7211: remote controller, 7300: information terminal, 7301: housing, 7302: operation button, 7303: data, 7400: lighting device, 7401: stage, 7402: light-emitting portion, 7403: operation switch, 7500: information terminal, 7501: housing, 7502: member, 7503: operation button, 7600: information terminal, 7601: housing, 7602: shaft, 7650: information terminal, 7651: non-display portion, 7700: information terminal, 7701: housing, 7703a: button, 7703b: button, 7704a: speaker, 7704b: speaker, 7705: external connection port, 7706: microphone, 7709: battery, 7800: information terminal, 7801: band, 7802: input-output terminal, 7803: operation button, 7804: icon, 7805: battery, 9700: automobile, 9701: car body, 9702: wheels, 9703: dashboard, 9704: lights, 9710: display portion, 9711: display portion, 9712: display portion, 9713: display portion, 9714: display portion, 9715: display portion, 9721: display portion, 9722: display portion, 9723: display portion.

This application is based on Japanese Patent Application serial no. 2014-229027 filed with Japan Patent Office on Nov. 11, 2014 and Japanese Patent Application serial no. 2014-229164 filed with Japan Patent Office on Nov. 11, 2014, the entire contents of which are hereby incorporated by reference.

The invention claimed is:

1. A display system comprising:
a first display panel including a first display region and a first detection device;
a second display panel including a second display region and a second detection device;
a first FPC electrically connected to the first display panel;
a second FPC electrically connected to the second display panel;
a compensation device;
a resin layer; and
a flexible substrate,
wherein each of the first display region and the second display region include a first region,
wherein the first regions of the first display region and the second display region overlap with each other,
wherein the first detection device is configured to detect an intensity of external light and a size of the first region,
wherein the compensation device is configured to compensate display luminance of the first display region in accordance with the intensity of the external light,
wherein the compensation device is configured to compensate an image displayed on the first display region in accordance with a change in the size of the first region,
wherein the flexible substrate overlaps with the first display panel and the second display panel with the resin layer disposed between the flexible substrate and each of the first display panel and the second display panel, and
wherein the first display panel includes a curved portion, the curved portion being connected to the first FPC such that the first FPC is between a display surface side of the first display panel and a rear surface side of the second display panel.

2. The display system according to claim 1, wherein the compensation device is configured to compensate an image displayed on the second display region in accordance with the change in the size of the first region.

3. The display system according to claim 1, wherein the second display panel includes a first transparent portion adjacent to the second display region.

4. The display system according to claim 1, wherein each of the first display panel and the second display panel has flexibility.

5. The display system according to claim 1,
wherein the first detection device includes a photoelectric conversion element, and
wherein the photoelectric conversion element is located in the first display region of the first display panel.

6. The display system according to claim 1,
wherein the first display panel includes an auxiliary display region, and
wherein the compensation device is configured to make part of the auxiliary display region display an image in accordance with the change in the size of the first region.

7. A display device comprising:
a first display panel including a first display region, and a detection device;
a second display panel including a first transparent portion and a second display region;
a first FPC electrically connected to the first display panel;
a second FPC electrically connected to the second display panel;
a compensation device configured to detect an intensity of external light;
a resin layer over the first display panel and the second display panel;

a flexible substrate over the resin layer and overlapping with the first display panel and the second display panel;

a shaft configured to supply a signal to the first display panel and the second display panel; and a rotation mechanism configured to rotate the shaft, wherein each of the first display panel and the second display panel has flexibility, wherein the first transparent portion of the second display panel partly overlaps with the first display region of the first display panel, wherein the compensation device is configured to compensate display luminance of the first display region in accordance with the intensity of the external light, wherein the first display panel and the second display panel are rolled around the shaft by rotating the shaft, and wherein the first display panel includes a curved portion, the curved portion being connected to the first FPC such that the first FPC is between a display surface side of the first display panel and a rear surface side of the second display panel.

8. The display device according to claim 7 further comprising:

a third display panel including a second transparent portion and a third display region; and a fourth display panel including a third transparent portion and a fourth display region;

wherein the second transparent portion of the third display panel partly overlaps with the first display region of the first display panel, wherein the third transparent portion of the fourth display panel partly overlaps with the second display region of the second display panel and the third display region of the third display panel, wherein the shaft is configured to supply a signal to the third display panel and the fourth display panel, and wherein the third display panel and the fourth display panel are rolled around the shaft by rotating the shaft.

9. The display device according to claim 8, wherein the third display panel and the fourth display panel are closer to the shaft than the first display panel and the second display panel are.

10. The display device according to claim 7, wherein the shaft includes at least one of a connector, a wiring, a circuit board, an antenna, a wireless receiver, a wireless transmitter, a power supply line, a battery, and an external connection port.

11. The display device according to claim 7, wherein the rotation mechanism includes at least one of a connector, a wiring, a circuit board, an antenna, a wireless receiver, a wireless transmitter, a power supply line, a battery, and an external connection port.

12. A display system comprising:

the display device according to claim 8;

wherein the first display region and the second display region include a first region where the first display region and the second display region overlap with each other, wherein the detection device is configured to detect a size of the first region, and wherein the compensation device is configured to compensate an image displayed on the first display region in accordance with a change in the size of the first region.

13. The display system according to claim 12, wherein the detection device is any one of a digital camera, a CCD camera, and an image scanner.

14. The display system according to claim 12, wherein the detection device includes a photoelectric conversion element, and wherein the photoelectric conversion element is located in the first display region of the first display panel.

15. The display system according to claim 12, wherein the first display panel includes an auxiliary display region on an outer side than the first display region, and wherein the compensation device is configured to make part of the auxiliary display region display an image.

16. The display system according to claim 12, wherein each of the third display panel and the fourth display panel has flexibility.

17. The display device according to claim 7, wherein a difference in refractive index between the resin layer and the flexible substrate is less than or equal to 20%.

18. The display system according to claim 1, wherein the flexible substrate overlaps with an entirety of the resin layer.

19. The display device according to claim 7, wherein the flexible substrate overlaps with an entirety of the resin layer.

20. The display system according to claim 1, wherein the compensation device is configured to receive data from the first detection device and the second detection device via a wire.

21. A display system comprising:

a first display panel including a first display region and a detection device;

a second display panel including a second display region;

a first FPC electrically connected to the first display panel;

a second FPC electrically connected to the second display panel; and a compensation device, wherein each of the first display region and the second display region include a first region, wherein the first regions of the first display region and the second display region overlap with each other, wherein the detection device is configured to detect a size of the first region, wherein the compensation device is configured to compensate an image displayed on the first display region in accordance with a change in the size of the first region, and wherein the first display panel includes a curved portion, the curved portion being connected to the first FPC such that the first FPC is between a display surface side of the first display panel and a rear surface side of the second display panel.

* * * * *